US006995882B2

(12) United States Patent
Horimai

(10) Patent No.: US 6,995,882 B2
(45) Date of Patent: Feb. 7, 2006

(54) APPARATUS FOR RECORDING OPTICAL INFORMATION

(75) Inventor: Hideyoshi Horimai, Shizuoka (JP)

(73) Assignee: Optware Corporation, Tokyo (JP)

( * ) Notice: Subject to any disclaimer, the term of this patent is extended or adjusted under 35 U.S.C. 154(b) by 0 days.

(21) Appl. No.: 10/285,619

(22) Filed: Nov. 1, 2002

(65) Prior Publication Data

US 2003/0063342 A1   Apr. 3, 2003

Related U.S. Application Data

(63) Continuation of application No. 09/601,702, filed as application No. PCT/JP99/00896 on Feb. 26, 1999.

(30) Foreign Application Priority Data

| Feb. 27, 1998 | (JP) | ................................ 10-46754 |
| May 8, 1998 | (JP) | ................................ 10-142321 |
| May 8, 1998 | (JP) | ................................ 10-142322 |
| May 8, 1998 | (JP) | ................................ 10-142323 |

(51) Int. Cl.
   *G03H 1/00*        (2006.01)

(52) U.S. Cl. .............................. 359/2; 359/11; 359/35; 369/103

(58) Field of Classification Search .................. 359/10, 359/11, 22, 24, 35, 1, 2, 28, 30; 369/44.11, 369/44.26, 102, 103, 109.01, 109.02, 106, 369/44.37, 44.38; 283/86
See application file for complete search history.

(56) References Cited

U.S. PATENT DOCUMENTS

| 3,573,362 A | 4/1971 | Burchardt | .................... 359/30 |
| 3,899,240 A * | 8/1975 | Gabor | ........................ 359/10 |
| 4,025,731 A * | 5/1977 | Rembault | .................... 369/102 |
| 4,104,489 A | 8/1978 | Satoh et al. | ................. 369/103 |

(Continued)

FOREIGN PATENT DOCUMENTS

JP        A 48-39045        6/1973

(Continued)

OTHER PUBLICATIONS

J. F. Heanue et al., "Recall of linear combinations of stored data pages based on phase-code multiplexing in volume holography"; Optic Letters, vol. 19, No. 14, pp. 1079-1081, 1994.

(Continued)

*Primary Examiner*—Thong Nguyen
*Assistant Examiner*—Arnel C. Lavarias
(74) *Attorney, Agent, or Firm*—Oliff & Berridge, PLC

(57) ABSTRACT

The present invention makes it possible to reduce the size of an optical system for multiplex recording or reproduction of information utilizing holography.

A pick-up (11) of an optical information recording/reproducing apparatus generates information light by spatially modulating laser light emitted by a light source device (25) with a spatial light modulator (18) depending on the information to be recorded and generates reference light for recording having a spatially modulated phase by spatially modulating the phase of laser beam emitted by the light source device (25) with a phase-spatial light modulator (17). The information light and the reference light for recording are projected upon an optical information recording medium (1) such that they converge in different positions, and information is recorded in the hologram layer (3) in the form of an interference pattern as a result of interference between the information light reflected by a reflecting film (5) and the reference light for recording. The positioning of the information light and the reference light for recording is carried out based on information recorded in address servo areas (6).

9 Claims, 53 Drawing Sheets

U.S. PATENT DOCUMENTS

| | | | |
|---|---|---|---|
| 4,213,193 A | 7/1980 | Reid et al. | 365/125 |
| 4,638,471 A | 1/1987 | Van Rosmalen | 369/44.14 |
| 5,111,445 A | 5/1992 | Psaltis et al. | 369/103 |
| 5,202,979 A | 4/1993 | Hillis et al. | 714/6 |
| 5,485,312 A * | 1/1996 | Horner et al. | 359/561 |
| 5,627,664 A * | 5/1997 | Trisnadi | 359/11 |
| 5,719,691 A | 2/1998 | Curtis et al. | 359/11 |
| 5,740,276 A * | 4/1998 | Tomko et al. | 382/210 |
| 5,777,760 A | 7/1998 | Hays et al. | 359/7 |
| 5,856,048 A * | 1/1999 | Tahara et al. | 430/1 |
| 5,917,798 A | 6/1999 | Horimai et al. | 369/103 |
| 6,272,095 B1 | 8/2001 | Liu et al. | 369/103 |
| 6,524,771 B2 * | 2/2003 | Maeda et al. | 430/290 |

FOREIGN PATENT DOCUMENTS

| | | |
|---|---|---|
| JP | A 48-62446 | 8/1973 |
| JP | A 49-1251 | 1/1974 |
| JP | 52-100249 | 8/1977 |
| JP | A 54-39651 | 3/1979 |
| JP | A 60-172068 | 9/1985 |
| JP | A 62-16246 | 1/1987 |
| JP | A-62-24481 | 2/1987 |
| JP | A 2-163789 | 6/1990 |
| JP | A 4-228153 | 8/1992 |
| JP | A 4-267283 | 9/1992 |
| JP | A 5-6134 | 1/1993 |
| JP | 5-248348 | 10/1993 |
| JP | A 6-195793 | 7/1994 |
| JP | A 6-266275 | 9/1994 |
| JP | A 7-140886 | 6/1995 |
| JP | 8-315427 | 11/1996 |
| JP | 9-305978 | 11/1997 |
| JP | 10-124872 | 5/1998 |
| JP | 10-302293 | 11/1998 |
| RU | 2082994 | 6/1997 |

OTHER PUBLICATIONS

J. F. Heanue et al., "Encrypted holographic data storage based on orthoganol-phase-code mulitplexing"; Applied Optics, vol. 34, No. 26, pp. 6012-6015, 1995.

Eiji Yagyu et al., "The New Realtime 3-D Imaging Technique by the Frequency Multiplexed PHB Hologram", Technical Report of IEICE, ED193-87, HC93-54, pp. 1-5, 1993.

"Fundamentals of Optical Memories" published Corna Corporation, pp. 104-103, 1990.

O plus E, No. 202, pp. 93-99, Sep. 1996.

Optics Letters, vol. 20, No. 7, Apr. 1, 1995, Optical Society of America, "Holographic storage using shift multiplexing", Demetri Psaltis et al., pp. 770-772.

* cited by examiner

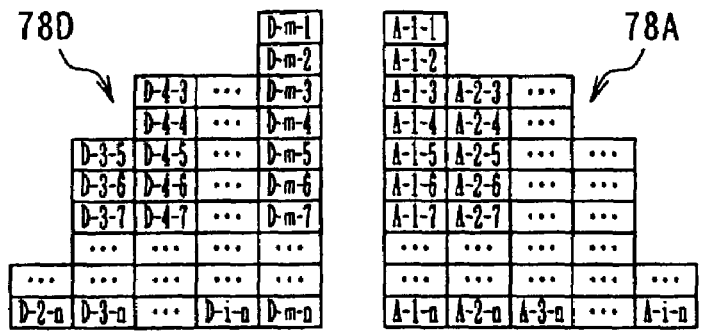
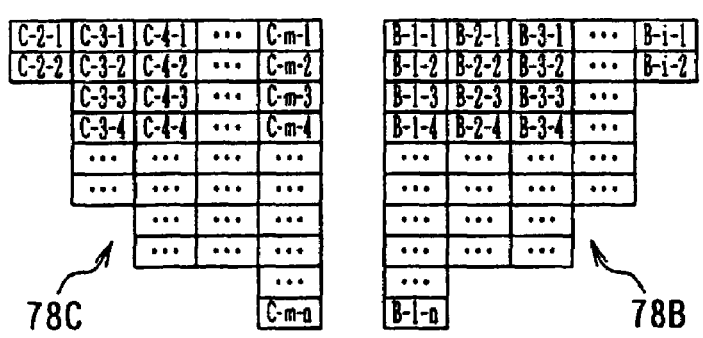
FIG. 15A
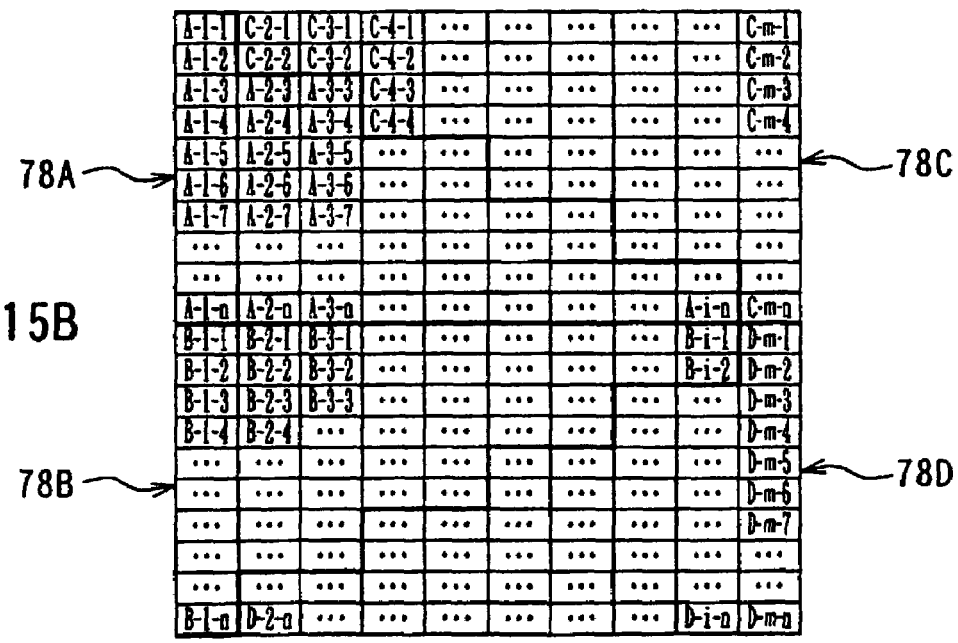
FIG. 15B

APPARATUS FOR RECORDING OPTICAL INFORMATION

This is a Continuation of application Ser. No. 09/601,702 filed Aug. 4, 2000, which in turn is a National Stage of PCT/JP99/00896, filed Feb. 26, 1999. The entire disclosure of the prior application(s) is hereby incorporated by reference herein in its entirety.

TECHNICAL FIELD

The present invention relates to an optical information recording apparatus and a method for the same for recording information in an optical information recording medium utilizing holography, an optical information reproducing apparatus and a method for the same for reproducing information from an optical information recording medium utilizing holography, an optical information recording/reproducing apparatus for recording information in an optical information recording medium and reproducing information from an optical information recording medium utilizing holography and an optical information recording medium in which information is recorded utilizing holography.

BACKGROUND ART

In general, holographic recording for recording information in a recording medium utilizing holography is performed by overlapping light carrying image information and reference light in a recording medium and writing resultant interference fringes in the recording medium. When the recorded information is reproduced, the recording medium is illuminated with reference light to cause diffraction attributable to the interference fringes which reproduces the image information.

Recently, volume holography and, more particularly, digital volume holography has been developed and is attracting attention in practical fields for high density optical recording. Volume holography is a method for writing interference fringes on a three-dimensional basis by actively using a recording medium even in the direction of the thickness thereof, which is characterized in that diffracting efficiency is improved by an increased thickness and in that an increased storage capacity can be achieved utilizing multiplex recording. Digital volume holography is a computer-oriented method for holographic recording in which image information to be recorded is limited to binary digital patterns in spite of the fact that the same recording media and recording method as the volume holography are used. According to the digital volume holography, for example, analog image information such as a picture is once digitized to develop two-dimensional digital pattern information which is in turn recorded as image information. When reproduced, the digital pattern information is read and decoded to restore and display the original image information. Since this makes it possible to perform differential detection and error correction on encoded binary data, the original information can be reproduced with extremely high fidelity even with a somewhat poor SN ratio (signal-to-noise ratio) during reproduction.

FIG. 75 is a perspective view of a schematic configuration of a prior-art recording/reproducing system for digital volume holography. The recording/reproducing system has: a spatial light modulator 101 for generating information light 102 based on two-dimensional digital pattern information; a lens 103 for collecting the information light 102 from the spatial light modulator 101 to illuminate a hologram recording medium 100 with the same; reference light illumination means (not shown) for illuminating the hologram recording medium 100 with reference light 104 in a direction orthogonal to the information light 102; a CCD (charge-coupled device) array 107 for detecting reproduced two-dimensional digital pattern information; and a lens 106 for collecting reproduction light 105 emerging from the hologram recording medium 100 to illuminate the CCD array 107 with the same. Crystals of $LiNbO_3$ or the like are used for the hologram recording medium 100.

In the recording/reproducing system shown in FIG. 75, recording is performed by digitizing information of an original image or the like to be recorded and by arranging the resultant signals having a value of 1 or 0 on a two-dimensional basis to generate two-dimensional digital pattern information. One piece of two-dimensional digital pattern information is referred to as "page data". Let us assume here that page data #1 through #n are recorded in the same hologram recording medium 100 on a multiplex basis. In this case, the spatial light modulator 101 first chooses to transmit or block light for each pixel based on the page data #1 to generate spatially modulated information light 102 with which the hologram recording medium 100 is illuminated through the lens 103. Simultaneously, the hologram recording medium 100 is illuminated with reference light 104 in a direction θ1 substantially orthogonal to the information light 102 to record interference fringes resulting from overlap between the information light 102 and the reference light 104 inside the hologram recording medium 100. In order to improve diffracting efficiency, the reference light 104 is transformed by a cylindrical lens or the like into flat beams to record the interference fringes in the hologram recording medium 100 even in the direction of the thickness thereof. To record the next page data #2, the reference light 104 is projected at an angle θ2 different from θ1 and is overlapped with the information light 102 to perform multiplex recording of information in the same hologram recording medium 100. Similarly, to record the other page data #3 through #n, the reference light 104 is projected at respective different angles θ3 through θn to record information on a multiplex basis. Such a hologram having information recorded therein on a multiplex basis is referred to as "stack". In the example shown in FIG. 75, the hologram recording medium 100 has a plurality of stacks (stack 1, stack 2, . . . , stack m, . . . ).

Arbitrary page data can be reproduced from a stack by illuminating the stack with reference light 104 at the same incident angle as that for the recording of the page data. As a result, the reference light 104 is selectively diffracted by interference fringes associated with the page data to generate reproduction light 105. The reproduction light 105 impinges upon the CCD array 107 through the lens 106, and the CCD array 107 detects a two-dimensional pattern of the reproduction light. The detected two-dimensional pattern of the reproduction light is decoded conversely to the process performed during recording so that information such as an original image is reproduced.

While the configuration shown in FIG. 75 allows multiplex recording of information in the same hologram recording medium 100, in order to record information with a high density, the positioning of the information light 102 and reference light 104 in the hologram recording medium 100 is important. In the configuration shown in FIG. 75, however, since the hologram recording medium 100 itself carries no information for positioning, there is only a mechanical way to position the information light 102 and reference light 104 on the hologram recording medium 100, which makes it difficult to perform the positioning with high accuracy. This has resulted in problems in that removability (the ease of performing recording and reproduction of a hologram recording medium on a recording/reproducing apparatus after moving it from another recording/reproducing apparatus with the same results as on the previous apparatus) is poor; random access is difficult; and high density recording is difficult. The configuration shown in FIG. 75 has another problem in that it involves a large optical system for recording or reproduction because the optical axes of the information light 102, reference light 104 and reproduction light 105 are located in different spatial positions.

Various methods for multiplex recording have been proposed in an attempt to increase the recording capacity of holographic recording by improving the recording density. One of such methods is angle multiplexing as shown in FIG. 75. However, such angle multiplexing has a problem particularly in that it involves a large and complex optical system for recording or reproduction because the angle of the reference light must be varied.

In addition to the above-described angle multiplex, proposed prior-art methods for multiplex recording for holographic recording include: phase-encoding multiplexing as disclosed, for example, in an article of J. F. Heanue et al., "Recall of linear combinations of stored data pages based on phase-code multiplexing in volume holography", Optics Letters, Vol. 19, No. 14, pp. 1079–1081, 1994 and an article of J. F. Heanue et al., "Encrypted holographic data storage based on orthogonal-phase-encoding multiplexing", Applied Optics, Vol. 34, No. 26, pp. 6012–6015, 1995; and hole burning type wavelength multiplexing as disclosed, for example, in an article by Eiji YAGYU et al., "A study on novel recording and reproduction of wavelength multiplex type holograms utilizing PHB", Technical Report of IEICE, EDI93-87, HC93-54, pp. 1–5, 1993.

In any of the methods for multiplex recording, optical systems for recording or reproduction proposed in prior art have a problem in that their size is increased by the fact that the optical axes of information light, reference light and reproduction light are located in spatially different positions and in that a dramatic improvement in the recording density is not achievable because the hologram recording media themselves have no information for positioning and it is therefore difficult to position light for recording or reproduction on the hologram recording media with high accuracy.

DISCLOSURE OF THE INVENTION

The present invention has been conceived taking such problems into consideration, and it is a first object of the invention to provide an apparatus and a method for recording optical information capable of performing multiplex recording of information in an optical information recording medium in which information is recorded utilizing holography and an apparatus and a method for reproducing optical information to reproduce information from an optical information recording medium carrying information recorded in such a manner, in which an optical system for recording or reproducing can be compactly configured.

In addition to the above-described first object, it is a second object of the invention to provide an apparatus and a method for recording optical information and an apparatus and a method for reproducing optical information, in which light for recording or reproduction can be accurately positioned relative to an optical information recording medium.

It is a third object of the invention to provide an optical information recording apparatus for recording information in an optical information recording medium utilizing holography, an optical information reproducing apparatus for reproducing information from an optical information recording medium utilizing holography and an optical information recording/reproducing apparatus for recording information in and reproducing information from an optical information recording medium utilizing holography, in which an optical system for recording or reproduction can be compactly configured and in which random access to the optical information recording medium is facilitated.

It is a fourth object of the invention to provide an optical information recording medium for recording information utilizing holography with which random access and high density recording can be easily achieved.

A first optical information recording apparatus according to the invention is an optical information recording apparatus for recording information in an optical information recording medium having an information recording layer in which information is recorded utilizing holography, the apparatus comprising: information light generation means for generating information light carrying information; recording reference light generation means including phase modulation means for spatially modulating the phase of light, for generating reference light for recording whose phase has been spatially modulated by the phase modulation means; and a recording optical system for illuminating the information recording layer on the same side thereof with the information light generated by the information light generation means and the reference light for recording generated by the recording reference light generation means such that the information is recorded in the information recording layer in the form of an interference pattern as a result of interference between the information light and the reference light for recording.

A first method for recording optical information according to the invention is a method for recording information in an optical information recording medium having an information recording layer in which information is recorded utilizing holography, the method comprising the steps of: generating information light carrying information; spatially modulating the phase of light to generate reference light for recording having a spatially modulated phase; and illuminating the information recording layer on the same side thereof with the information light and the reference light for recording to record the information in the information recording layer in the form of an interference pattern as a result of interference between the information light and the reference light for recording.

In the first apparatus or method for recording optical information according to the invention, the information recording layer is illuminated on the same side thereof with the information light carrying information and the reference light for recording having a spatially modulated phase to record the information in the information recording layer in the form of an interference pattern as a result of interference between the information light and the reference light for recording.

A first optical information reproducing apparatus according to the invention is an optical information reproducing apparatus for reproducing information utilizing holography from an optical information recording medium having an information recording layer in which the information is recorded in the form of an interference pattern as a result of interference between information light carrying the information and reference light for recording having a spatially modulated phase, the apparatus comprising: reproduction reference light generation means including phase modulation means for spatially modulating the phase of light, for generating reference light for reproduction having a phase spatially modulated by the phase modulation means; a reproducing optical system for illuminating the information recording layer with the reference light for reproduction generated by the reproduction reference light generation means and for collecting reproduction light generated at the information recording layer when illuminated with the reference light for reproduction on the same side of the information recording layer that is illuminated with the reference light for reproduction; and detection means for detecting the reproduction light collected by the reproducing optical system.

A first method for reproducing optical information according to the invention is a method for reproducing information utilizing holography from an optical information recording medium having an information recording layer in which the information is recorded in the form of an interference pattern as a result of interference between information light carrying the information and reference light for recording having a spatially modulated phase, the method comprising the steps of: spatially modulating the phase of light to generate reference light for reproduction having a spatially modulated phase; illuminating the information recording layer with the reference light for reproduction and collecting reproduction light generated at the information recording layer when illuminated with the reference light for reproduction on the same side of the information recording layer that is illuminated with the reference light for reproduction: and detecting the collected reproduction light.

In the first apparatus or method for reproducing optical information according to the invention, the information recording layer is illuminated with the reference light for reproduction having a spatially modulated phase; reproduction light generated at the information recording layer when illuminated with the reference light for reproduction is collected on the same side of the information recording layer that is illuminated with the reference light for reproduction; and the collected reproduction light is detected.

A second optical information recording apparatus according to the invention is an optical information recording apparatus for recording information in an optical information recording medium having an information recording layer in which a change in absorbance occurs in an absorption spectrum thereof in the position of a wavelength of incident light and in which information is recorded utilizing holography, the apparatus comprising: wavelength selection means for selecting a wavelength of light illuminating the information recording layer from among a plurality of wavelengths; information light generation means for generating information light having the wavelength selected by the wavelength selection means and carrying information; recording reference light generation means for generating reference light for recording having the wavelength selected by the wavelength selection means; and a recording optical system for illuminating the information recording layer on the same side thereof with the information light generated by the information light generation means and the reference light for recording generated by the recording reference light generation means such that the information is recorded in the information recording layer in the form of an interference pattern as a result of interference between the information light and the reference light for recording.

A second method for recording optical information according to the invention is a method for recording information in an optical information recording medium having an information recording layer in which a change in absorbance occurs in an absorption spectrum thereof in the position of a wavelength of incident light and in which information is recorded utilizing holography, the method comprising the steps of: selecting a wavelength of light illuminating the information recording layer from among a plurality of wavelengths; generating information light having the selected wavelength and carrying information; generating reference light for recording having the selected wavelength; and illuminating the information recording layer on the same side thereof with the information light and the reference light for recording to record the information in the information recording layer in the form of an interference pattern as a result of interference between the information light and the reference light for recording.

In the second apparatus or method for recording optical information according to the invention, the information recording layer is illuminated on the same side thereof with the information light having the selected wavelength and carrying information and the reference light for recording having the selected wavelength to record the information in the information recording layer in the form of an interference pattern as a result of interference between the information light and the reference light for recording.

A second optical information reproducing apparatus according to the invention is an optical information reproducing apparatus for reproducing information utilizing holography from an optical information recording medium having an information recording layer in which the information is recorded in the form of an interference pattern as a result of interference between information light having a wavelength selected from among a plurality of wavelengths and carrying the information and reference light for recording having the wavelength selected from among a plurality of wavelengths, the apparatus comprising: wavelength selection means for selecting a wavelength of light illuminating the information recording layer from among a plurality of wavelengths; reproduction reference light generation means for generating reference light for reproduction having the wavelength selected by the wavelength selection means; a reproducing optical system for illuminating the information recording layer with the reference light for reproduction generated by the reproduction reference light generation means and for collecting reproduction light generated at the information recording layer when illuminated with the reference light for reproduction on the same side of the information recording layer that is illuminated with the reference light for reproduction; and detection means for detecting the reproduction light collected by the reproducing optical system.

A second method for reproducing optical information is an optical information reproducing method for reproducing information utilizing holography from an optical information recording medium having an information recording layer in which the information is recorded in the form of an interference pattern as a result of interference between information light having a wavelength selected from among a plurality of wavelengths and carrying the information and reference light for recording having the wavelength selected from among a plurality of wavelengths, the method comprising the steps of: selecting a wavelength of light illuminating the information recording layer from among a plurality of wavelengths; generating reference light for reproduction having the selected wavelength; illuminating the information recording layer with the reference light for reproduction and collecting reproduction light generated at the information recording layer when illuminated with the reference light for reproduction on the same side of the information recording layer that is illuminated with the reference light for reproduction; and detecting the collected reproduction light.

In the second apparatus or method for reproducing optical information according to the invention, the information recording layer is illuminated with the reference light for reproduction having the selected wavelength; reproduction light generated at the information recording layer when illuminated with the reference light for reproduction is collected on the same side of the information recording layer that is illuminated with the reference light for reproduction; and the collected reproduction light is detected.

A third optical information recording apparatus according to the invention is an optical information recording apparatus for recording information in an optical information recording medium having an information recording layer in which a change in absorbance occurs in an absorption spectrum thereof in the position of a wavelength of incident light and in which information is recorded utilizing holography, the apparatus comprising: wavelength selection means for selecting a wavelength of light illuminating the information recording layer from among a plurality of wavelengths; information light generation means for generating information light having the wavelength selected by the wavelength selection means and carrying information; recording reference light generation means including phase modulation means for spatially modulating the phase of light, for generating reference light for recording having the wavelength selected by the wavelength selection means and having a phase spatially modulated by the phase modulation means; and a recording optical system for illuminating the information recording layer on the same side thereof with the information light generated by the information light generation means and the reference light for recording generated by the recording reference light generation means such that the information is recorded in the information recording layer in the form of an interference pattern as a result of interference between the information light and the reference light for recording.

A third method for recording optical information according to the invention is an optical information recording method for recording information in an optical information recording medium having an information recording layer in which a change in absorbance occurs in an absorption spectrum thereof in the position of a wavelength of incident light and in which information is recorded utilizing holography, the method comprising the steps of: selecting a wavelength of light illuminating the information recording layer from among a plurality of wavelengths; generating information light having the selected wavelength and carrying information; spatially modulating the phase of light to generate reference light for recording having the selected wavelength and a spatially modulated phase; and illuminating the information recording layer on the same side thereof with the information light and the reference light for recording to record the information in the information recording layer in the form of an interference pattern as a result of interference between the information light and the reference light for recording.

In the third apparatus or method for recording optical information according to the invention, the information recording layer is illuminated on the same side thereof with the information light having the selected wavelength and carrying information and the reference light for recording having the selected wavelength and a spatially modulated phase to record the information in the information recording layer in the form of an interference pattern as a result of interference between the information light and the reference light for recording.

A third optical information reproducing apparatus according to the invention is an optical information reproducing apparatus for reproducing information utilizing holography from an optical information recording medium having an information recording layer in which the information is recorded in the form of an interference pattern as a result of interference between information light having a wavelength selected from among a plurality of wavelengths and carrying the information and reference light for recording having the wavelength selected from among a plurality of wavelengths and having a spatially modulated phase, the apparatus comprising: wavelength selection means for selecting a wavelength of light illuminating the information recording layer from among a plurality of wavelengths; reproduction reference light generation means including phase modulation means for spatially modulating the phase of light, for generating reference light for reproduction having the wavelength selected by the wavelength selection means and having a phase spatially modulated by the phase modulation means; a reproducing optical system for illuminating the information recording layer with the reference light for reproduction generated by the reproduction reference light generation means and for collecting reproduction light generated at the information recording layer when illuminated with the reference light for reproduction on the same side of the information recording layer that is illuminated with the reference light for reproduction; and detection means for detecting the reproduction light collected by the reproducing optical system.

A third method for reproducing optical information according to the invention is an optical information reproducing method for reproducing information utilizing holography from an optical information recording medium having an information recording layer in which the information is recorded in the form of an interference pattern as a result of interference between information light having a wavelength selected from among a plurality of wavelengths and carrying the information and reference light for recording having the wavelength selected from among a plurality of wavelengths and having a spatially modulated phase, the method comprising the steps of: selecting a wavelength of light illuminating the information recording layer from among a plurality of wavelengths; spatially modulating the phase of light to generate reference light for reproduction having the selected wavelength and a spatially modulated phase; illuminating the information recording layer with the reference light for reproduction and collecting reproduction light generated at the information recording layer when illuminated with the reference light for reproduction on the same side of the information recording layer that is illuminated with the reference light for reproduction; and detecting the collected reproduction light.

In the third apparatus or method for reproducing optical information, the information recording layer is illuminated with the reference light for reproduction having the selected wavelength and spatially modulated phase; reproduction light generated at the information recording layer when illuminated with the reference light for reproduction is collected on the same side of the information recording layer that is illuminated with the reference light for reproduction; and the collected light is detected.

A fourth optical information recording apparatus according to the invention is an optical information recording apparatus for recording information in an optical information recording medium having an information recording layer in which information is recorded utilizing holography, the apparatus comprising a pick-up device provided in a face-to-face relationship with the optical information recording medium, the pick-up device having: a light source for emitting beams of light; information light generation means for spatially modulating the beams of light emitted by the light source to generate information light carrying information; recording reference light generation means for generating reference light for recording using the beams of light emitted by the light source; and a recording optical system for illuminating the information recording layer on the same side thereof with the information light generated by the information light generation means and the reference light for recording generated by the recording reference light generation means such that the information is recorded in the information recording layer in the form of an interference pattern as a result of interference between the information light and the reference light for recording.

In the fourth optical information recording apparatus according to the invention, the pick-up device provided in a face-to-face relationship with the optical information recording medium illuminates the information recording layer on the same side thereof with the information light and the reference light for recording to record the information in the information recording layer in the form of an interference pattern as a result of interface between the information light and the reference light for recording.

A fourth optical information reproducing apparatus according to the invention is an optical information reproducing apparatus for reproducing information from an optical information recording medium having an information recording layer with information recorded therein utilizing holography, the apparatus comprising a pick-up device provided in a face-to-face relationship with the optical information recording medium, the pick-up device having: a light source for emitting beams of light; reproduction reference light generation means for generating reference light for reproduction using the beams of light emitted by the light source; a reproducing optical system for illuminating the information recording layer with the reference light for reproduction generated by the reproduction reference light generation means and for collecting reproduction light generated at the information recording layer when illuminated with the reference light for reproduction on the same side of the information recording layer that is illuminated with the reference light for reproduction; and detection means for detecting the reproduction light collected by the reproducing optical system.

In the fourth optical information reproducing apparatus according to the invention, the pick-up device provided in a face-to-face relationship with the optical information recording medium illuminates the information recording layer with the reference light for reproduction; reproduction light generated at the information recording layer when illuminated with the reference light for reproduction is collected on the same side of the information recording layer that is illuminated with the reference light for reproduction; and the collected reference light is detected.

An optical information recording/reproducing apparatus according to the present invention is an optical information recording/reproducing apparatus for recording information in an optical information recording medium having an information recording layer in which information is recorded utilizing holography and for reproducing the information from the optical information recording medium, the apparatus comprising a pick-up device provided in a face-to-face relationship with the optical information recording medium, the pick-up device having: a light source for emitting beams of light; information light generation means for generating information light carrying information by spatially modulating the beams of light emitted by the light source; recording reference light generation means for generating reference light for recording using the beams of light emitted by the light source; reproduction reference light generation means for generating reference light for reproduction using the beams of light emitted by the light source; a recording/reproducing optical system for illuminating the information recording layer on the same side thereof with the information light generated by the information light generation means and the reference light for recording generated by the recording reference light generation means such that the information is recorded in the information recording layer in the form of an interference pattern as a result of interference between the information light and the reference light for recording, for illuminating the information recording layer with the reference light for reproduction generated by the reproduction reference light generation means and for collecting reproduction light generated at the information recording layer when illuminated with the reference light for reproduction on the same side of the information recording layer that is illuminated with the reference light for reproduction: and detection means for detecting the reproduction light collected by the reproducing/reproducing optical system.

In the optical information recording/reproducing apparatus according to the invention, during recording, the pick-up device provided in a face-to-face relationship with the optical information recording medium projects the information light and the reference light for recording upon the information recording layer on the same side thereof to record information in the information recording layer using an interference pattern as a result of interference between the information light and the reference light for recording. During reproduction, the pick-up device illuminates the information recording layer with the reference light for reproduction; reproduction light generated at the information recording light when illuminated with the reference light for reproduction is collected on the same side of the information recording layer that is illuminated with the reference light for reproduction; and the collected reproduction light is detected.

An optical information recording medium according to the invention comprises: a first information layer for recording information in the form of an interference pattern as a result of interference between information light and reference light for recording utilizing holography and for generating reproduction light associated with the recorded information when illuminated with reference light for reproduction; and a second information layer which is provided in a position different from the position of the first information layer in the direction of the thickness and in which information is recorded using means different from that for the recording of information in the first information layer.

In the optical information recording medium according to the invention, information is recorded in the first recording layer in the form of an interference pattern as a result of interference between information light and reference light for recording utilizing holography, and information is recorded in the second recording layer using means other than that for recording of information in the first information layer.

Other objects, features and objectives of the invention will become sufficiently clear from the following description.

BRIEF DESCRIPTION OF THE DRAWINGS

FIGS. 15A and 15B illustrate the contents of data determined from a pattern of reproduction light detected by the pick-up shown in FIG. 1 and an ECC table associated with the data.

BEST MODE FOR CARRYING OUT THE INVENTION

Figure 1:
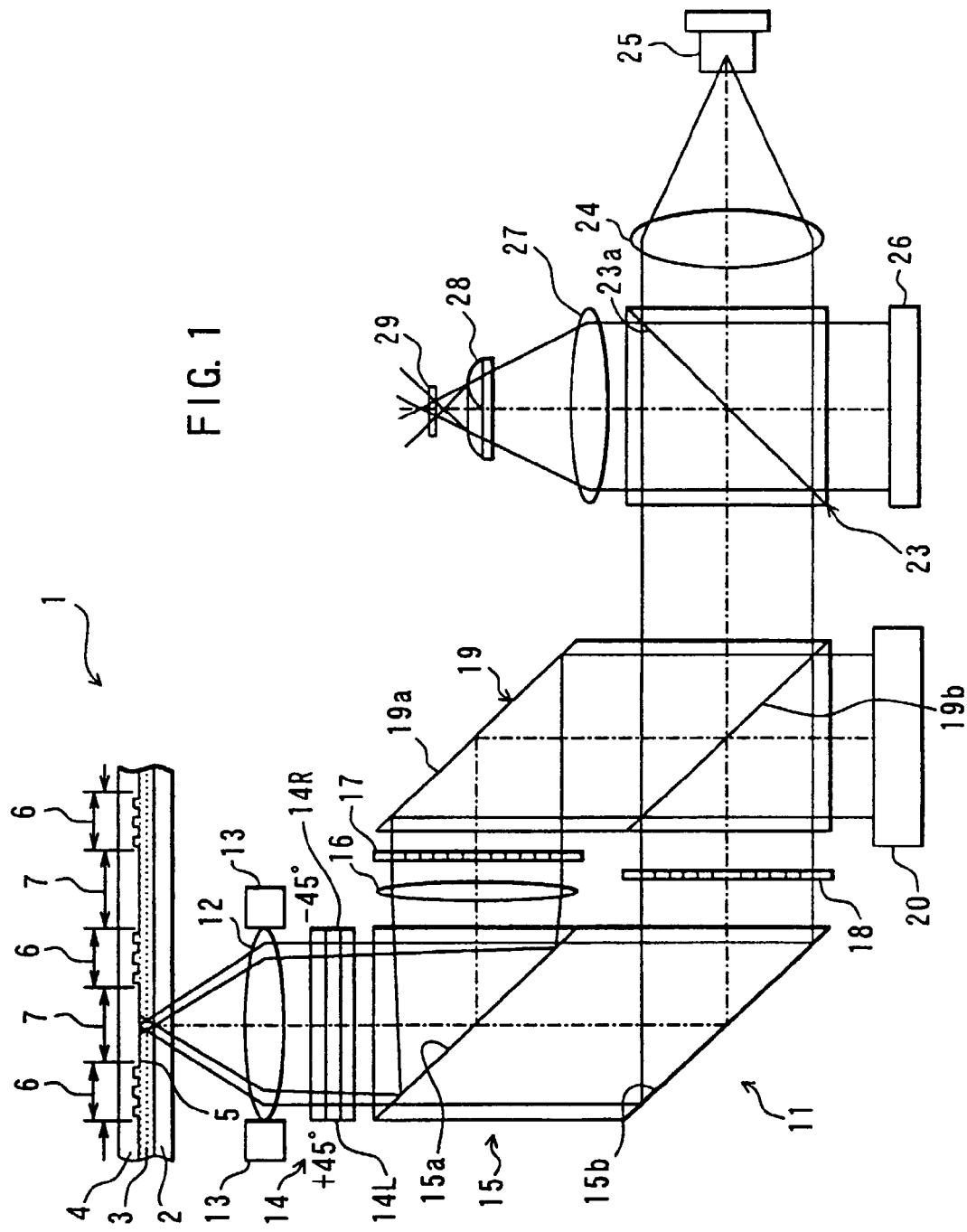
FIG. 1 is an illustration showing a configuration of a pick-up of an optical information recording/reproducing apparatus according to a first embodiment and a configuration of an optical information recording medium.
Figure 2:
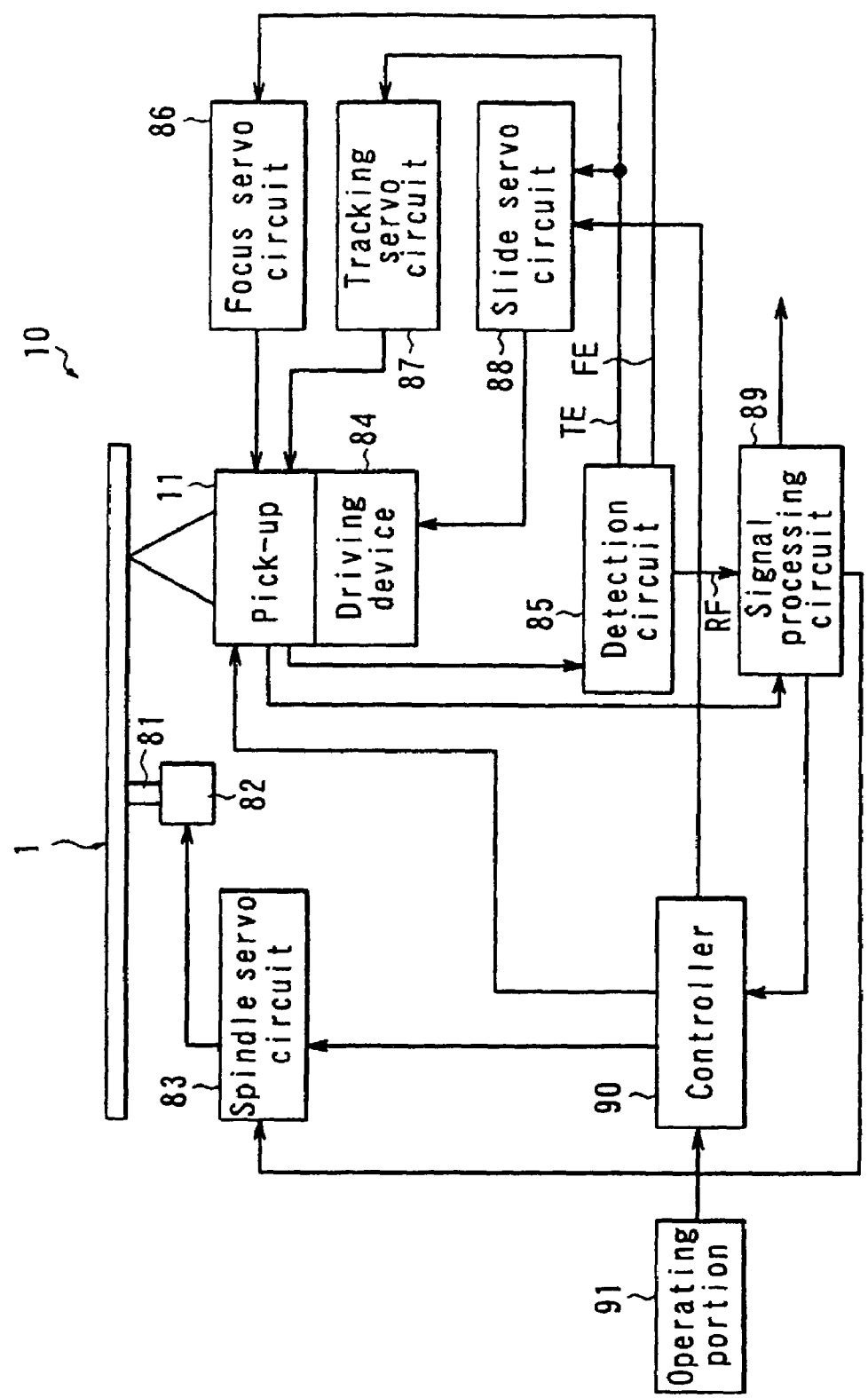
FIG. 2 is a block diagram of a general configuration of the optical information recording/reproducing apparatus according to the first embodiment.

Embodiments of the present invention will now be described in detail with reference to the drawings. A first embodiment of the invention is an example in which multiplex recording is realized using phase encoding multiplexing. FIG. 1 is an illustration showing a configuration of a pick-up of an optical information recording/reproducing apparatus as an optical information recording apparatus and an optical information reproducing apparatus according to the present embodiment and a configuration of an optical information recording medium according to the present embodiment. FIG. 2 is a block diagram of a general configuration of the optical information recording/reproducing apparatus according to the present embodiment.

First, the configuration of the optical information recording medium according to the present embodiment will be described with reference to FIG. 1. The optical information recording medium 1 is configured by forming: a hologram layer 3 as an information recording layer for recording information utilizing volume holography; a reflecting film 5; and a protective film 4 in the order listed on one surface of a disk-shaped transparent substrate 2 formed from polycarbonate or the like. A plurality of address servo areas 6 as positioning regions extending linearly in the radial direction are provided at predetermined angular intervals at the interface between the hologram layer 3 and the protective layer 4. Sections in the form of sectors between the adjoining address servo areas 6 are data areas 7. Information for performing focus servo and tracking servo using a sampled servo system and address information are recorded in advance in the form of emboss pits in the address servo areas 6. Focus servo can be performed using a reflecting surface of the reflecting film 5. For example, wobble pits may be used as the information for performing tracking servo. For example, the transparent substrate 2 has an appropriate thickness of 0.6 mm or less, and the hologram layer 3 has an appropriate thickness of 10 μm or more. The hologram layer 3 is formed of a hologram material whose optical characteristics such as a refractive index, permittivity and reflectivity change depending on the intensity of light when illuminated with the light. For example, photopolymer HRF-600 (product name) manufactured by DuPont or the like is used as such a hologram material. For example, the reflecting film 5 is formed of aluminum.

The configuration of the optical information recording/reproducing apparatus according to the present embodiment will now be described with reference to FIG. 2. An optical information recording/reproducing apparatus 10 has: a spindle 81 to which the optical information recording medium 1 is mounted; a spindle motor 82 for rotating the spindle 81; and a spindle servo circuit 83 for controlling the spindle motor 82 to keep the rotating speed of the optical information recording medium 1 at a predetermined value. The optical information recording/reproducing apparatus 10 further has: a pick-up 11 for recording information in the optical information recording medium 1 by illuminating it with information light and recording reference light and for reproducing the information recorded in the optical information recording medium 1 by illuminating the optical information recording medium 1 with reference light for reproduction and by detecting reproduction light; and a driver 84 for allowing the pick-up 11 to move in the radial direction of the optical information recording medium 1.

The optical information recording/reproducing apparatus 10 further has: a detection circuit 85 for detecting a focus error signal FE, a tracking error signal TE and a reproduction signal RF from a signal output by the pick-up 11; a focus servo circuit 86 for performing focus servo by driving an actuator in the pick-up 11 based on the focus error signal FE detected by the detection circuit 85 to move an objective lens in the direction of the thickness of the optical information recording medium 1; a tracking servo circuit 87 for performing tracking servo by driving the actuator in the pick-up 11 based on the tracking error signal TE detected by the detection circuit 85 to move the objective lens in the radial direction of the optical information recording medium 1; and a slide servo circuit 88 for performing slide servo by controlling the driver 84 based on the tracking error signal TE and a command from a controller to be described later to move the pick-up 11 in the radial direction of the optical information recording medium 1.

The optical information recording/reproducing apparatus 10 further has: a signal processing circuit 89 for reproducing data recorded in the data areas 7 of the optical information recording medium 1 by decoding data output by a CCD array to be described later in the pick-up 11 and for reproducing a basic clock and determining an address from the reproduction signal RF from the detection circuit 85; a controller 90 for controlling the optical information recording/reproducing apparatus 10 as a whole; and an operating portion 91 for supplying various instructions to the controller 90. The controller 90 receives input of the basic clock and address information output by the signal processing circuit 89 and controls the pick-up 11, spindle servo circuit 83, slide servo circuit 88 and the like. The basic clock output by the signal processing circuit 89 is input to the spindle servo circuit 83. The controller 90 has a CPU (central processing unit), a ROM (read only memory) and a RAM (random access memory), and the CPU executes programs stored in the ROM using the RAM as a work area to realize the functions of the controller 90.

The detection circuit 85, focus servo circuit 86, tracking servo circuit 87 and slide servo circuit 88 correspond to the position control means according to the invention.

A configuration of the pick-up 11 of the present embodiment will now be described with reference to FIG. 1. The pick-up 11 has: an objective lens 12 which faces the transparent substrate 2 of the optical information recording medium 1 when the optical information recording medium 1 is secured to the spindle 81; an actuator 13 capable of moving the objective lens 12 in the direction of the thickness of the optical information recording medium 1 and the radial direction of the same; and a double optically rotating plate 14 and a prism block 15 which are disposed on the side of the objective lens 12 opposite to the optical information recording medium 1 in the order listed which is the order of their closeness to the objective lens 12. The double optically rotating plate 14 has: an optically rotating plate 14L provided on the left side of the optical axis in FIG. 1; and an optically rotating plate 14R provided on the right side of the optical axis in FIG. 1. The optically rotating plate 14L optically rotates a polarizing direction at +45°, and the optically rotating plate 14R optically rotates a polarizing direction at −45°. The prism block 15 has a half-reflecting surface 15a and a reflecting surface 15b which are arranged in the order listed which is the order of their closeness to the double optically rotating plate 14. The normal directions of both of the half-reflecting surface 15a and the reflecting surface 15b are at 45° to the direction of the optical axis of the objective lens 12 and are in parallel with each other.

The pick-up 11 further has a prism block 19 provided on a side of the prism block 15. The prism block 19 has: a reflecting surface 19a which is provided in a position associated with the half-reflecting surface 15a of the prism block 15 and which is in parallel with the half-reflecting surface 15a; and a half-reflecting surface 19b which is provided in a position associated with the reflecting surface 15b and which is in parallel with the reflecting surface 15b.

The pick-up 11 further has a convex lens 16 and a phase-spatial light modulator 17 which are provided between the prism blocks 15 and 19 in positions associated with the half-reflecting surface 15a and reflecting surface 19a, and has a spatial light modulator 18 provided between the prism blocks 15 and 19 in a position associated with the reflecting surface 15b and the half-reflecting surface 19b.

The phase-spatial light modulator 17 has a multiplicity of pixels arranged in the form of a grid and is capable of spatially modulating the phase of light by selecting a phase for light emitted by each of the pixels. A liquid crystal element may be used as the phase-spatial light modulator 17. The phase-spatial light modulator 17 corresponds to the phase modulation means according to the invention.

The spatial light modulator 18 has a multiplicity of pixels arranged in the form of a grid and is capable of generating information light carrying information by spatially modulating light in terms of intensity by selecting a light transmitting state or a light blocking state for each of the pixels. A liquid crystal element may be used as the spatial light modulator 18. The spatial light modulator 18 constitutes the information light generation means according to the invention.

The pick-up 11 further has a CCD array 20 as detection means provided in a direction in which return light from the optical information recording medium 1 is reflected by the half-reflecting surface 19b of the prism block 19 after being transmitted by the spatial light modulator 18.

The pick-up 11 further has a beam splitter 23, a collimator lens 24 and a light source device 25 which are provided on the side of the prism block 19 opposite to the spatial light modulator 18 in the order listed which is the order of their closeness to the prism block 19. The beam splitter 23 has a half-reflecting surface 23a whose normal direction is tilted at an angle of 45° to the direction of the optical axis of the collimator lens 24. The light source device 25 emits coherent linearly polarized light and may be, for example, a semiconductor laser.

Figure 3:
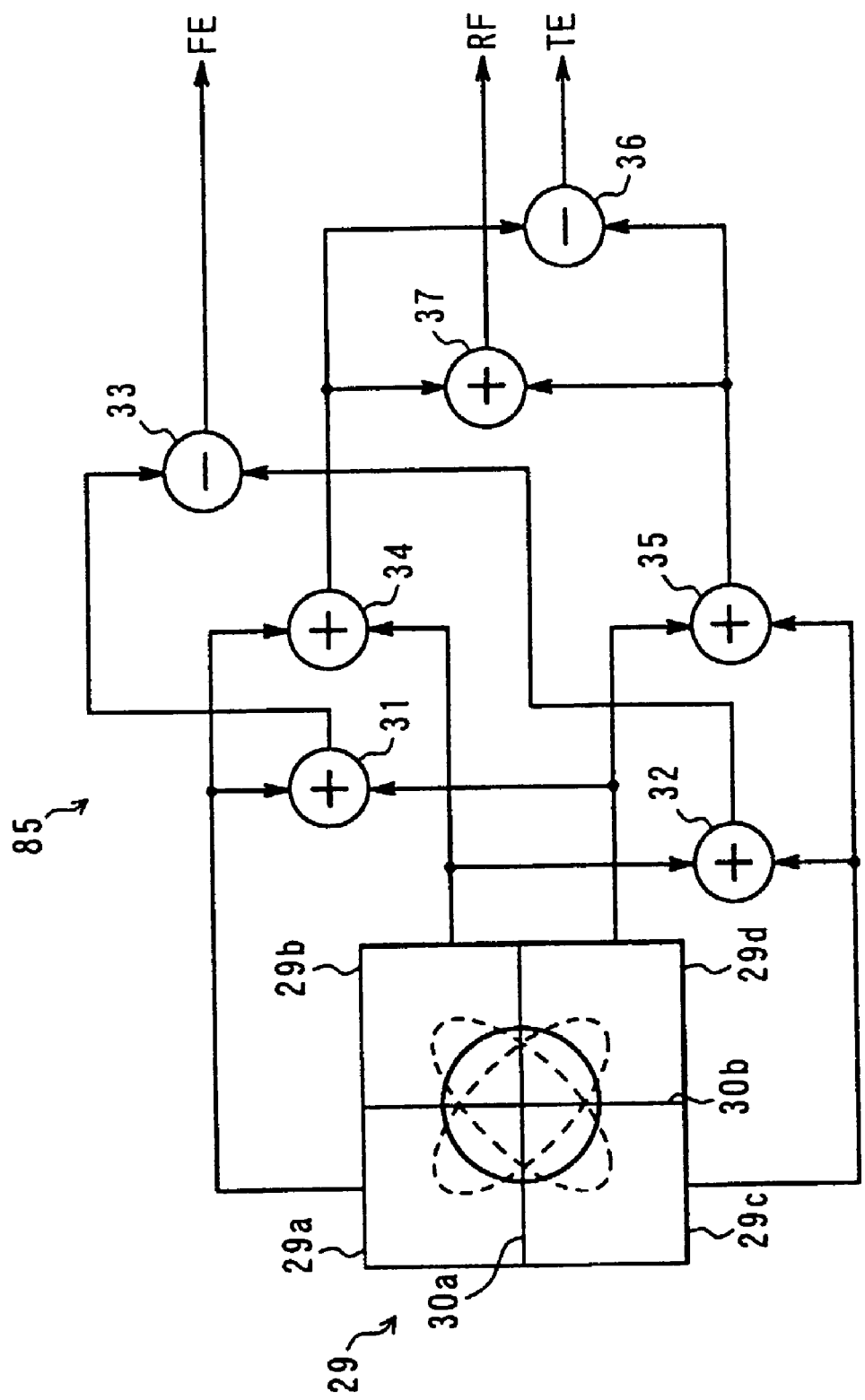
FIG. 3 is a block diagram of a configuration of the detection circuit in FIG. 2.

The pick-up 11 further has: a photodetector 26 provided in a direction in which light from the light source device 25 is reflected by the half-reflecting surface 23a of the beam splitter 23; and a convex lens 27, a cylindrical lens 28 and a quadruple photodetector 29 which are provided on the side of the beam splitter 23 opposite to the photodetector 26 in the order listed which is the order of their closeness to the beam splitter 23. The photodetector 26 receives light from the light source device 25, and the output of the same is used to adjust the output of the light source device 25 automatically. As shown in FIG. 3, the quadruple photodetector 29 has four light-receiving portions 29a through 29d divided by a division line 30a in parallel with a direction corresponding to the direction of tracks of the optical information recording medium 1 and a division line 30b orthogonal thereto. The cylindrical lens 28 is provided such that the central axis of the cylindrical surface thereof is at an angle of 45° to the division lines 30a and 30b of the quadruple photodetector 29.

The phase-spatial light modulator 17, the spatial light modulator 18 and the light source device 25 in the pick-up 11 are controlled by the controller 90 in FIG. 2. The controller 90 has information of a plurality of modulation patterns for spatially modulating the phase of light with the phase-spatial light modulator 17. The operating portion 91 allows selection of any one of the plurality of modulation patterns. The controller 90 supplies information of a modulation pattern selected by itself or by the operating portion 91 to the phase-spatial light modulator 17 in accordance with predetermined conditions, and the phase-spatial light modulator 17 spatially modulates the phase of light, in accordance with the modulation pattern information supplied by the controller 90, in the modulation pattern associated therewith in accordance with the information.

The reflectivity of each of the half-reflecting surfaces 15a and 19b in the pick-up 11 is appropriately set, for example, such that information light and reference light for recording incident upon the optical information recording medium 1 have the same intensity.

FIG. 3 is a block diagram of the detection circuit 85 for detecting the focus error signal FE, the tracking error signal TE and the reproduction signal RF based on the output of the quadruple photodetector 29. The detection circuit 85 has: an adder 31 for adding the output of each of the diagonal light-receiving portions 29a and 29d of the quadruple photodetector 29; an adder 32 for adding the output of each of the diagonal light-receiving portions 29b and 29c of the quadruple photodetector 29; a subtracter 33 for calculating the difference between the outputs of the adders 31 and 32 to generate the focus error signal FE based on an astigmatic method; an adder 34 for adding the output of each of the light-receiving portions 29a and 29b of the quadruple photodetector 29 which are adjacent to each other in the direction of tracks thereof; an adder 35 for adding the output of each of the light-receiving portions 29c and 29d of the quadruple photodetector 29 which are adjacent to each other in the direction of the tracks thereof; a subtracter 36 for calculating the difference between the outputs of the adders 34 and 35 to generate the tracking error signal TE based on a push-pull method; and an adder 37 for adding the outputs of the adders 34 and 35 to generate the reproduction signal RF. In the present embodiment, the reproduction signal RF is a signal which is the reproduction of the information recorded in the address servo areas 6 of the optical information recording medium 1.

Servo, recording and reproducing operations of the optical information recording/reproducing apparatus according to the present embodiment will now be separately described in that order. In any of the servo, recording and reproducing operations, the optical information recording medium 1 is rotated by the spindle motor 82 under control to maintain a predetermined rotating speed.

A servo operation will now be described with reference to FIG. 4. During a servo operation, all pixels of the spatial light modulator 18 are in a transmitting state. The output of the emission of light from the light source device 25 is set at a low output for reproduction. The controller 90 predicts the timing at which light that has exited the objective lens 12 passes through the address servo areas 6 based on a basic clock reproduced from a reproduction signal RF and maintains the above-described setting while the light from the objective lens 12 passes through the address servo areas 6.

Light emitted by the light source device 25 is collimated by the collimator lens 24 to impinge upon the beam splitter 23, and a part of the quantity of light is transmitted by the half-reflecting surface 23a and another part is reflected thereby. The light reflected by the half-reflecting surface 23a is received by the photodetector 26. The light transmitted by the half-reflecting surface 23a impinges upon the prism block 19, and a part of the quantity of light is transmitted by the half-reflecting surface 19b. The light transmitted by the half-reflecting surface 19b passes through the spatial light modulator 18 to be reflected by the reflecting surface 15b of the prism block 15, and a part of the quantity of light is transmitted by the half-reflecting surface 15a, passes through the double optically rotating plate 14, and is collected by the objective lens 12 to be projected upon the optical information recording medium 1 such that it converges at the interface between the hologram layer 3 and the protective layer 4 of the optical information recording medium 1. This light is reflected by the reflecting film 5 of the optical information recording medium 1, modulated by embossed pits in the address servo areas 6 while being reflected, and then returned to the objective lens 12.

The return light from the optical information recording medium 1 is collimated by the objective lens 12 and passes through the double optically rotating plate 14 again to impinge upon the prism block 15, and a part of the quantity of light is transmitted by the half-reflecting surface 15a. The return light transmitted by the half-reflecting surface 15a is reflected by the reflecting surface 15a and is transmitted by the spatial light modulator 18, and a part of the quantity of light is transmitted by the half-reflecting surface 19b of the prism block 19. The return light transmitted by the half-reflecting surface 19b impinges upon the beam splitter 23, and a part of the quantity of light is reflected by the half-reflecting surface 23a, passes through the convex lens 27 and cylindrical lens 28 sequentially, and is then detected by the quadruple photodetector 29. Based on the output of the quadruple photodetector 29, the detection circuit 85 shown in FIG. 3 generates the focus error signal FE, tracking error signal TE and reproduction signal RF based on which focus servo and tracking servo is performed; the basic clock is generated; and addresses are determined.

In the above-described setting for servo, the pick-up 11 is configured similarly to a configuration of a pick-up for recording on or reproduction from normal optical disks such as CDs (compact disks), DVDs (digital video disks or digital versatile disks) and HSs (hyper storage disks). It is therefore possible to configure the optical information recording/reproducing apparatus 10 according to the present embodiment to be compatible with normal optical disk devices.

Figure 10:
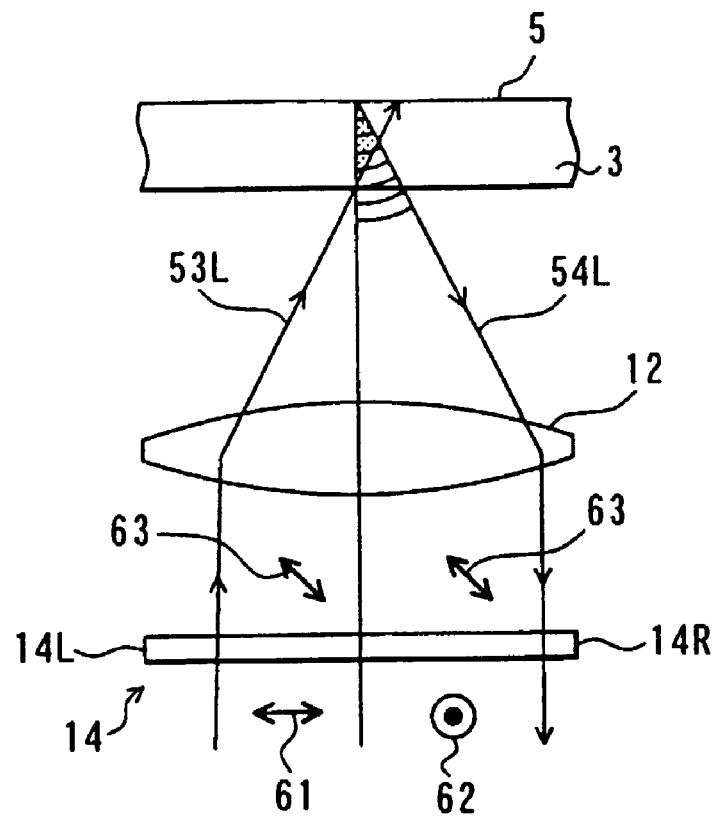
FIG. 10 is an illustration of a state of light in the pick-up in the state shown in FIG. 9.

A definition will now be given to terms "A-polarized lights" and "B-polarized lights" which will be used in the following description. As shown in FIG. 10, A-polarized light is linear polarized light obtained by rotating the polarizing direction of S-polarized light at −45° or by rotating the polarizing direction of P-polarized light at +45°, and B-polarized light is linear polarized light obtained by rotating the polarizing direction of S-polarized light at +45° or by rotating the polarizing direction of P-polarized light at −45°. The polarizing directions of the A-polarized light and B-polarized light are orthogonal to each other. S-polarized light is linear polarized light whose polarizing direction is perpendicular to the plane of incidence (plane of FIG. 1), and P-polarized light is linear polarized light whose polarizing direction is in parallel with the plane of incidence.

Figure 6:
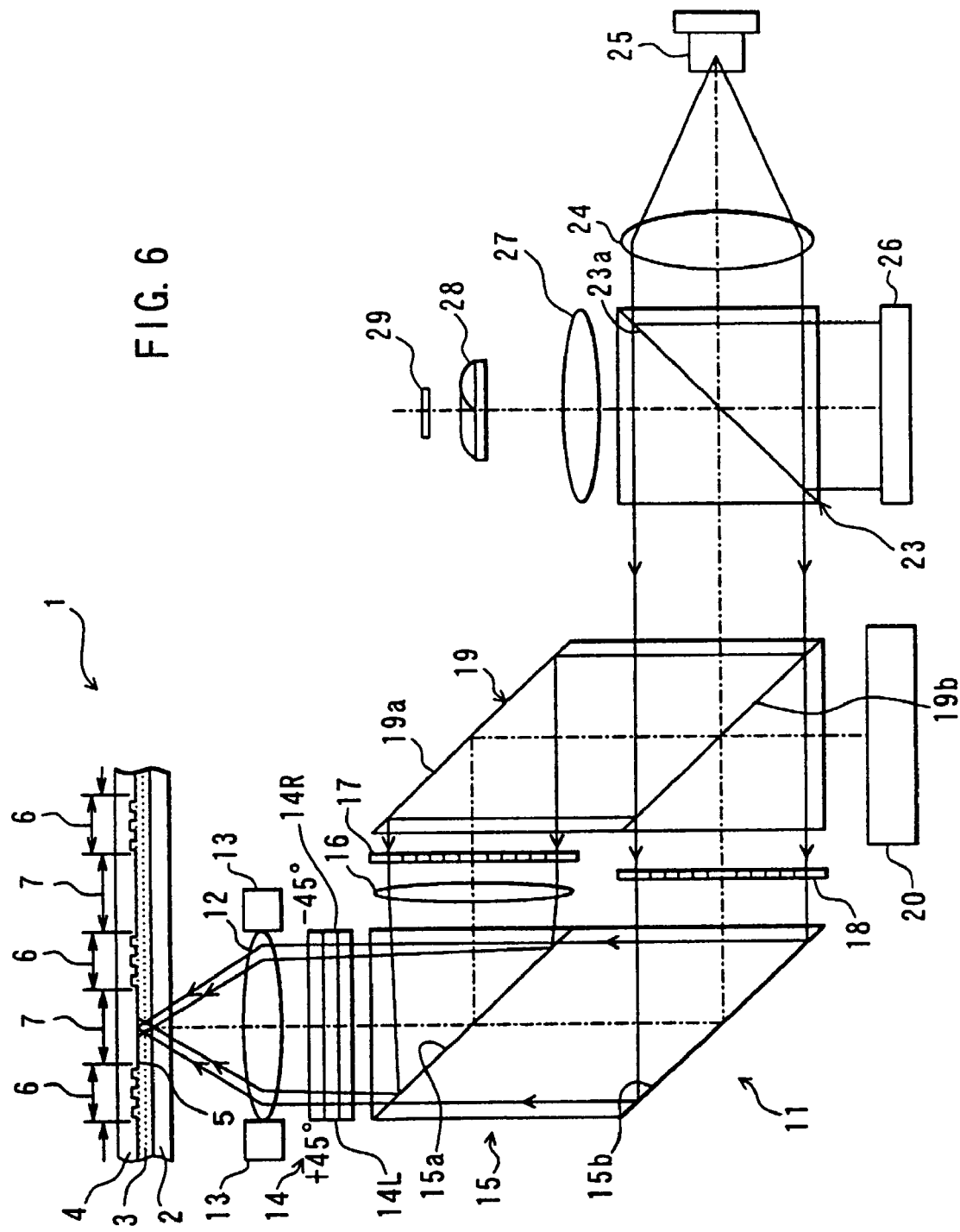
FIG. 6 is an illustration of a state of the pick-up shown in FIG. 1 during recording.

A recording operation will now be described. FIG. 6 is an illustration of a state of the pick-up 11 during recording. During recording, the spatial light modulator 18 generates information light by selecting a transmitting state (hereinafter also referred to as "on") or a blocking state (hereinafter also referred to as "off") for each pixel depending on the information to be recorded to spatially modulate the light that is passing through it. According to the present embodiment, two pixels represent information of one bit, and one of two pixels associated with information of one bit is always on and the other is always off.

The phase-spatial light modulator 17 generates reference light for recording having a spatially modulated phase by selectively applying a phase difference of 0 (rad) or π (rad) from a predetermined reference phase to each pixel according to a predetermined modulation pattern to spatially modulate the phase of light passing therethrough. The controller 90 supplies information of a modulation pattern selected by itself or by the operating portion 91 in accordance with predetermined conditions to the phase-spatial light modulator 17 which in turn spatially modulates the phase of light passing therethrough according to the modulation pattern information supplied by the controller 90.

The output of light emitted by the light source device 25 is set at a high output to be used for recording in terms of the pulse thereof. Based on the basic clock reproduced from the reproduction signal RF, the controller 90 predicts timing at which light that has exited the objective lens 12 passes through the data areas 7 and maintains the above-described setting while the light from the objective lens 12 is passing through the data areas 7. While the light from the objective lens 12 is passing through the data areas 7, neither focus servo nor tracking servo is performed, and the objective lens 12 is fixed. The following description is on an assumption that the light source device 25 emits P-polarized light.

As shown in FIG. 6, P-polarized light emitted by the light source device 25 is collimated by the collimator lens 24 to impinge upon the beam splitter 23, and a part of the quantity of light is transmitted by the half-reflecting surface 23a to impinge upon the prism block 19. A part of the light incident upon the prism block 19 is transmitted by the half-reflecting surface 19b, and another part of the quantity of light is reflected by the half-reflecting surface 19b. The light transmitted by the half-reflecting surface 19b passes through the spatial light modulator 18 in which it is spatially modulated into information light according to the information to be recorded. The information light is reflected by the reflecting surface 15b of the prism block 15, and a part of the quantity of light is transmitted by the half-reflecting surface 15a to pass through the double optically rotating plate 14. The polarizing direction of light passing through the optically rotating plate 14L of the double optically rotating plate 14 is rotated at +45° to provide A-polarized light, and the polarizing direction of light passing through the optically rotating plate 14R is rotated at −45° to provide B-polarized light. The information light having passed through the double optically rotating plate 14 is collected by the objective lens 12 and is projected upon the optical information recording medium 1 such that it converges on the interface between the hologram layer 3 and the protective layer 4, i.e., on the reflecting film 5 of the optical information recording medium 1.

The light reflected by the half-reflecting surface 19b of the prism block 19 is reflected by the reflecting surface 19a to pass through the phase-spatial light modulator 17 in which the phase of light is spatially modulated according to a predetermined modulation pattern to provide reference light for recording. The reference light for recording passes through the convex lens 16 to become convergent light. A part of the reference light for recording is reflected by the half-reflecting surface 15a of the prism block 15 to pass through the double optically rotating plate 14. The polarizing direction of light which has passed through the optically rotating plate 14L of the double optically rotating plate 14 is rotated at +45° to provide A-polarized light, and the polarizing direction of light which has passed through the optically rotating plate 14R is rotated at −45° to provide B-polarized light. The reference light for recording which has passed through the double optically rotating plate 14 is collected by the objective lens 12 to be projected upon the optical information recording medium 1. The light temporarily converges to a minimum diameter before the interface between the hologram layer 3 and the protective layer 4, and thereafter divergingly passes through the hologram layer 3.

Figure 7:
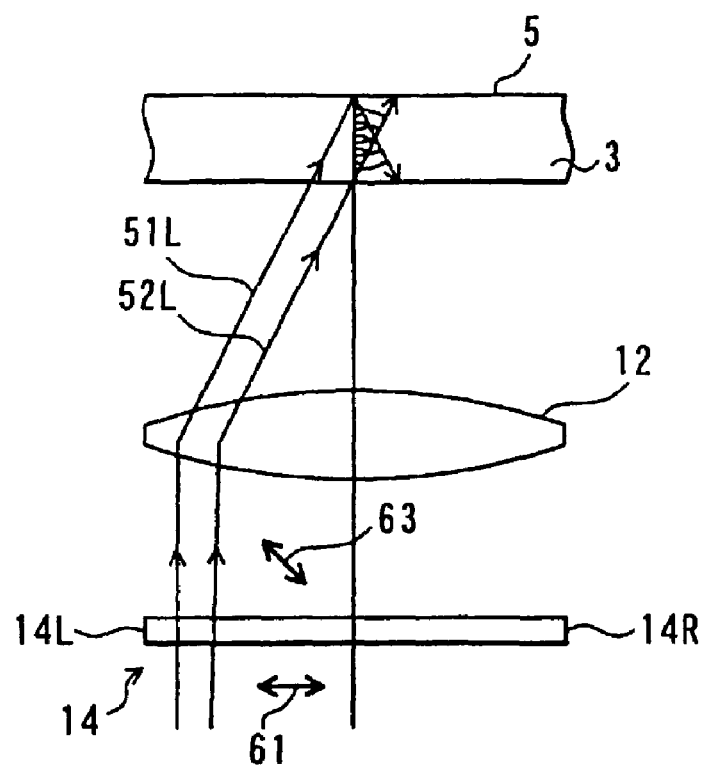
FIG. 7 is an illustration of a state of light in the pick-up in the state shown in FIG. 6.
Figure 8:
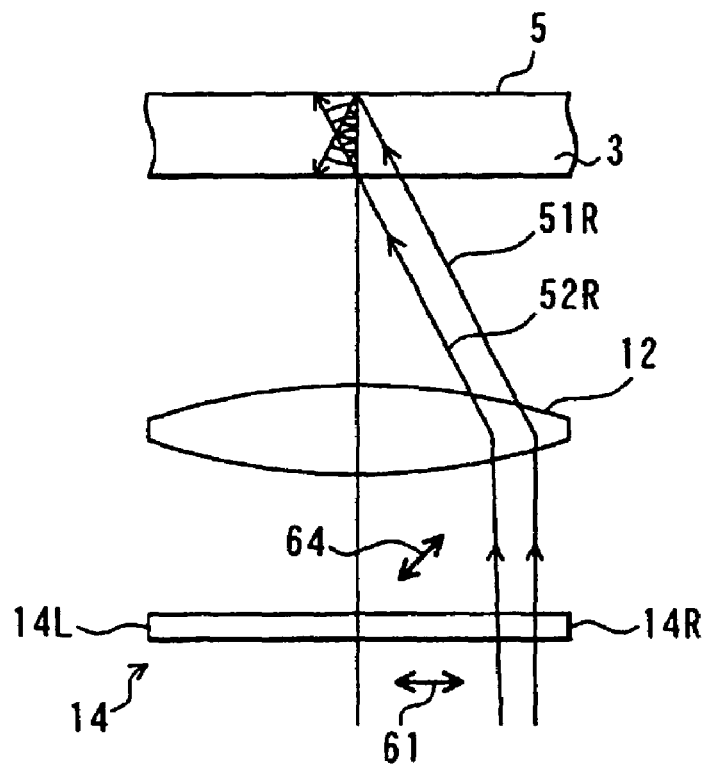
FIG. 8 is an illustration of a state of light in the pick-up in the state shown in FIG. 6.

FIGS. 7 and 8 are illustrations of states of light during recording. In those figures, the reference number 61 represents P-polarized light; the reference number 63 represents A-polarized light; and the reference number 64 represents B-polarized light.

As shown in FIG. 7, information light 51L which has passed through the optically rotating plate 14L of the double optically rotating plate 14 becomes A-polarized light which illuminates the optical information recording medium 1 through the objective lens 12, passes through the hologram layer 3, converges to a minimum diameter on the reflecting film 5 and passes through the hologram layer 3 again after being reflected by the reflecting film 5. Reference light 52L for recording which has passed through the optically rotating plate 14L of the double optically rotating plate 14 becomes A-polarized light which illuminates the optical information recording medium 1 through the objective lens 12, temporarily converges to a minimum diameter before the interface between the hologram layer 3 and the protective layer 4 and divergingly passes through the hologram layer 3. Interference occurs in the hologram layer 3 between the A-polarized information light 51L reflected by the reflecting film 5 and the A-polarized reference light 52L for recording traveling toward the reflecting film 5, so that an interference pattern is formed, and the interference pattern is volumetrically recorded in the hologram layer 3 when the light emitted by the light source device 20 is at the high output.

As shown in FIG. 8, information light 51R which has passed through the optically rotating plate 14R of the double optically rotating plate 14 becomes B-polarized light which illuminates the optical information recording medium 1 through the objective lens 12, passes through the hologram layer 3, converges to a minimum diameter on the reflecting film 5 and passes through the hologram layer 3 again after being reflected by the reflecting film 5. Reference light 52R for recording which has passed through the optically rotating plate 14R of the double optically rotating plate 14 becomes B-polarized light which illuminates the optical information recording medium 1 through the objective lens 12, temporarily converges to a minimum diameter before the interface between the hologram layer 3 and the protective layer 4 and divergingly passes through the hologram layer 3. Interference occurs in the hologram layer 3 between the B-polarized information light 51R reflected by the reflecting film 5 and the B-polarized reference light 52R for recording traveling toward the reflecting film 5, so that an interference pattern is formed, and the interference pattern is volumetrically recorded in the hologram layer 3 when the light emitted by the light source device 20 is at the high output.

As shown in FIGS. 7 and 8, according to the present embodiment, the information light and the reference light for recording illuminate the hologram layer 3 on the same side thereof such that the optical axes of the information light and the reference light for recording are located on the same line.

According to the present embodiment, phase-encoding multiplexing can be performed to record information in the same location of the hologram layer 3 on a multiplex basis by performing the recording operation a plurality of times in the same location of the hologram layer 3 with the modulation pattern for the reference light for recording changed.

According to the present embodiment, a reflection type (Lippmann type) hologram is thus formed in the hologram layer 3. No interference occurs between the A-polarized information light 51L and the B-polarized reference light 52R for recording because their polarizing directions are orthogonal to each other and, similarly, no interference occurs between the B-polarized information light 51R and the A-polarized reference light 52L for recording because their polarizing directions are orthogonal to each other. Thus, the present embodiment makes it possible to prevent the occurrence of any unnecessary interference fringe, thereby preventing any reduction in an SN (signal-to-noise) ratio.

According to the present embodiment, as described above, the information light is projected upon the optical information recording medium 1 such that it converges to a minimum diameter on the interface between the hologram layer 3 and the protective layer 4, and is reflected by the reflecting film 5 of the optical information recording medium 1 to return to the objective lens 12. The return light is incident upon the quadruple photodetector 29 in the same manner as in the servo operation. According to the present embodiment, it is therefore possible to perform focus servo also during recording utilizing the light incident upon the quadruple photodetector 29. Since the reference light for recording converges to a minimum diameter before the interface between the hologram layer 3 and the protective layer 4 in the optical information recording medium 1 to become divergent light, it forms no image on the quadruple photodetector 29 even though it is reflected by the reflecting film 5 of the optical information recording medium 1 to return to the objective lens 12.

According to the present embodiment, the size of a region (hologram) in which one interference pattern resulting from information light and reference light is volumetrically recorded in the hologram 3 can be arbitrarily determined by moving the convex lens 16 back and forth or changing the magnification of the same.

A reproducing operation will now be described with reference to FIG. 9. During reproduction, all pixels of the spatial light modulator 18 are on. The controller 90 supplies information of a modulation pattern for the reference light for recording which was supplied at recording of the information which is now to be reproduced to the phase-spatial light modulator 17, and the phase-spatial light modulator 17 spatially modulates the phase of light passing therethrough according to the modulation pattern information supplied by the controller 90 to generate reference light for reproduction having a spatially modulated optical phase.

The output of the light emitted by the light source device 25 is set at a low output to be used for reproduction. Based on the basic clock reproduced from the reproduction signal RF, the controller 90 predicts timing at which light that has exited the objective lens 12 passes through the data areas 7 and maintains the above-described setting while the light from the objective lens 12 is passing through the data areas 7. While the light from the objective lens 12 is passing through the data areas 7, neither focus servo nor tracking servo is performed, and the objective lens 12 is fixed.

Figure 9:
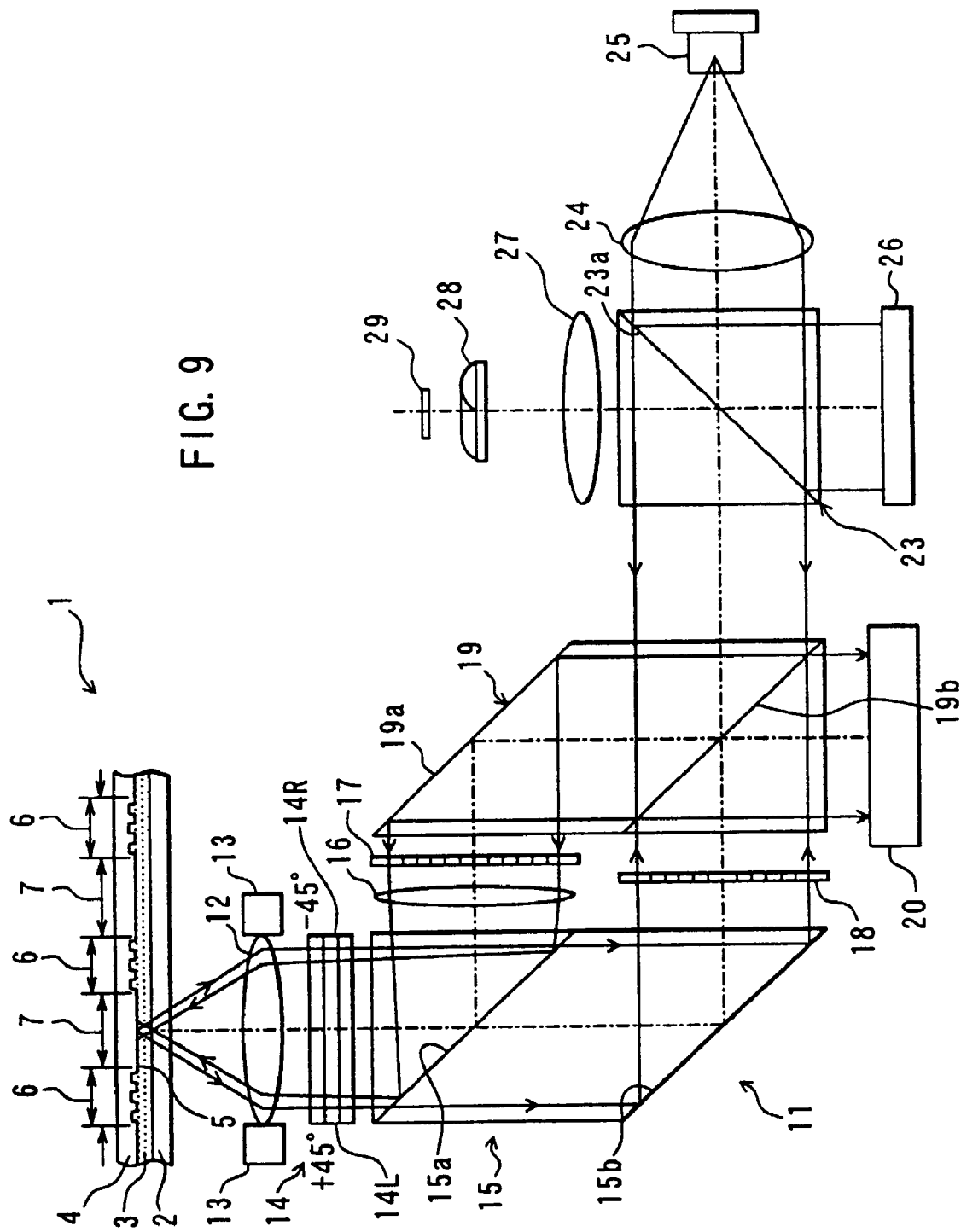
FIG. 9 is an illustration of a state of the pick-up shown in FIG. 1 during reproduction.

As shown in FIG. 9, P-polarized light emitted by the light source device 25 is collimated by the collimator lens 24 to impinge upon the beam splitter 23, and a part of the quantity of light is transmitted by the half-reflecting surface 23a to impinge upon the prism block 19. A part of the light incident upon the prism block 19 is reflected by the half-reflecting surface 19b. The reflected light is reflected by the reflecting surface 19a to pass through the phase-spatial light modulator 17 and, at that time, the phase of the light is spatially modulated in a predetermined modulation pattern to provide reference light for reproduction. The reference light for reproduction passes through the convex lens 16 to become convergent light. A part of the quantity of the reference light for reproduction is reflected by the half-reflecting surface 15a of the prism block 15 to pass through the double optically rotating plate 14. The polarizing direction of light passing through the optically rotating plate 14L of the double optically rotating plate 14 is rotated at +45° to provide A-polarized light, and the polarizing direction of light passing through the optically rotating plate 14R is rotated at −45° to provide B-polarized light. The reference light for reproduction that has passed through the double optically rotating plate 14 is collected by the objective lens 12 and is projected upon the optical information recording medium 1. It temporarily converges to a minimum diameter before the interface between the hologram layer 3 and the protective layer 4, and thereafter divergingly passes through the hologram layer 3.

Figure 11:
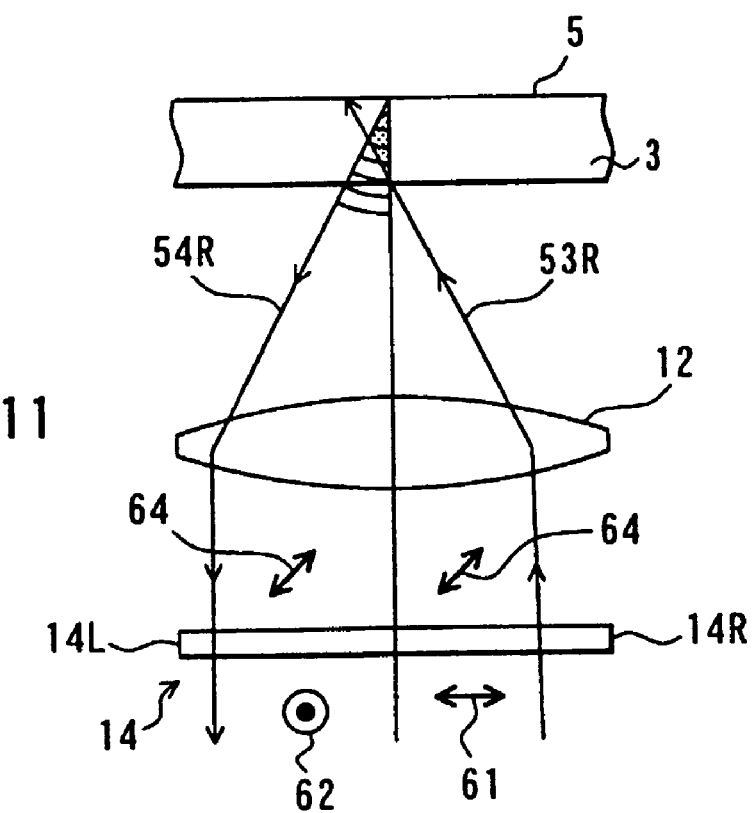
FIG. 11 is an illustration of a state of light in the pick-up in the state shown in FIG. 9.

FIGS. 10 and 11 are illustrations of states of light during reproduction. The reference number 61 represents P-polarized light; the reference number 62 represents S-polarized light; the reference number 63 represents A-polarized light; and the reference number 64 represents B-polarized light.

As shown in FIG. 10, reference light 53L for reproduction which has passed through the optically rotating plate 14L of the double optically rotating plate 14 becomes A-polarized light which illuminates the optical information recording medium 1 through the objective lens 12, temporarily converges to a minimum diameter before the interface between the hologram layer 3 and the protective layer 4, and thereafter divergingly passes through the hologram layer 3. As a result, the hologram layer 3 generates reproduction light 54L that is associated with the information light 51L for recording. The reproduction light 54L travels toward the objective lens 12 to be collimated by the objective lens 12, and passes through the double optically rotating plate 14 again to become S-polarized light.

As shown in FIG. 11, reference light 53R for reproduction which has passed through the optically rotating plate 14R of the double optically rotating plate 14 becomes B-polarized light which illuminates the optical information recording medium 1 through the objective lens 12, temporarily converges to a minimum diameter before the interface between the hologram layer 3 and the protective layer 4, and thereafter divergingly passes through the hologram layer 3. As a result, the hologram layer 3 generates reproduction light 54R that is associated with the information light 51R for recording. The reproduction light 54R travels toward the objective lens 12 to be collimated by the objective lens 12, and passes through the double optically rotating plate 14 again to become S-polarized light.

The reproduction light which has passed through the double optically rotating plate 14 impinges upon the prism block 15, and a part of the quantity of light is transmitted by the half-reflecting surface 15a. The reproduction light transmitted by the half-reflecting surface 15a is reflected by the half-reflecting surface 15a to pass through the spatial light modulator 18, and a part of the quantity of light is reflected by the half-reflecting surface 19b of the prism block 19 to be incident upon and detected by the CCD array 20. A pattern originating from an on/off operation of the spatial light modulator 18 during recording is formed on the CCD array 20, and information is reproduced by detecting this pattern.

When a plurality of pieces of information are recorded in the hologram layer 3 on a multiplex basis by varying the modulation pattern for reference light for recording, only information associated with reference light for recording having the same modulation pattern as that of the reference light for reproduction is reproduced among the plurality of pieces of information.

As shown in FIGS. 10 and 11, according to the present embodiment, the illumination with the reference light for reproduction and the collection of reproduction light is carried out on the same side of the hologram layer 3 such that the optical axes of the reference light for reproduction and the reproduction light are located on the same line.

According to the present embodiment, a part of the reproduction light impinges upon the quadruple photodetector 29 similarly to the return light during the servo operation. The present embodiment therefore makes it possible to perform focus servo even during reproduction utilizing the light incident upon the quadruple photodetector 29. Since the reference light for reproduction converges to a minimum diameter before the interface between the hologram layer 3 and the protective layer 4 of the optical information recording medium 1 to become divergent light, it forms no image on the quadruple photodetector 29 when it is reflected by the reflecting film 5 of the optical information recording medium 1 to return toward the objective lens 12.

Figure 12A:
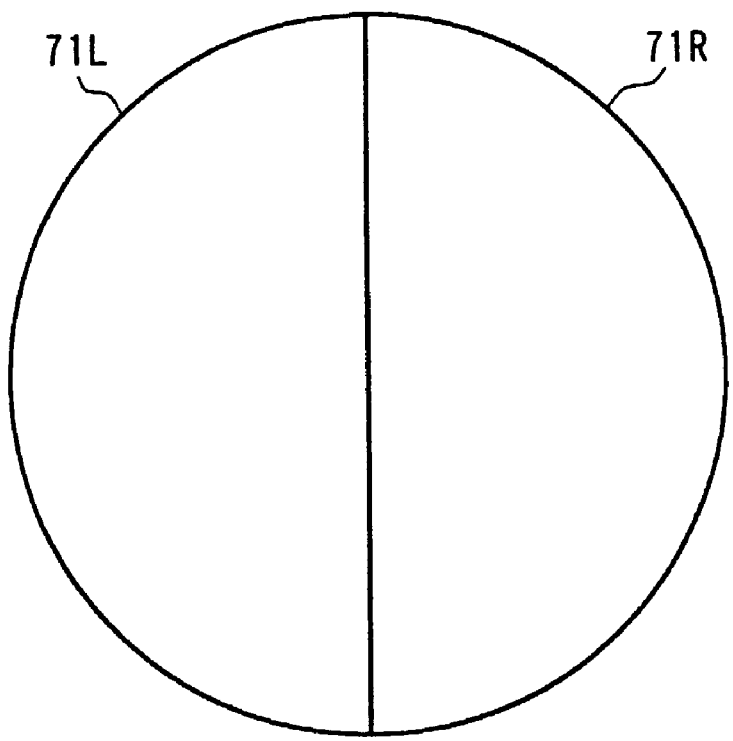
FIGS. 12A and 12B are illustrations for explaining a method for recognizing a reference position in a pattern of reproduction light from data detected by the CCD array in FIG. 1.
Figure 12B:
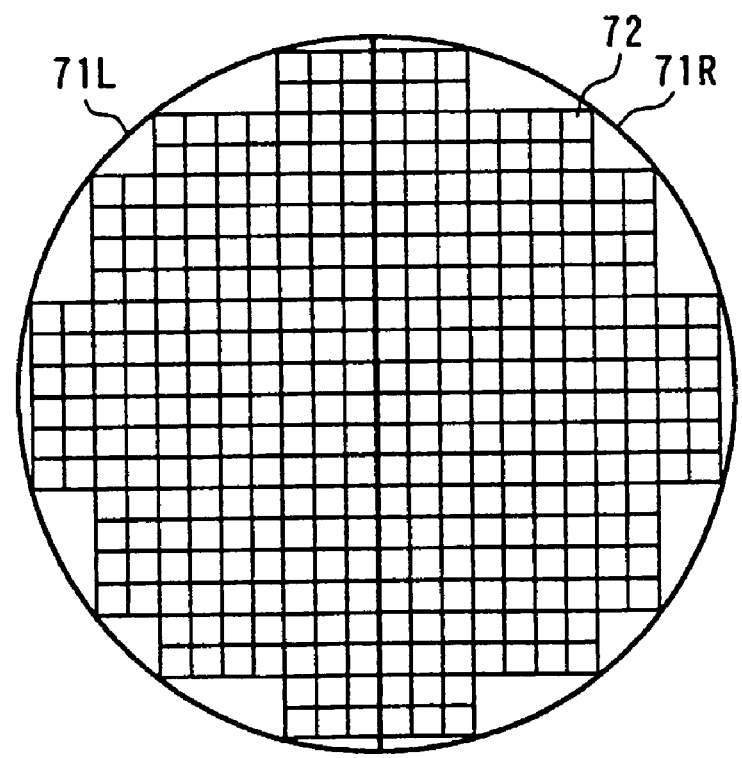
Figure 13A:
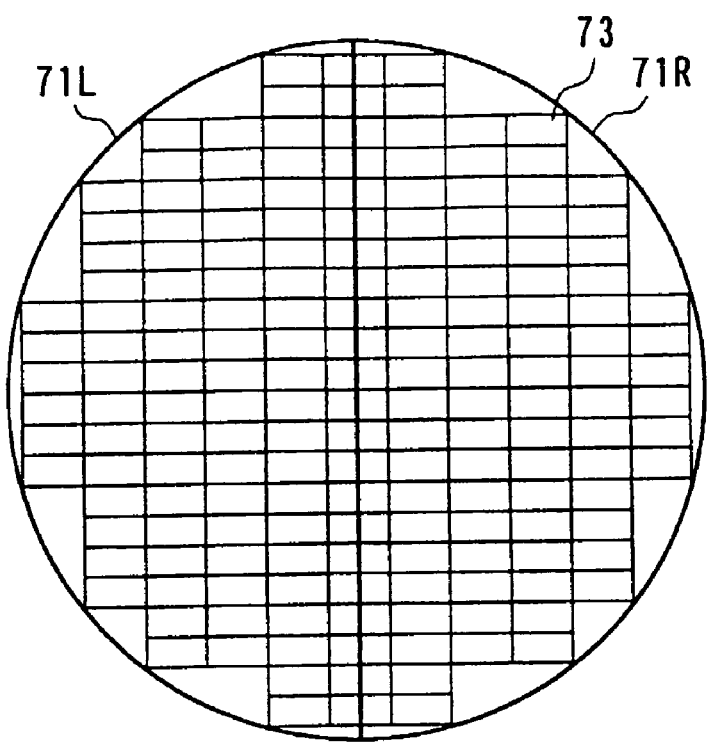
FIGS. 13A and 13B are illustrations for explaining a method for recognizing a reference position in a pattern of reproduction light from data detected by the CCD array in FIG. 1.
Figure 13B:
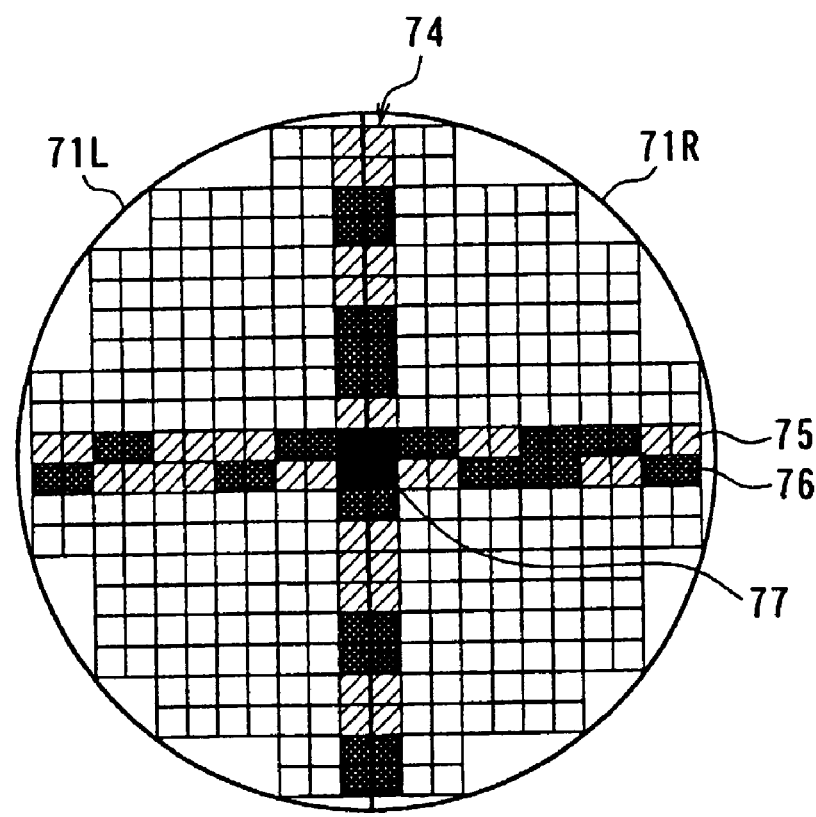

When a two-dimensional pattern of reproduction light is detected by the CCD array 20, it is required that the reproduction light and the CCD array 20 are accurately positioned or that a reference position in the pattern of the reproduction light is recognized from data detected by the CCD array 20. In the present embodiment, the latter is employed. A description will now be made with reference to FIGS. 12A, 12B, 13A and 13B on a method for recognizing a reference position of a pattern of reproduction light from data detected by the CCD array 20. As shown in FIG. 12A, the aperture of the pick-up 11 is divided by the double optically rotating plate 14 into two regions 71L and 71R which are symmetric about the optical axis thereof. Further, as shown in FIG. 12B, the aperture is divided by the spatial light modulator 18 into a plurality of pixels 72. Such a pixel 72 serves as a minimum unit of two-dimensional pattern data. According to the present embodiment, two pixels represent one bit of digital data "0" or "1". One of two pixels associated with one bit of information is on, and the other is off. A pair of pixels which are both on or off represent error data. Thus, the representation of one bit of digital data with two pixels provides advantages including an improvement in data detecting accuracy achieved by differential detection. FIG. 13A shows a pair of pixels 73 associated with one bit of digital data. The region where such a pair 73 exists is hereinafter referred to as "data regions". In the present embodiment, reference position information indicating a reference position in a pattern of reproduction light is included in the information light utilizing the fact that a pair of pixels which are both on or off represent error data. Specifically, as shown in FIG. 13B, error data are intentionally provided in a predetermined pattern in a cross-shaped region 74 constituted by a part in parallel with the division line of the double optically rotating plate 14 having a width equal to two pixels and a part perpendicular to the division line having a width equal to two pixels. This pattern of error data is hereinafter referred to as "pixel pattern for tracking". The pixel pattern for tracking serves as the reference position information. In FIG. 13B, the reference number 75 represents pixels which are on, and the reference number 76 represents pixels that are off. A region 77 consisting of four pixels in the middle is always kept off.

Figure 14A:
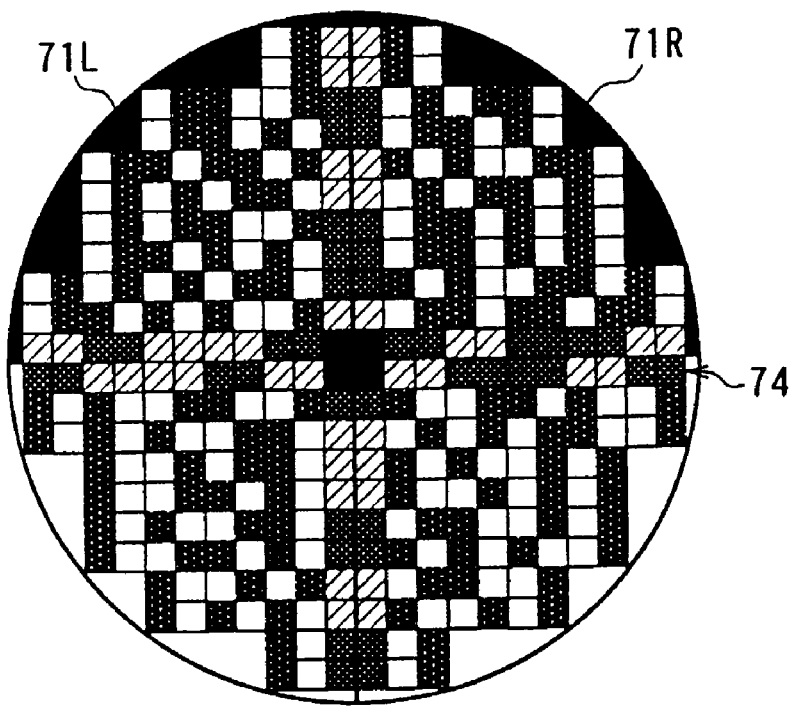
FIGS. 14A and 14B are illustrations of a pattern of information light and a pattern of reproduction light in the pick-up shown in FIG. 1.

A two-dimensional pattern as shown in FIG. 14A is obtained by combining a pixel pattern for tracking with a pattern associated with data to be recorded. In the present embodiment, regions other than the data regions are off in the upper half of the figure and are on in the lower half, and pixels in the data regions which are contiguous with the regions other than the data regions are in a state which is the reverse of the state of the regions other than the data regions, i.e., they are on if the regions other than the data regions are off, and are off if the regions other than the data regions are on. It is therefore possible to clearly detect the boundary of data regions from data detected by the CCD array 20.

Figure 14B:
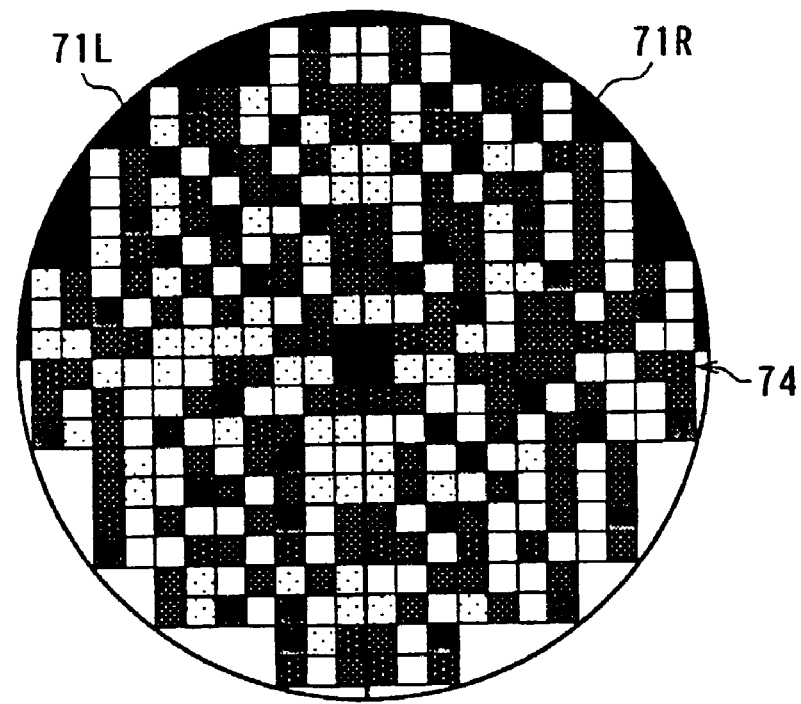

During recording, a pattern is recorded in the hologram layer 3 which originates from interference between information light spatially modulated according to a two-dimensional pattern as shown in FIG. 14A and reference light for recording. As shown in FIG. 14B, a pattern of reproduction light obtained during reproduction has a contrast and an SN ratio lower than those at recording. During reproduction, a pattern of reproduction light as shown in FIG. 14B is detected by the CCD array 20 to determine the data and, at this time, the data are determined by recognizing the pixel pattern for tracking and using the position of the same as a reference position.

FIG. 15A is a conceptual representation of contents of data determined from a pattern of reproduction light. Each of regions in the figure having reference numbers such as A-1-1 represents one bit of data. In the present embodiment, a data region is divided at the cross-shaped region 74 having a pixel pattern for tracking recorded therein into four regions 78A, 78B, 78C and 78D. As shown in FIG. 15B, a rectangular region is formed by combining the diagonal regions 78A and 78C; another rectangular region is similarly formed by combining the diagonal regions 78B and 78D; and an ECC table is formed by arranging the two rectangular regions vertically. An ECC table is a table of data formed by adding error-correcting codes (ECCs) such as CRC (cyclic redundancy check) codes to data to be recorded. FIG. 15B shows an example of an ECC table comprising n rows and m columns, and other arrays may be freely designed. The data array shown in FIG. 15A utilizes a part of the ECC table shown in FIG. 15B, and parts of the ECC table shown in FIG. 15B which are not used in the data array shown in FIG. 15A have the same value regardless of the contents of data. During recording, an ECC table as shown in FIG. 15B is divided into four regions 78A, 78B, 78C and 78D as shown in FIG. 15A to be recorded in the optical information recording medium 1 and, during reproduction, data arranged as shown in FIG. 15A are detected and are rearranged to reproduce an ECC table as shown in FIG. 15B, and error correction is carried out based on the ECC table to reproduce the data.

The recognition of a reference position (a pixel pattern for tracking) in a pattern of reproduction light and error correction as described above are performed by the signal processing circuit 89 in FIG. 2.

As described above, in the optical information recording/reproducing apparatus 10 according to the present embodiment, the illumination of the optical information recording medium 1 with reference light for recording and information light during recording and the illumination of the optical information recording medium 1 with reference light for reproduction and the collection of reproduction light during reproduction are all carried out on the same side of the optical information recording medium 1 and on the same axis while allowing multiplex recording of information in the optical information recording medium 1 utilizing phase-encoding multiplexing. This makes it possible to configure the optical system for recording or reproduction smaller than those in prior-art holographic recording systems and eliminates the problem of stray light as encountered in prior-art holographic recording systems. The present embodiment also makes it possible to configure the optical system for recording and reproduction in the form of the pick-up 11 which is similar to normal optical disk devices. Therefore, random access to the optical information recording medium 1 can be easily performed.

Further, according to the present embodiment, information required to perform focus servo and tracking servo can be recorded in the optical information recording medium 1 to allow focus servo and tracking servo to be performed using the information. This makes it possible to position light for recording or reproduction accurately, which results in improved removability, facilitates random access and allows increases in a recording density, recording capacity and transfer rate. Particularly, the present embodiment allows dramatic increases in a recording density, recording capacity and transfer rate as a result of the capability of multiplex recording of information based on phase-encoding multiplexing. For example, when a series of information is recorded in the same location of the hologram layer 3 on a multiplex basis while changing the modulation pattern for the reference light for recording, the information can be recorded and reproduced at a very high speed.

The present embodiment also makes it possible to achieve copy protection and security easily because information recorded in the optical information recording medium 1 cannot be reproduced unless reference light for reproduction is used which has the same modulation pattern as that of the reference light for recording used to record the information. The present embodiment also makes it possible to provide services e.g., a service in which a multiplicity of kinds of information (e.g., various kinds of software) with different modulation patterns for reference light are recorded in optical information recording media 1; the optical information recording media 1 themselves are provided to users at a relatively low price; and pieces of information of the reference light modulation patterns to enable reproduction of each of the various kinds of information are separately sold to the users as key information as requested by the users.

With the optical information recording/reproducing apparatus 10 according to the present embodiment, a pattern of reproduction light can be easily recognized because reference position information indicating a reference position for the pattern of the reproduction light is included in the information light.

Figure 4:
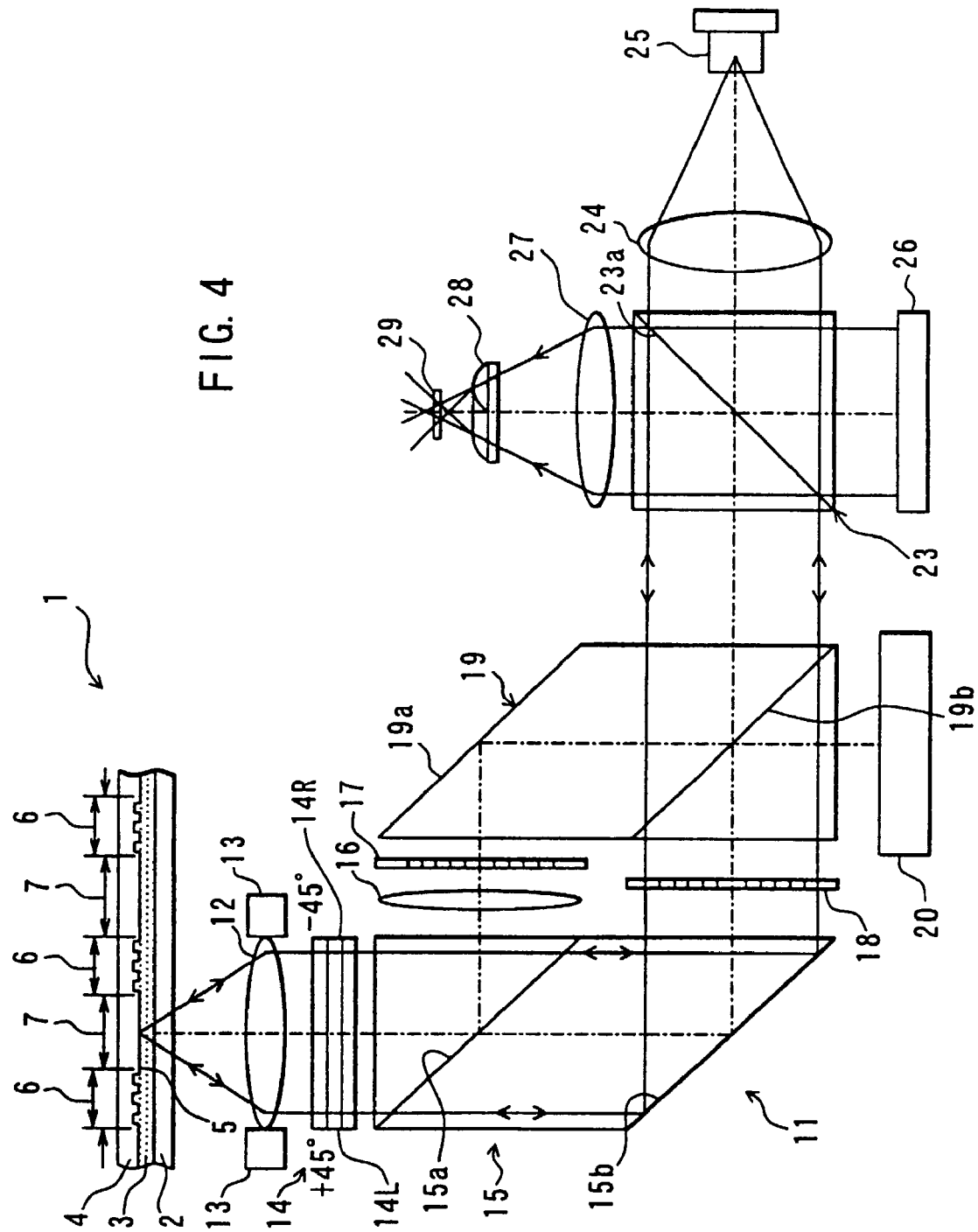
FIG. 4 is an illustration of a state of the pick-up shown in FIG. 1 during servo.
Figure 5:
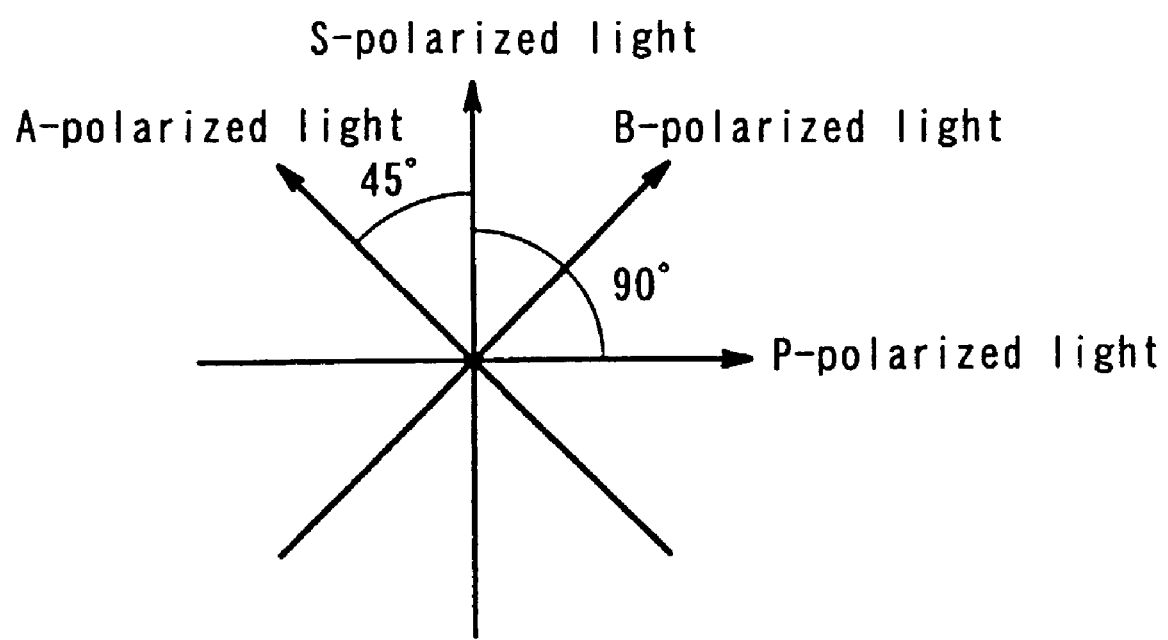
FIG. 5 is an illustration for explaining polarized beams used in the first embodiment of the invention.

The optical information recording/reproducing apparatus 10 according to the present embodiment is compatible with conventional optical disk devices because information recorded in the form of embossed pits in a recording medium can be reproduced by setting the pick-up 11 in the servo state shown in FIG. 4.

With the optical information recording/reproducing apparatus 10 according to the present embodiment, it is quite difficult to copy an optical information recording medium 1 having information recorded therein because each item of information recorded in the optical information recording medium 1 on a multiplex basis is associated with a different modulation pattern for the phase of the reference light. This makes it possible to prevent illegal copying.

In the optical information recording medium 1 according to the present embodiment, since the hologram layer 3 in which information is recorded utilizing holography is separated from the layer in which information of addresses and the like is recorded in the form of embossed pits, those two layers must be associated with each other to copy the optical information recording medium 1 having information recorded therein. Copying is difficult also from this point of view, which makes it possible to prevent illegal copying.

A description will now be made on an optical information recording/reproducing apparatus according to a second embodiment of the present invention. The present embodiment is an example in which multiplex recording is enabled by using phase-encoding multiplexing and hole burning type wavelength multiplexing in combination. The general configuration of the optical information recording/reproducing apparatus according to the present embodiment is substantially the same as the configuration of the optical information recording/reproducing apparatus 10 according to the first embodiment shown in FIG. 2.

First, hole burning type wavelength multiplexing will be briefly described. Hole burning is a phenomenon in which a change in absorbance occurs in an absorption spectrum in the position of the wavelength of incident light and is also referred to as "photo chemical hole burning". Hereinafter, a material that causes hole burning, i.e., a material that causes a change in absorbance in an absorption spectrum in the position of the wavelength of incident light is referred to as "whole burning material". In general, a hole burning material is a material obtained by dispersing light-absorbing center materials (referred to as "guests") such as pigment in a medium (referred to as "host") having an irregular structure, e.g., an amorphous structure. At extremely low temperatures, such a hole burning material exhibits a broad absorption spectrum that is attributable to overlapping of absorption spectra of a multiplicity of guests. When such a hole burning material is illuminated with light such as laser light having a certain wavelength (a wavelength within the absorption band of the hole burning material), since only guests having a resonance spectrum associated with the wavelength jump to a different energy level as a result of a photochemical reaction, a reduction of absorbance occurs in the absorption spectrum of the hole burning material in the position of the wavelength of the illuminating light.

Figure 16:
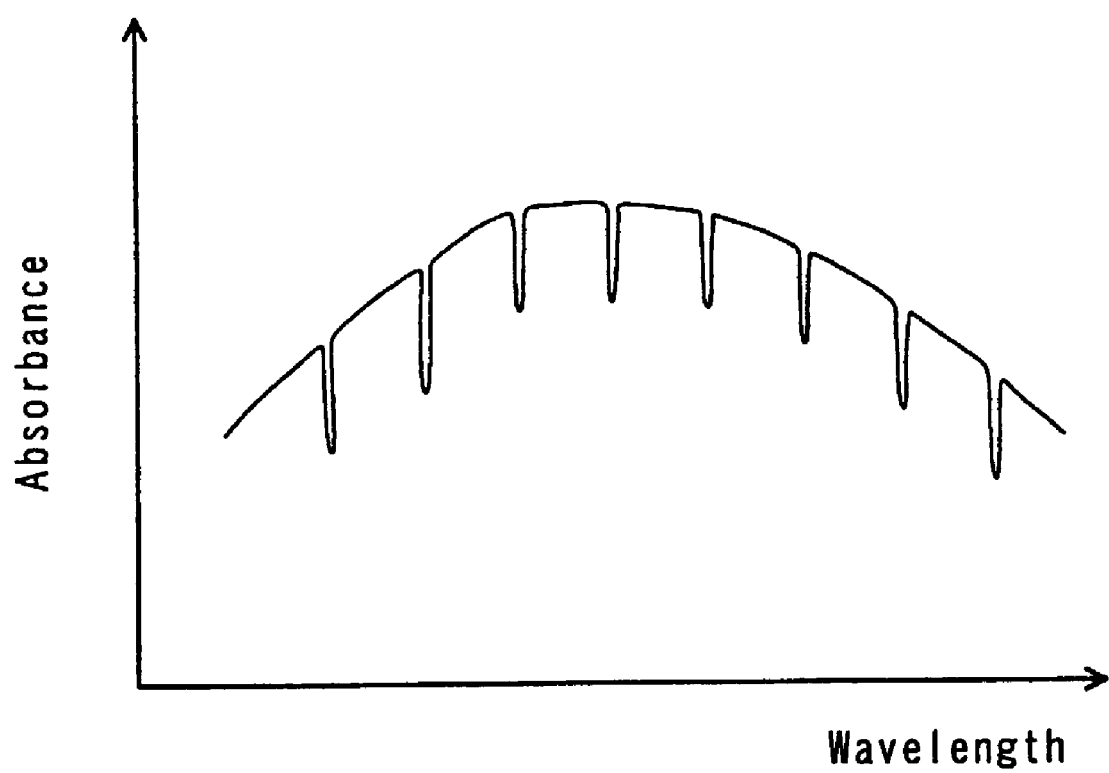
FIG. 16 is a characteristics diagram showing a state of the absorption spectrum of a hole burning material in which a reduction of absorbance has occurred in a plurality of wavelength positions as a result of illumination with light having a plurality of wavelengths.

FIG. 16 shows a state of the absorption spectrum of a hole burning material in which a reduction of absorbance has occurred in a plurality of wavelength positions as a result of illumination with light having a plurality of wavelengths. The regions of a hole burning material where a reduction of absorbance has occurred when illuminated with light are referred to as "holes". Since such holes are extremely small, a plurality of pieces of information with different wavelengths can be recorded on a hole burning material on a multiplex basis, and such a method for multiplex recording is referred to as whole burning type wavelength multiplexing. Since the size of holes is on the order of $10^{-2}$ nm, it is assumed that multiplicity on the order of $10^3$ to $10^4$ can be achieved with a hole burning material. Hole burning is described in detail, for example, in "Fundamentals of Optical Memories" published by Corona Corporation, pp. 104–133, 1990 and the above-cited article "Study on Novel Real Time Recording and Reproduction of Wavelength Multiplex Hologram Utilizing PHB".

The present embodiment makes it possible to form a plurality of holograms with different wavelengths on a hole burning material utilizing hole burning type wavelength multiplexing as described above. For this purpose, a hologram layer 3 of an optical information recording medium 1 used in the optical information recording/reproducing apparatus according to the present embodiment is formed from a hole burning material as described above.

According to the present embodiment, a light source device 25 in a pick-up 11 is capable of selectively emitting coherent light having a plurality of wavelengths within the absorption band of the hole burning material from which the hologram layer 3 is formed. The light source device 25 may be a wavelength variable laser device having a dye laser and a wavelength selecting element (a prism, diffraction grating or the like) for selecting a wavelength of light emitted by the dye laser; a wavelength variable laser device having a laser and a wavelength selecting element utilizing a non-linear optical element for converting the wavelength of light emitted by the laser; or the like.

An operating portion 91 according to the present embodiment allows a modulation pattern for reference light to be selected from among a plurality of modulation patterns similarly to that in the first embodiment and allows the wavelength of light emitted by the light source device 25 to be selected from among a plurality of selectable wavelengths. A controller 90 supplies information of a wavelength selected by itself or the operating portion 91 in accordance with predetermined conditions to the light source device 25 and, according to the wavelength information supplied by the controller 90, the light source device 25 emits light having the wavelength associated therewith.

The light source device 25 of the present embodiment corresponds to the wavelength selection means according to the present invention.

The configuration of the optical information recording/reproducing apparatus according to the present embodiment is otherwise the same as that of the first embodiment.

In the optical information recording/reproducing apparatus according to the present embodiment, when recording is performed, the wavelength of light emitted by the light source device 25 is selected from among a plurality of selectable wavelengths. As a result, information light and reference light for recording having the selected wavelength are generated. According to the present embodiment, multiplex recording can be carried out utilizing hole burning type wavelength multiplexing by performing a recording operation a plurality of times with the wavelength of the information light and the reference light for recording varied in the same location of the hologram layer 3.

With the optical information recording/reproducing apparatus according to the present embodiment, multiplex recording can be carried out which involves both of phase-encoding multiplexing and hole burning type wavelength multiplexing by performing a recording operation a plurality of times with the modulation pattern of the reference light for recording varied at a certain wavelength in the same location of the hologram layer 3 and further performing the recording operation a plurality of times with the modulation pattern of the reference light varied similarly at a different wavelength. In this case, multiplicity of M×N can be achieved where N represents multiplicity achieved by phase-encoding multiplexing and M represents multiplicity achieved by hole burning type wavelength multiplexing. Therefore, the present embodiment makes it possible to achieve greater increases in the recording density, recording capacity and transfer rate than achievable in the first embodiment.

The present embodiment makes it possible to achieve copy protection and security easily like the first embodiment because information recorded in the optical information recording medium 1 cannot be reproduced unless reference light for reproduction is used which has the same wavelength as that of the information light and the reference light for recording used to record the information. Further, when multiplex recording is performed as a combination of phase-encoding multiplexing and hole burning type wavelength multiplexing, a higher level of copy protection and security can be achieved because reproduction cannot be performed unless reference light for reproduction is used which has the same wavelength as that of the information light and the reference light for recording used to record the information, and which has the same modulation pattern as that of the reference light for recording.

The present embodiment also makes it possible to provide services e.g., a service in which a multiplicity of kinds of information (e.g., various kinds of software) with different wavelengths of the information light and the reference light for recording or different modulation patterns of reference light are recorded in optical information recording media 1; the optical information recording media 1 themselves are provided to users at a relatively low price; and pieces of information of the wavelengths and the modulation patterns of the reference light to enable reproduction of each of the various kinds of information are separately sold to the users as key information as requested by the users.

The operation and effects of the present embodiment are otherwise substantially the same as those of the first embodiment.

An optical information recording/reproducing apparatus according to a third embodiment of the present invention will now be described. The general configuration of the optical information recording/reproducing apparatus according to the present embodiment is substantially the same as the configuration of the optical information recording/reproducing apparatus 10 according to the first embodiment shown in FIG. 2 except that the configuration of the pick-up is different from that in the first embodiment.

Figure 17:
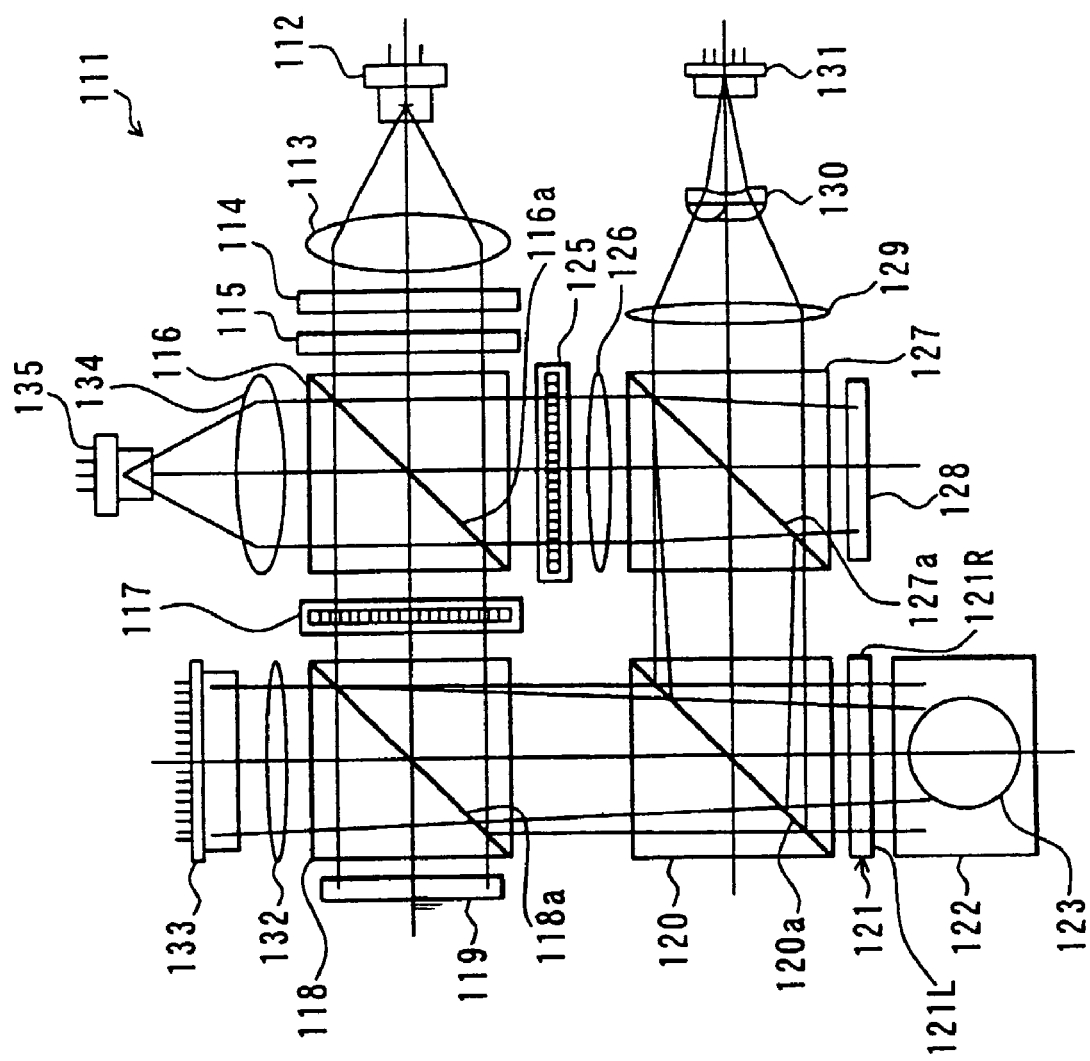
FIG. 17 is an illustration of a configuration of a pick-up according to a third embodiment of the invention.
Figure 18:
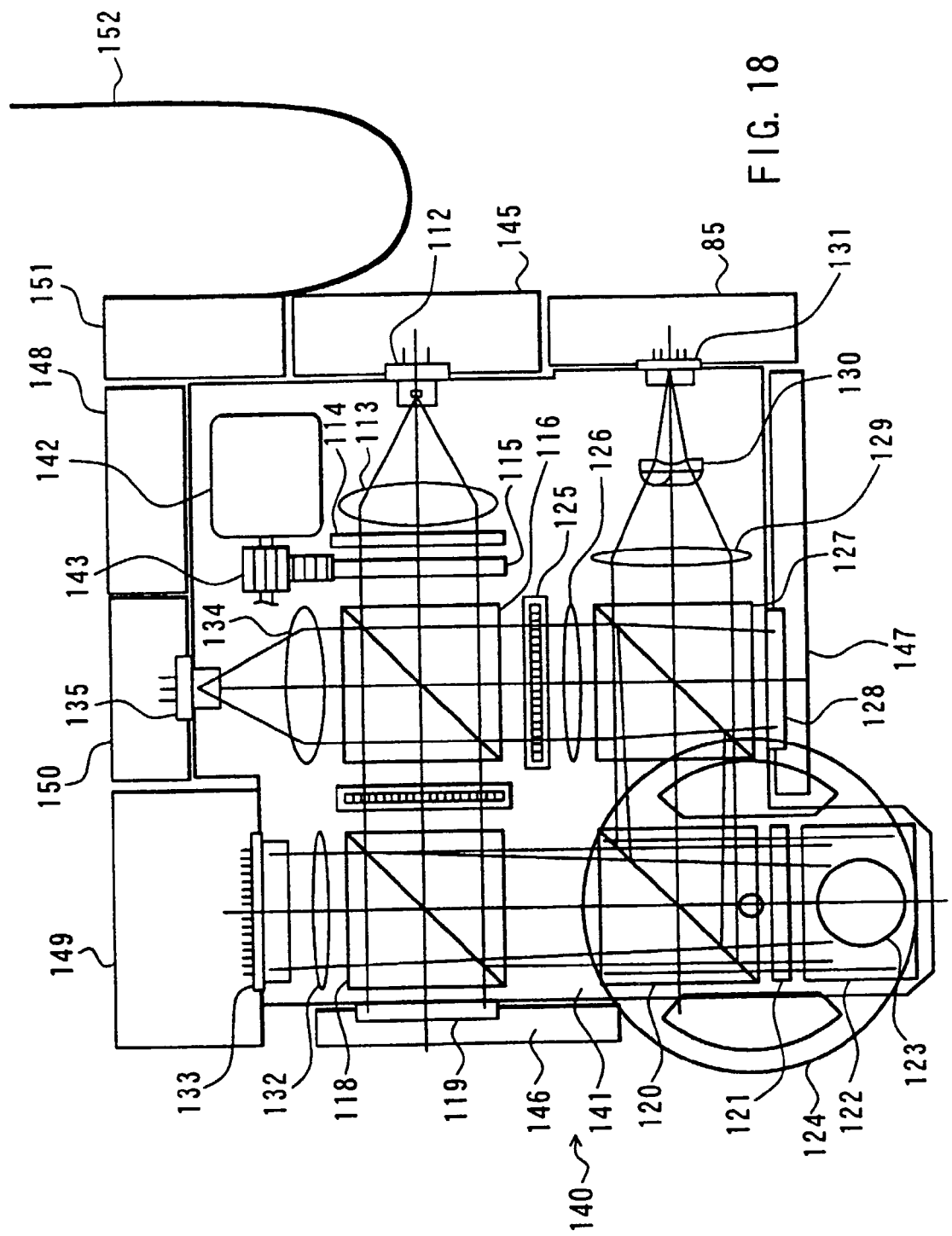
FIG. 18 is a plan view of a configuration of an optical unit including various elements that form the pick-up according to the third embodiment of the invention.

FIG. 17 is an illustration of the configuration of the pick-up according to the present embodiment, and FIG. 18 is a plan view of a configuration of an optical unit including various elements that form the pick-up.

The pick-up 111 according to the present embodiment has: a light source device 112 which emits coherent linearly polarized laser light; and a collimator lens 113, a neutral density filter (hereinafter referred to as "ND filters") 114, a rotating optical element 115, a polarization beam splitter 116, a phase-spatial light modulator 117, a beam splitter 118 and a photodetector 119 which are provided in the traveling direction of the light emitted by the light source device 112 in the order listed that is the order of their closeness to the light source device 112. The light source device 112 emits S-polarized linear light or P-polarized linear light. The collimator lens 113 collimates the light emitted by the light source device 112 to emit parallel beams. The ND filter 114 has the property of making the intensity distribution of the light emitted by the collimator lens 113 uniform. The optically rotating optical element 115 optically rotates the light emitted by the ND filter 114 to emit light including S-polarized components and P-polarized components. For example, a ½ wavelength plate or optically rotating plate is used as the rotating optical element 115. The polarization beam splitter 116 has a polarization beam splitter surface 116a which reflects the S-polarized components of the light emitted by the rotating optical element 115 and which transmits the P-polarized components. The phase-spatial light modulator 117 is similar to the phase-spatial light modulator 17 in the first embodiment. The beam splitter 118 has a beam splitter surface 118a. For example, the beam splitter surface 118a transmits 20% of the P-polarized components and reflects 80% of the same. The photodetector 119 is used to monitor the quantity of reference light for automatic power control (hereinafter represented by "APC") over the reference light. A light-receiving portion of the photodetector 119 may be divided into a plurality of regions to allow the adjustment of the intensity distribution of reference light.

The pick-up 111 further has a polarization beam splitter 120, a double optically rotating plate 121 and a raising mirror 122 which are provided in the traveling direction of the light emitted by the light source device 112 and reflected by the beam splitter surface 118a of the beam splitter 118 in the order listed that is the order of their closeness to the beam splitter 118. The polarization beam splitter 120 has a polarization beam splitter surface 120a for reflecting S-polarized components in light incident thereupon and for transmitting P-polarized components therein. The double optically rotating plate 121 has an optically rotating plate 121R provided on the right side of the optical axis in FIG. 17 and an optically rotating plate 121L provided on the left side of the optical axis. The optically rotating plates 121R and 121L are similar to the optically rotating plates 14R and 14L of the double optically rotating plate 14 in the first embodiment. The optically rotating plate 121R optically rotates a polarizing direction at −45°, and the optically rotating plate 121L optically rotates a polarizing direction at +45°. The raising mirror 122 has a reflecting surface which is tilted at 45° relative to the optical axis of light from the double optically rotating plate 121 to reflect the light from the double optically rotating plate 121 in the direction perpendicular to the plane of FIG. 17.

The pick-up 111 further has: an objective lens 123 provided in the direction in which the light from the double optically rotating plate 121 travels after being reflected by the reflecting surface of the raising mirror 122 such that it faces a transparent substrate 2 of an optical information recording medium 1 when the optical information recording medium 1 is secured to a spindle 81; and has an actuator 124 (see FIG. 18) capable of moving the objective lens 123 in the direction of the thickness of the optical information recording medium 1 and the direction of tracks thereof.

The pick-up 111 further has a spatial light modulator 125, a convex lens 126, a beam splitter 127 and a photodetector 128 which are provided in the traveling direction of the light emitted by the light source device 112 and reflected by the polarization beam splitter surface 116a of the polarization beam splitter 116 in the order listed that is the order of their closeness to the polarization beam splitter 116. The spatial light modulator 125 is similar to the spatial light modulator 18 in the first embodiment. The convex lens 126 has a function of converging information light before reference light for recording in the optical information recording medium 1 to form a region of interference between the reference light for recording and the information light. The size of the region of interference between the reference light for recording and the information light can be adjusted by adjusting the position of the convex lens 126. The beam splitter 127 has a beam splitter surface 127a. For example, the beam splitter surface 127a transmits 20% of S-polarized components and reflects 80% of the same. The photodetector 128 is used to monitor the quantity of information light to thereby perform APC on the information light. A light-receiving portion of the photodetector 128 may be divided into a plurality of regions to allow the adjustment of the intensity distribution of information light. Light that impinges upon the beam splitter 127 from the convex lens 126 to be reflected by the beam splitter surface 127a is incident upon the polarization beam splitter 120.

The pick-up 111 further has a convex lens 129, a cylindrical lens 130 and a quadruple photodetector 131 which are provided on the side of the beam splitter 127 opposite to the polarization beam splitter 120 in the order listed which is the order of their closeness to the beam splitter 127. The quadruple photodetector 131 is similar to the quadruple photodetector 29 in the first embodiment. The cylindrical lens 28 is provided such that the center axis of a cylindrical surface thereof defines an angle of 45° to a division line of the quadruple photodetector 131.

The pick-up 111 further has an imaging lens 132 and a CCD array 133 which are provided on the side of the beam splitter 118 opposite to the polarization beam splitter 120 in the order listed that is the order of their closeness to the beam splitter 118.

The pick-up 111 further has a collimator lens 134 and a fixing light source device 135 which are provided on the side of the polarization beam splitter 116 opposite to the spatial light modulator 125 in the order listed that is the order of their closeness to the polarization beam splitter 116. The fixing light source device 135 emits light for fixing information recorded in the hologram layer 3 of the optical information recording medium 1, e.g., ultraviolet light having a wavelength of 266 nm. A laser light source, a light source device for passing light emitted by a laser light source through a non-linear optical medium to emit the light with the wavelength thereof converted, or the like may be used as such a fixing light source device 135. The collimator lens 134 collimates light emitted by the fixing light source device 135. According to the present embodiment, the fixing light source device 135 emits S-polarized light.

As shown in FIG. 18, an optical unit 140 has an optical unit body 141. FIG. 18 shows only the region of a bottom surface of the optical unit body 141. Attached to the optical unit body 141 are the above-described collimator lens 113, ND filter 114, rotating optical element 115, polarization beam splitter 116, phase-spatial light modulator 117, beam splitter 118, polarization beam splitter 120, double optically rotating plate 121, raising mirror 122, spatial light modulator 125, convex lens 126, beam splitter 127, convex lens 129, cylindrical lens 130, imaging lens 132 and collimator lens 134.

FIG. 18 shows an example of the use of a ½ wavelength plate as the rotating optical element 115. In this example, a motor 142 and a gear 143 for transmitting the rotation of an output shaft of the motor 142 to the rotating optical element 115 are provided in the optical unit body 141 in order to adjust the ratio between S-polarized components and P-polarized components in light emitted by the rotating optical element 115.

Figure 19A:
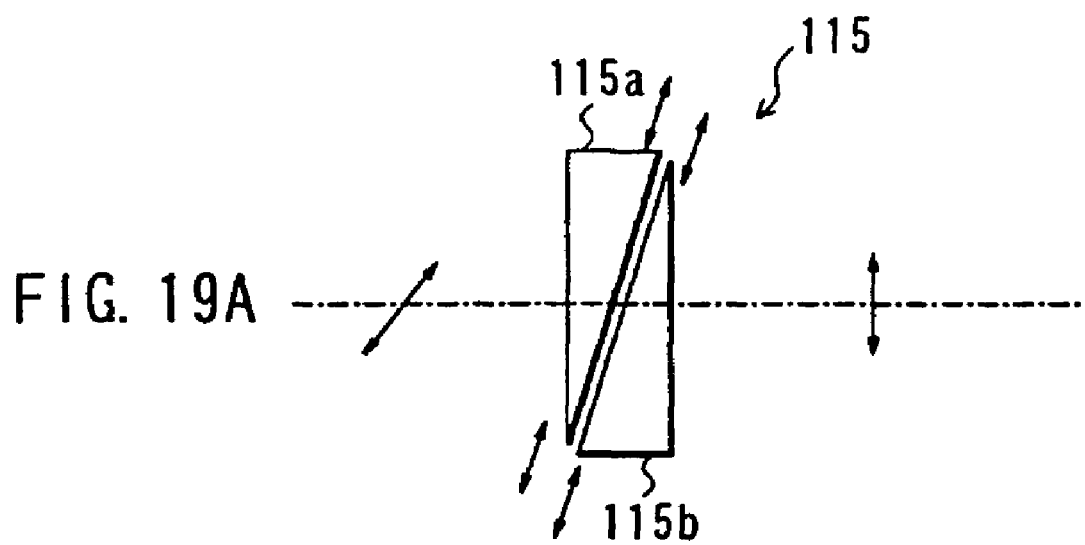
FIGS. 19A and 19B are illustrations of an example of the rotating optical element in FIG. 17.
Figure 19B:
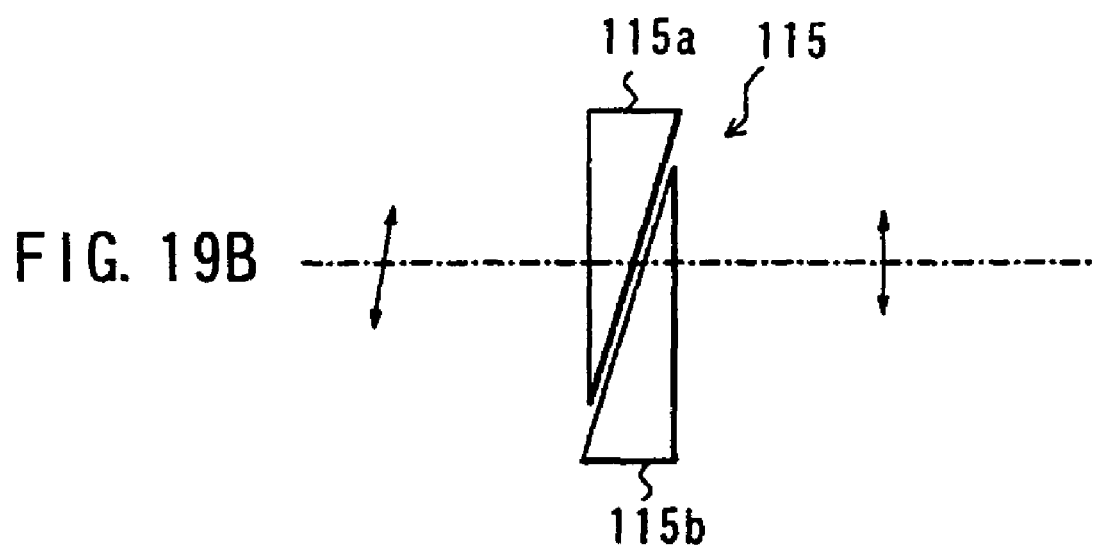

FIGS. 19A and 19B show an example of the rotating optical element 115 in which optically rotating plates are used. The rotating optical element 115 in this example has two wedge-shaped optically rotating plates 115a and 115b that are in a face-to-face relationship with each other. At least either of the optically rotating plates 115a and 115b is displaced by a driving device which is not shown in the directions of the arrows in the figures to change the combined thickness of the optically rotating plates 115a and 115b at an overlap between the optically rotating plates 115a and 115b as shown in FIGS. 19A and 19B. This changes a rotating angle of light that passes through the optically rotating plates 115a and 115b, thereby changing the ratio between S-polarized components and P-polarized components in light emerging from the rotating optical element 115. A large combined thickness of the optically rotating plates 115a and 115b as shown in FIG. 19A results in a large rotating angle, and a small combined thickness of the optically rotating plates 115a and 115b as shown in FIG. 19B results in a small rotating angle.

The actuator 124 is mounted on a top surface of the optical unit body 141. The light source device 112 is integral with a driving circuit 145 for driving the light source device 112 and is mounted on a lateral surface of the unit body 141 along with the driving circuit 145. The photodetector 119 is integral with an APC circuit 146 and is mounted to a lateral surface of the unit body 141 along with the APC circuit 146. The APC circuit 146 amplifies the output of the photodetector 119 to generate a signal $APC_{ref}$ used for APC carried out on reference light. The photodetector 128 is integral with an APC circuit 147 and is mounted to a lateral surface of the unit body 141 along with the APC circuit 147. The APC circuit 147 amplifies the output of the photodetector 119 to generate a signal $APC_{obj}$ used for APC carried out on information light. A driving circuit 148 for driving the motor 142 is mounted to a lateral surface of the unit body 141 in the vicinity of the motor 142 for comparing the signals $APC_{ref}$ and $APC_{obj}$ from the respective APC circuits 146 and 147 to optimize the ratio between S-polarized components and P-polarized components in the light emerging from the rotating optical element 115.

The quadruple photodetector 131 is integral with a detection circuit 85 (see FIG. 2) and is mounted to a lateral surface of the unit body 141 along with the detection circuit 85. The CCD array 133 is integral with a signal processing circuit 149 for operations such as driving the CCD array 133 and processing an output signal from the CCD array 133 and is mounted to a lateral surface of the unit body 141 along with the signal processing circuit 149. The fixing light source device 135 is integral with a driving circuit 150 for driving the fixing light source device 135 and is mounted to a lateral surface of the unit body 141 along with the driving circuit 150. An input/output port 151 for input and output of various signals between circuits in the optical unit 140 and the outside of the optical unit 140 is further mounted to a lateral surface of the unit body 141. For example, an optical fiber flexible cable 152 including an optical fiber for optically transmitting signals is connected to the input/output port 151.

Although not shown, a driving circuit for driving the phase-spatial light modulator 117 and a driving circuit for driving the spatial light modulator 125 are mounted on an upper surface of the optical unit body 141.

Figure 20:
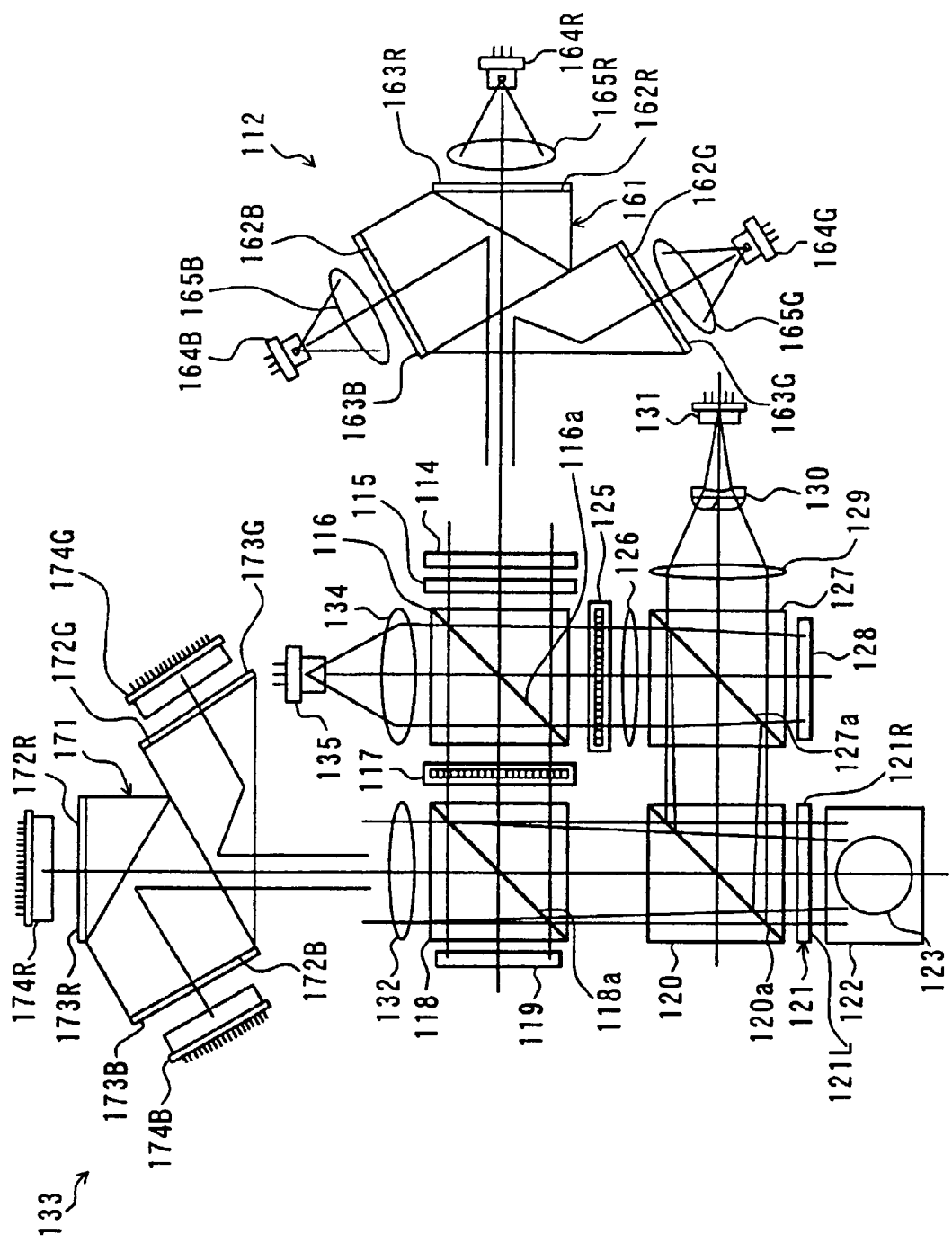
FIG. 20 is an illustration of a configuration of a pick-up which can use laser light in three colors according to the third embodiment of the invention.

FIG. 20 shows an example of a configuration of the pick-up 111 in which the light source device 112 is capable of transmitting laser beams in three colors, i.e., red (hereinafter represented by "R"), green (hereinafter represented by "G") and blue (hereinafter represented by "B") as beams in a plurality of wavelength bands and in which the CCD array 133 is also capable of detecting beams in the three colors R, G and B.

The light source device 112 in the example shown in FIG. 20 has a color synthesis prism 161. The color synthesis prism 161 has an R-light incidence portion 162R, a G-light incidence portion 162G and a B-light incidence portion 162B. The incidence portions 162R, 162G and 162B are provided with respective correction filters 163R, 163G and 163B. The light source device 112 further has: semiconductor laser devices (hereinafter represented by "LDs") 164R, 164G and 164B for emitting R light, G light and B light respectively; and collimator lenses 165R, 165G and 165B for collimating the beams of light emitted by the LDs 164R, 164G and 164B and causing them to impinge upon the respective incidence portions 162R, 162G and 162B. The R light, G light and B light emitted by the respective LDs 164R, 164G and 164B impinge upon the color synthesis prism 161 through the collimator lenses 165R, 165G and 165B and correction filters 163R, 163G and 163B to be synthesized by the color synthesis prism 161 and projected upon the ND filter 114. In the example shown in FIG. 20, no collimator lens 113 as shown in FIG. 17 is provided.

The CCD array 133 in the example shown in FIG. 20 has a color separation prism 171. The color separation prism 171 has an R-light emerging portion 172R, a G-light emerging portion 172G and a B-light emerging portion 172B. The emerging portions 172R, 172G and 172B are provided with correction filters 173R, 173G and 173B, respectively. The CCD array 133 further has CCDs 174R, 174G and 174B provided in positions in a face-to-face relationship with the respective emerging portions 172R, 172G and 172B for photographing an R-light image, G-light image and B-light image. Light from the imaging lens 132 is separated by the color separation prism 171 into R light, G light and B light which respectively impinge upon the CCDs 174R, 174G and 174B through the correction filters 173R, 173G and 173B.

Figure 21:
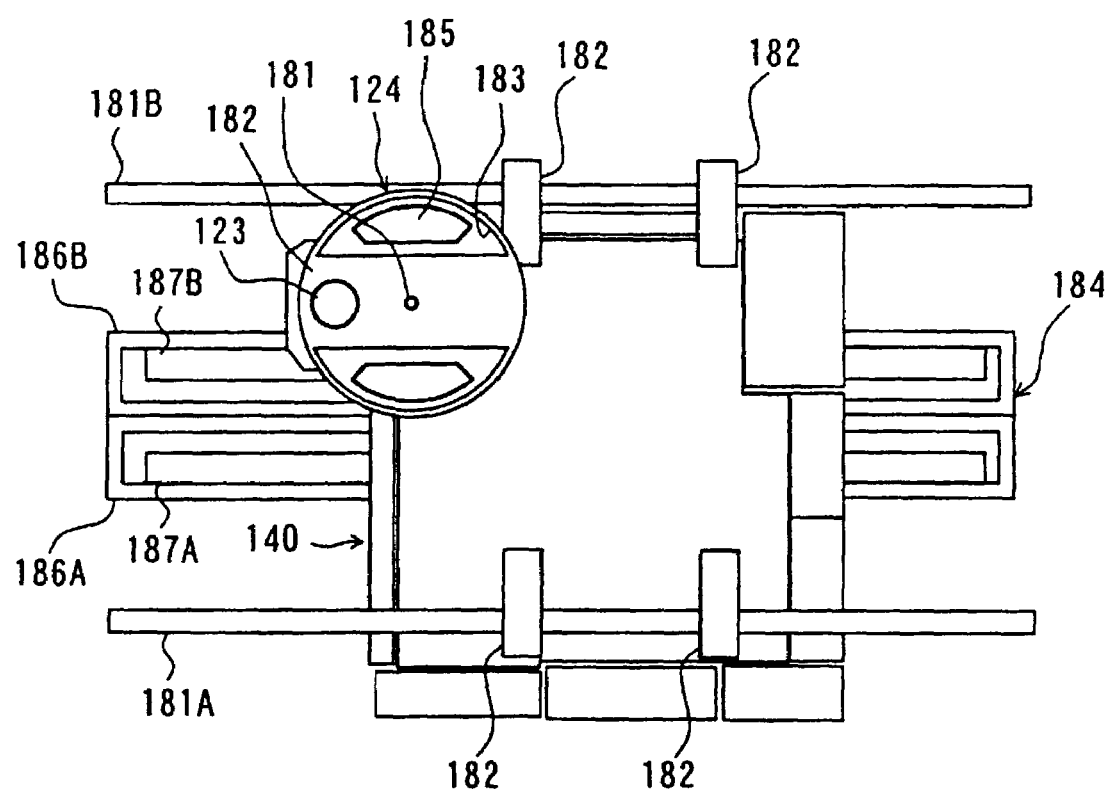
FIG. 21 is a plan view of a slide-feed mechanism of the optical unit shown in FIG. 18.
Figure 22:
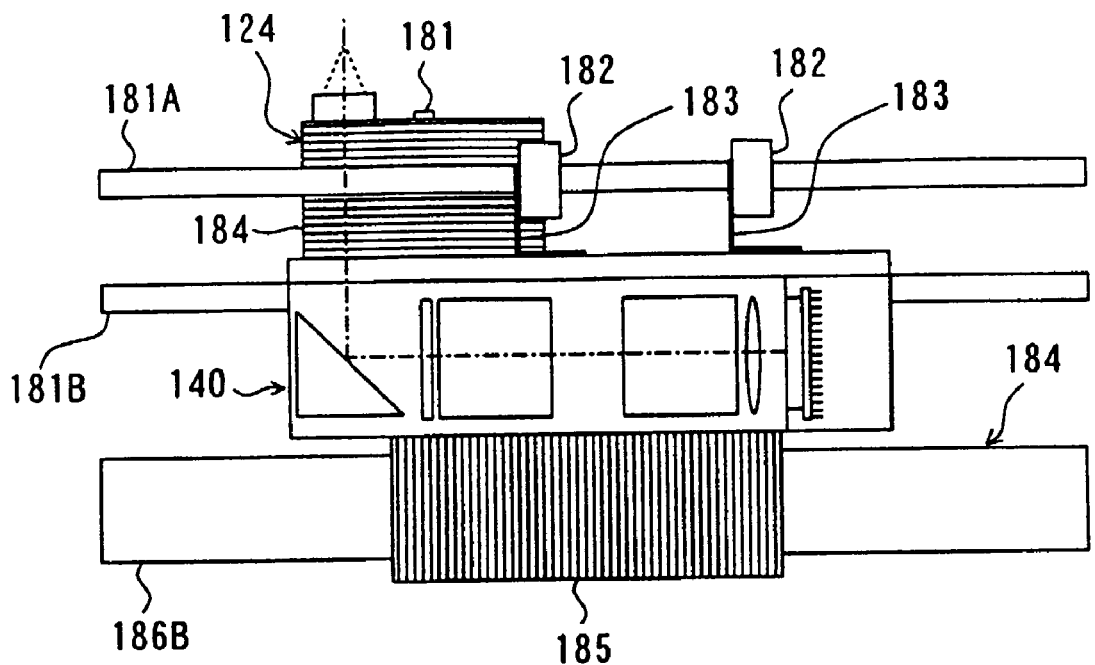
FIG. 22 is a partially cutaway side view of the slide-feed mechanism shown in FIG. 21 in a stationary state.
Figure 23:
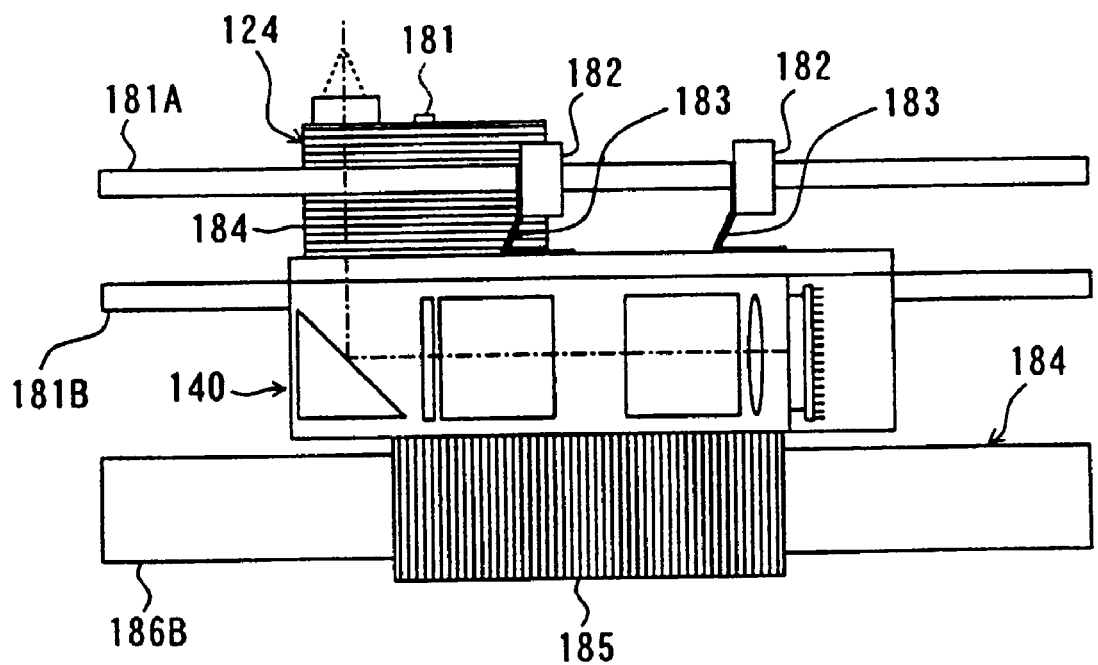
FIG. 23 is a partially cutaway side view of the slide-feed mechanism shown in FIG. 21 with the optical unit displaced slightly.

A description will now be made with reference to FIGS. 21 through 23 on a slide-feed mechanism of the optical unit 140 of the present embodiment. FIG. 21 is a plan view of the slide-feed mechanism. FIG. 22 is a partially cutaway side view of the slide-feed mechanism in a stationary state. FIG. 23 is a partially cutaway side view of the slide-feed mechanism with the optical unit displaced slightly.

The slide-feed mechanism has: two shafts 181A and 181B arranged in parallel in the moving direction of the optical unit 140; two bearings 182 provided on each of the shafts 181A and 181B and movable along the respective shafts 181A and 181B; a plate spring 183 for elastically coupling each of the bearings 182 to the optical unit 140; and a linear motor 184 for moving the optical unit 140 along the shafts 181A and 181B.

The linear motor 184 has: a coil 185 coupled to a lower end of the optical unit 140; two yokes 186A and 186B in the form of frames provided in the moving direction of the optical unit 140 such that a part thereof penetrates through the coil 185; and magnets 187A and 187B secured to the inner peripheries of the yokes 186A and 186B in a face-to-face relationship with the coil 185.

An operation of the slide-feed mechanism will now be described. When the linear motor 184 is operated, the optical unit 140 is displaced. When such a displacement is very small, as shown in FIG. 23, no displacement of the bearings 182 occurs, and the plate springs 183 between the bearings 182 and the optical unit 140 are transformed. When the displacement of the optical unit 140 exceeds a predetermined range, the bearings 182 are displaced to follow the optical unit 140. With such a slide-feed mechanism, no displacement of the bearings 182 occurs when the displacement of the optical unit 140 is very small, which makes it possible to prevent wear of the bearings 182 attributable to sliding. As a result, the optical unit 140 can be driven by the linear motor 184 to perform tracking servo while maintaining the durability and reliability of the slide-feed mechanism. A seek operation is also performed using the slide-feed mechanism.

The actuator 124 has a cylindrical actuator body 182 which holds the objective lens 123 and which can be rotated about an axis 181. The actuator body 182 is formed with two holes 183 in parallel with the axis 181. A focusing coil 184 is provided at the outer periphery of the actuator body 182. Further, a coil for in-field access which is not shown is provided at a part of the outer periphery of the focusing coil 184. The actuator 124 further has a magnet 185 inserted in each of the holes 183 and a magnet which is not shown provided in a face-to-face relationship with the coil for in-field access. The objective lens 123 is provided such that a line connecting the center of the objective lens 123 and the axis 181 is oriented in the direction of tracks when the actuator 124 is stationary.

A description will now be made with reference to FIGS. 24A through 24C and FIG. 27 on a method for positioning (servo) of reference light and information light relative to data areas of the optical information recording medium 1 according to the present embodiment. The actuator 124 of the present embodiment is capable of moving the objective lens 123 in the direction of the thickness of the optical information recording medium 1 and the direction of tracks thereof.

Figure 24A:
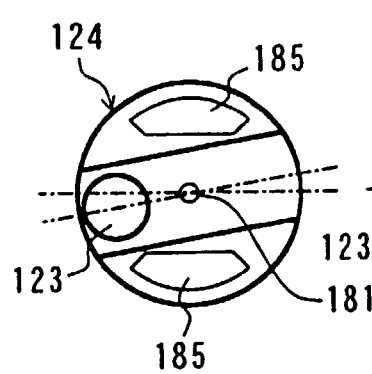
FIGS. 24A through 24C are illustrations of an operation of the actuator shown in FIG. 21.
Figure 24B:
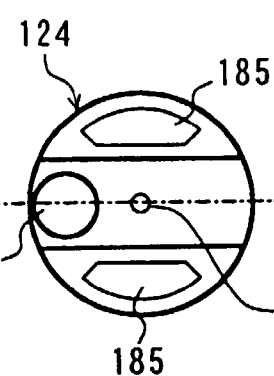
Figure 24C:
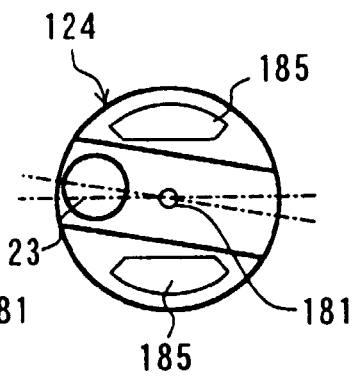

FIGS. 24A through 24C show the operation of moving the objective lens 123 in the direction of the tracks of the optical information recording medium 1 with the actuator 124. The actuator 124 is in the state shown in FIG. 24B when it is stationary. When the coil for in-field access which is not shown is energized, the actuator 124 changes from the state shown in FIG. 24B to the state shown in FIG. 24A or 24C. Such an operation of moving the objective lens 123 in the direction of the tracks of the optical information recording medium 1 is referred to as "in-field access" in the context of the present embodiment.

Figure 25:
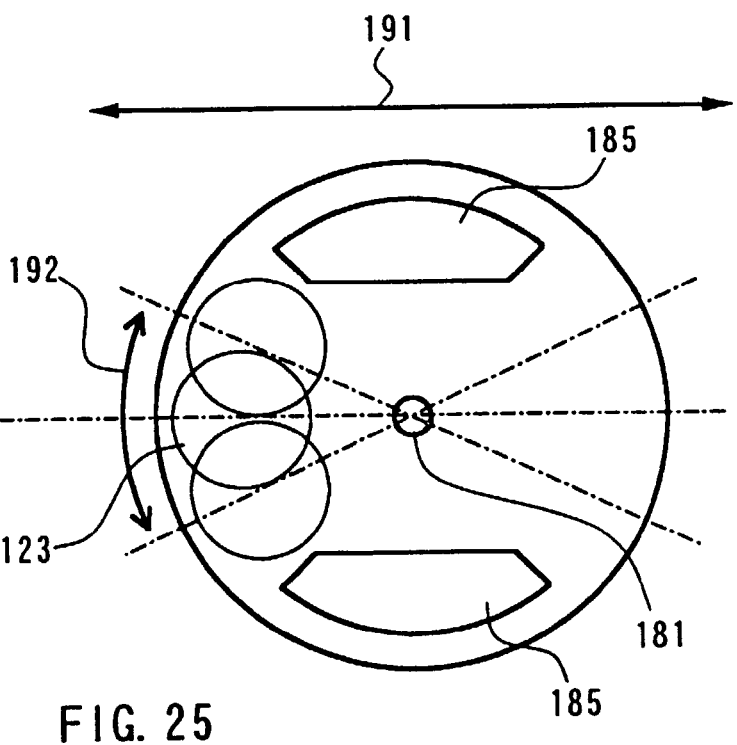
FIG. 25 is an illustration showing a moving direction of an objective lens of the pick-up shown in FIG. 17 during a seek and a moving direction of the same during in-field access.

FIG. 25 shows a moving direction of the objective lens 123 during a seek and a moving direction of the same during in-field access. In FIG. 25, the reference number 191 represents the moving direction of the objective lens 123 during a seek, and the reference number 192 represents the moving direction of the objective lens 123 during in-field access. The reference number 193 represents a locus of the center of the objective lens 123 in the case of a combination of a seeking movement and in-field access. In the case of in-field access, for example, the center of the objective lens 123 can be moved by about 2 mm.

Figure 26:
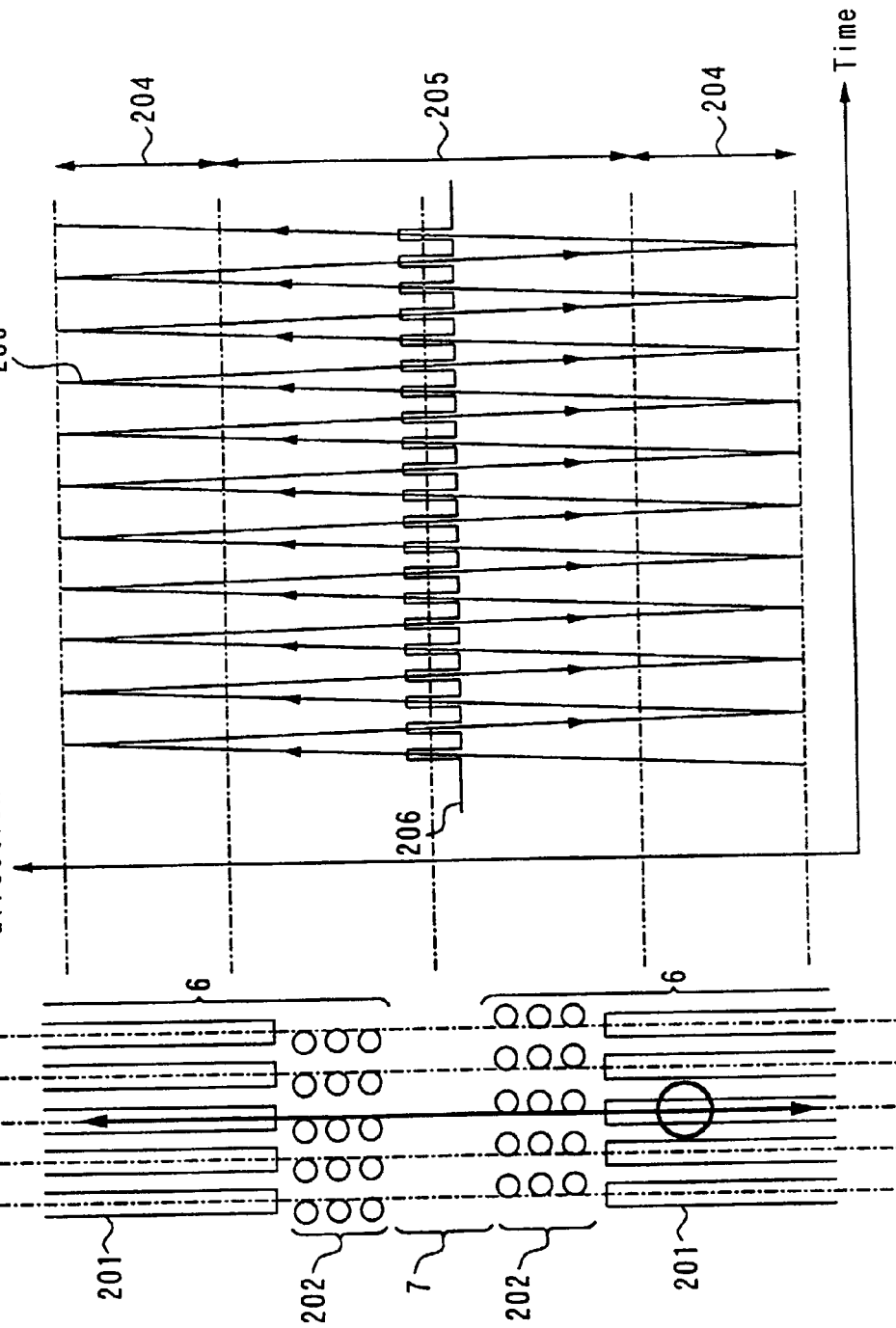
FIGS. 26A and 26B are illustrations for explaining the positioning of reference light and information light in a third embodiment of the invention.

In the present embodiment, the positioning (servo) of reference light and information light relative to the data areas of the optical information recording medium 1 is carried out utilizing in-field access. FIGS. 26A and 26B are illustrations for explaining such positioning. In the optical information recording medium 1 according to the present embodiment, as shown in FIG. 26A, while a groove 201 is formed on each track of address servo areas 6, no groove 201 is formed in data areas 7. At the ends of an address servo area, there is formed rows of pits 202 used to reproduce a clock and to indicate the end of a data area 7 it adjoins (which is referred to as "polarity" in the present embodiment).

In FIG. 26B, the reference number 203 represents a locus of the center of the objective lens 123 during recording or reproduction. In the present embodiment, when multiplex recording of information is carried out on a data area 7 using phase-encoding multiplexing or when the information recorded in the data area 7 on a multiplex basis is reproduced, the center of the objective lens 123 is moved using in-field access such that the center of the objective lens 123 reciprocates within a section including the data area 7 and a part of the address servo areas 6 on both sides thereof as shown in FIG. 26B, instead of stopping the center of the objective lens 123 within the data area 7. The rows of pits 202 are then used to reproduce a clock and to determine the polarity, and the grooves 201 are used to perform focus servo and tracking servo in sections 204 in the address servo areas 6. No tracking servo is performed in a section 205 located between the sections 204 including the data area 7, and the state of passage of the sections 204 is maintained in this section. Turning points in the movement of the center of the objective lens 123 are determined to be in constant positions based on the reproduced clock. Locations of a data area 7 where information is recorded on a multiplex basis are also determined to be in constant positions based on the reproduced clock. In FIG. 26B, the reference number 206 represents a gate signal that indicates timing for recording or reproduction. A high (H) level of this gate signal represents timing for recording or reproduction. To record information in constant locations in a data area 7 on a multiplex basis, for example, the output of the light source device 112 may be selectively set at a high output for recording when the gate signal is at the high level. To reproduce information recorded on a multiplex basis in constant locations of a data area 7, for example, the light source device 112 may be selectively caused to emit light when the gate signal is at the high level. In case where the CCD array 133 has the function of an electronic shutter, images may alternatively be fetched using the function of an electronic shutter when the gate signal is at the high level.

By positioning reference light and information light according to the above-described method, it is possible to prevent any shift of a position of recording or reproduction even when recording or reproduction is performed for a relatively long time in the same location of the optical information recording medium 1. Even when the optical information recording medium 1 is rotated, recording and reproduction can be performed as if the optical information recording medium 1 is stationary by performing in-field access to follow up the rotation of the optical information recording medium 1, which makes it possible to perform recording and reproduction for a relatively long time in the same location of the optical information recording medium 1. The use of the technique of positioning reference light and information light utilizing in-field access as described above makes it possible to position reference light and information light easily not only on a disk-shaped optical information recording medium 1 but also on optical information recording media in other configurations such as a card-like configuration.

Figure 27:
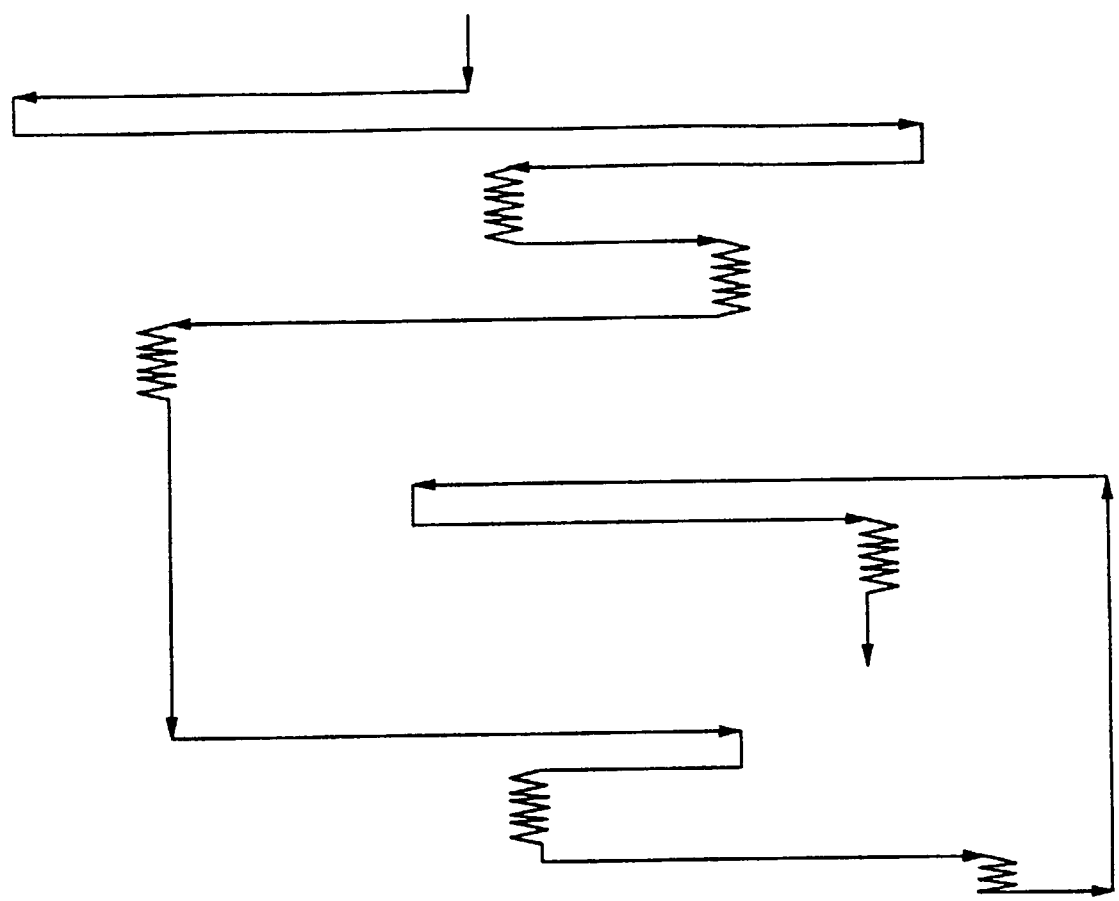
FIG. 27 is an illustration of an example of a locus of the center of the objective lens in the case of access to a plurality of locations of an optical information recording medium utilizing a seeking movement and in-field access in combination in the third embodiment of the invention.

FIG. 27 shows an example of a locus of the center of the objective lens 123 in the case of access to a plurality of locations of an optical information recording medium 1 utilizing a seeking movement and in-field access in combination. In the figure, a straight line in the vertical direction represents a seek; a straight line in the horizontal direction represents a movement to another location in the direction of the tracks; and a region where a reciprocating motion takes place within a short section is a region where recording or reproduction is performed.

Figure 28:
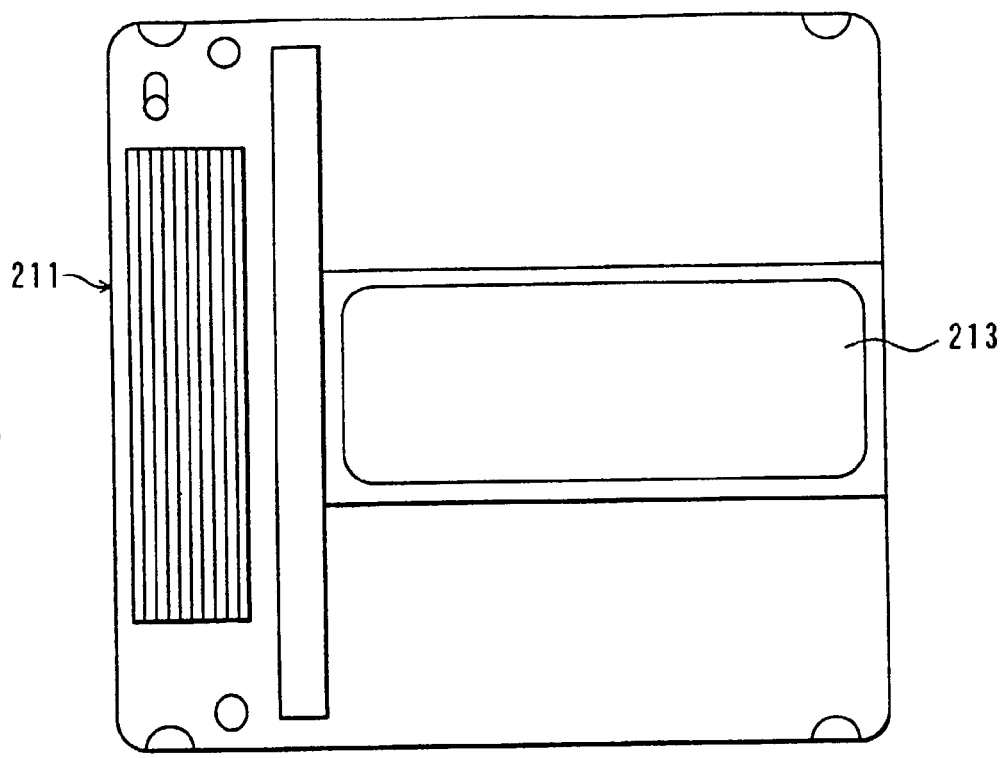
FIG. 28 is a plan view of a cartridge for containing the optical information recording medium in the third embodiment of the invention.
Figure 29:
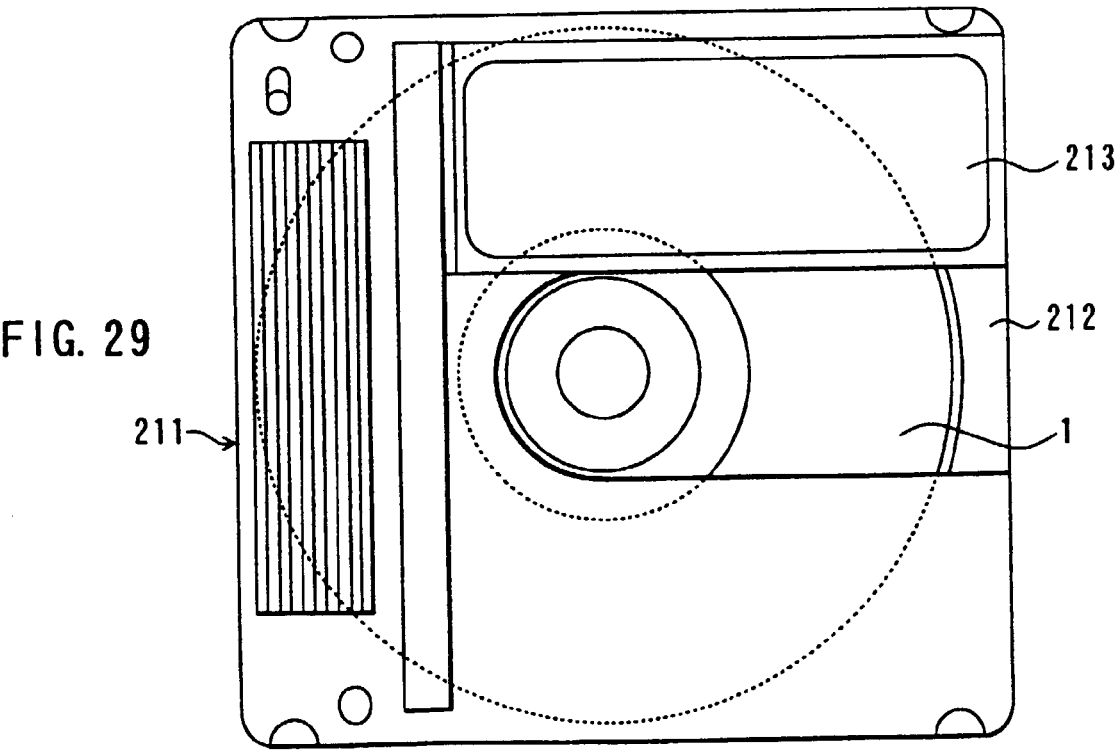
FIG. 29 is a plan view of the cartridge shown in FIG. 28 with a shutter thereof opened.

A description will now be made with reference to FIGS. 28 and 29 on an example of a cartridge that contains an optical information recording medium 1. FIG. 28 is a plan view of the cartridge, and FIG. 29 is a plan view of the cartridge with a shutter thereof opened. A cartridge 211 in this example has a window portion 212 where a part of an optical information recording medium 1 contained therein is exposed and a shutter 213 for opening and closing the window portion 212. The shutter 213 is urged in the direction of closing the window portion 212. While the window portion 212 is normally closed as shown in FIG. 28, the cartridge 211 is moved by an optical information recording/reproducing apparatus in the direction of opening the window portion 212 as shown in FIG. 29 when it is mounted in the optical information recording/reproducing apparatus.

A description will now be made with reference to FIGS. 30 through 34 on examples of arrangements of optical units 140 in cases wherein a plurality of pick-ups 111 are provided in a single optical information recording/reproducing apparatus.

Figure 30:
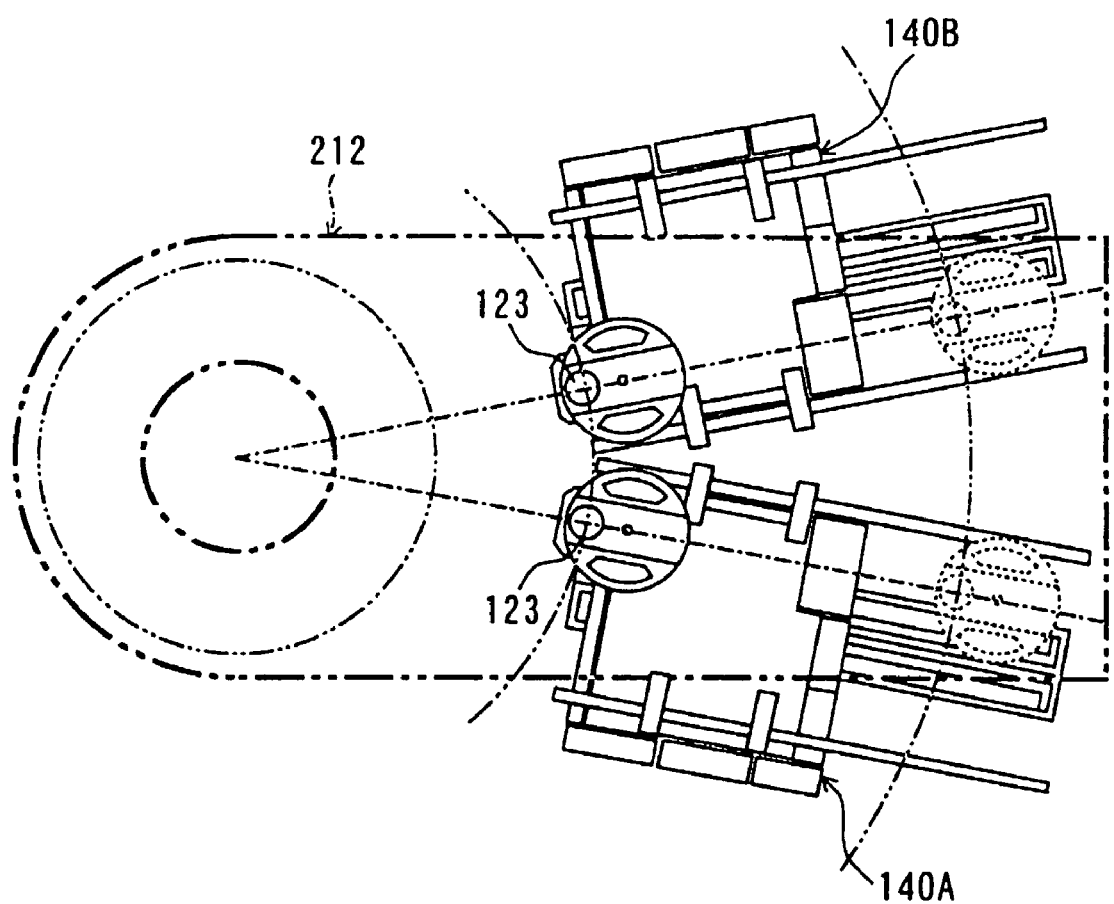
FIG. 30 is a plan view showing an example wherein two optical units are provided in a face-to-face relationship with one side of the optical information recording medium in the third embodiment of the invention.

FIG. 30 shows an example wherein two optical units 140A and 140B are provided in a face-to-face relationship with one side of an optical information recording medium 1. The optical unit 140A has a configuration similar to that of the optical unit 140 shown in FIG. 21 (hereinafter referred to as "type A"). The optical unit 140B has a configuration which is in a plane symmetrical relationship with that of the optical unit 140 shown in FIG. 21 (hereinafter referred to as "type B"). The two optical units 140A and 140B are provided in positions in a face-to-face relationship with the optical information recording medium 1 exposed at the window portion 212 of the cartridge 211. The slide-feed mechanism of each of the optical units 140A and 140B is provided such that the center of an objective lens 123 of each of the optical units 140A and 140B is moved along a line extending through the center of the optical information recording medium 1.

Figure 31:
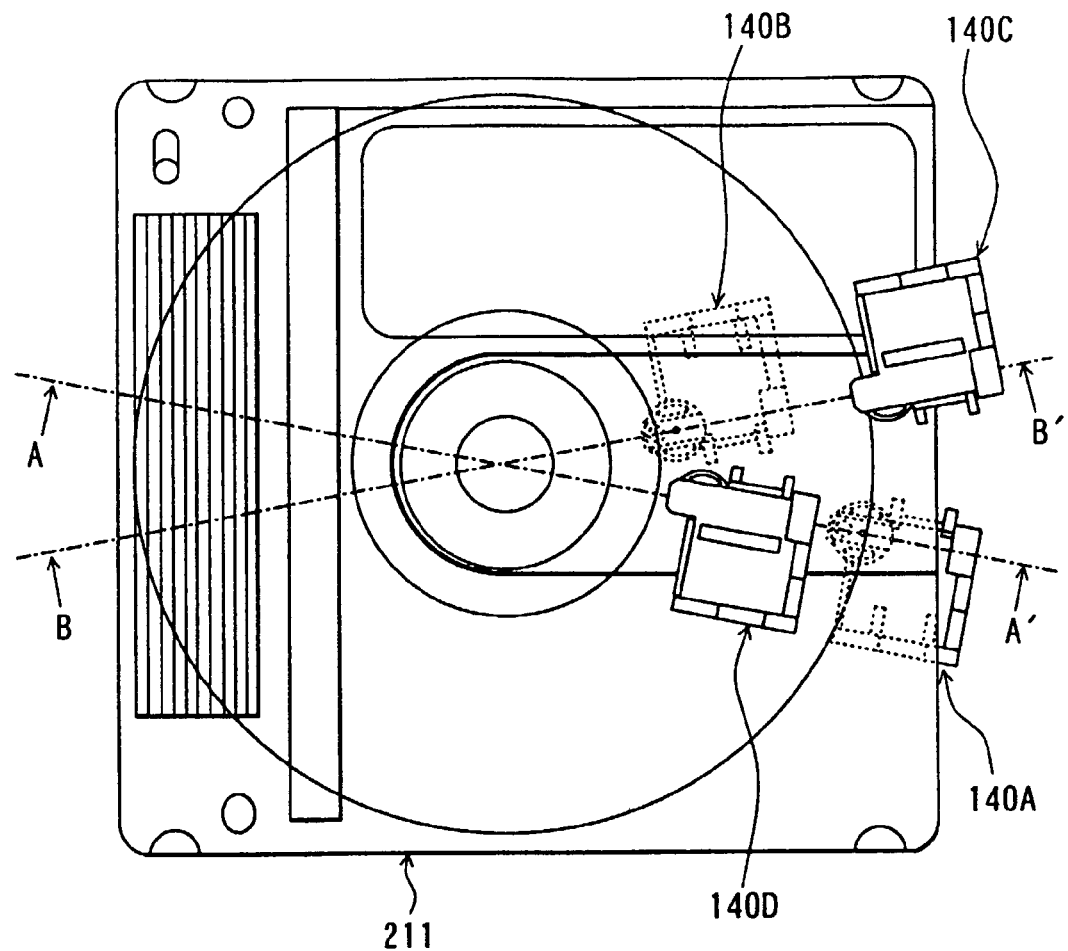
FIG. 31 is a plan view showing an example wherein four optical units are provided in the third embodiment of the invention.
Figure 32:
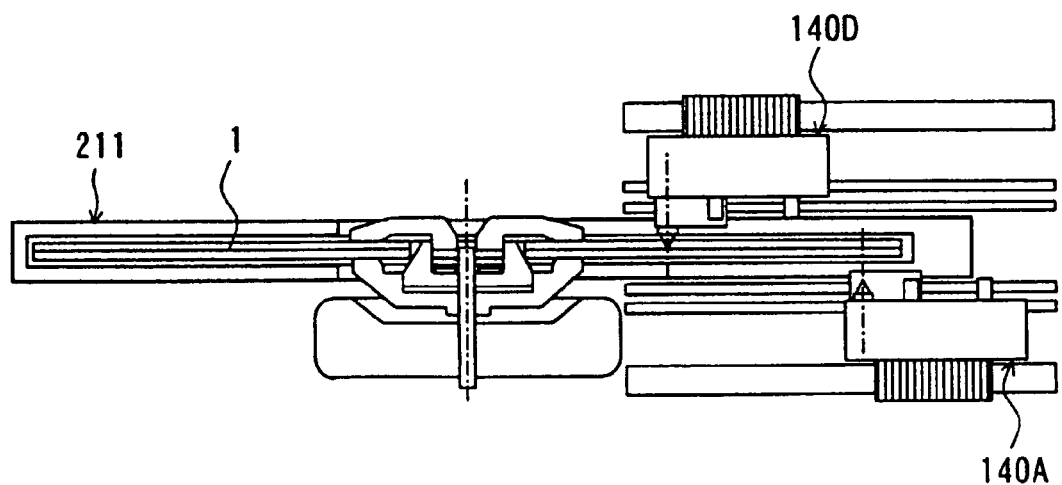
FIG. 32 is a sectional view taken along the line A–A' in FIG. 31.
Figure 33:
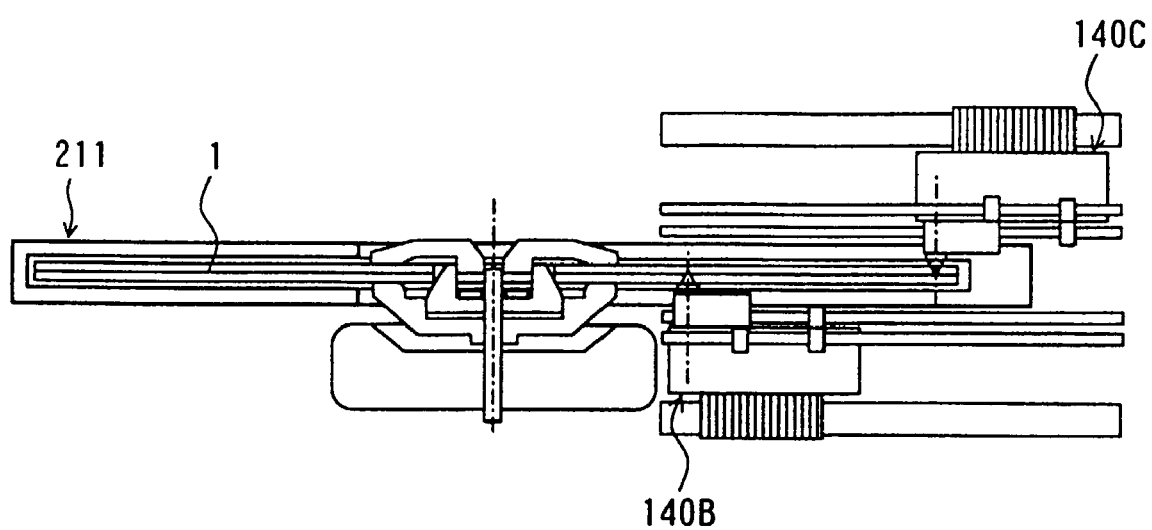
FIG. 33 is a sectional view taken along the line B–B' in FIG. 31.

FIG. 31 shows an example wherein two optical units are provided in a face-to-face relationship with each side of an optical information recording medium 1, i.e., four optical units in total are provided. FIG. 32 is a sectional view taken along the line A–A' in FIG. 31, and FIG. 33 is a sectional view taken along the line B–B' in FIG. 31. In this example, two optical units 140A and 140B are provided in a face-to-face relationship with one side (back side in FIG. 31), and two optical units 140C and 140D are provided in a face-to-face relationship with the other side (top side in FIG. 31) of the optical information recording medium 1. The optical unit 140C is the type A, and the optical unit 140D is the type B.

The optical units 140A and 140B and the slide-feed mechanisms therefor and the optical units 140C and 140D and the slide-feed mechanisms therefor are arranged in accordance with the same conditions as described with reference to FIG. 30. In order to effectively utilize the four optical units 140A, 140B, 140C and 140D, an optical information recording medium 1 must be used which allows recording and reproduction of information on both sides thereof.

Figure 34:
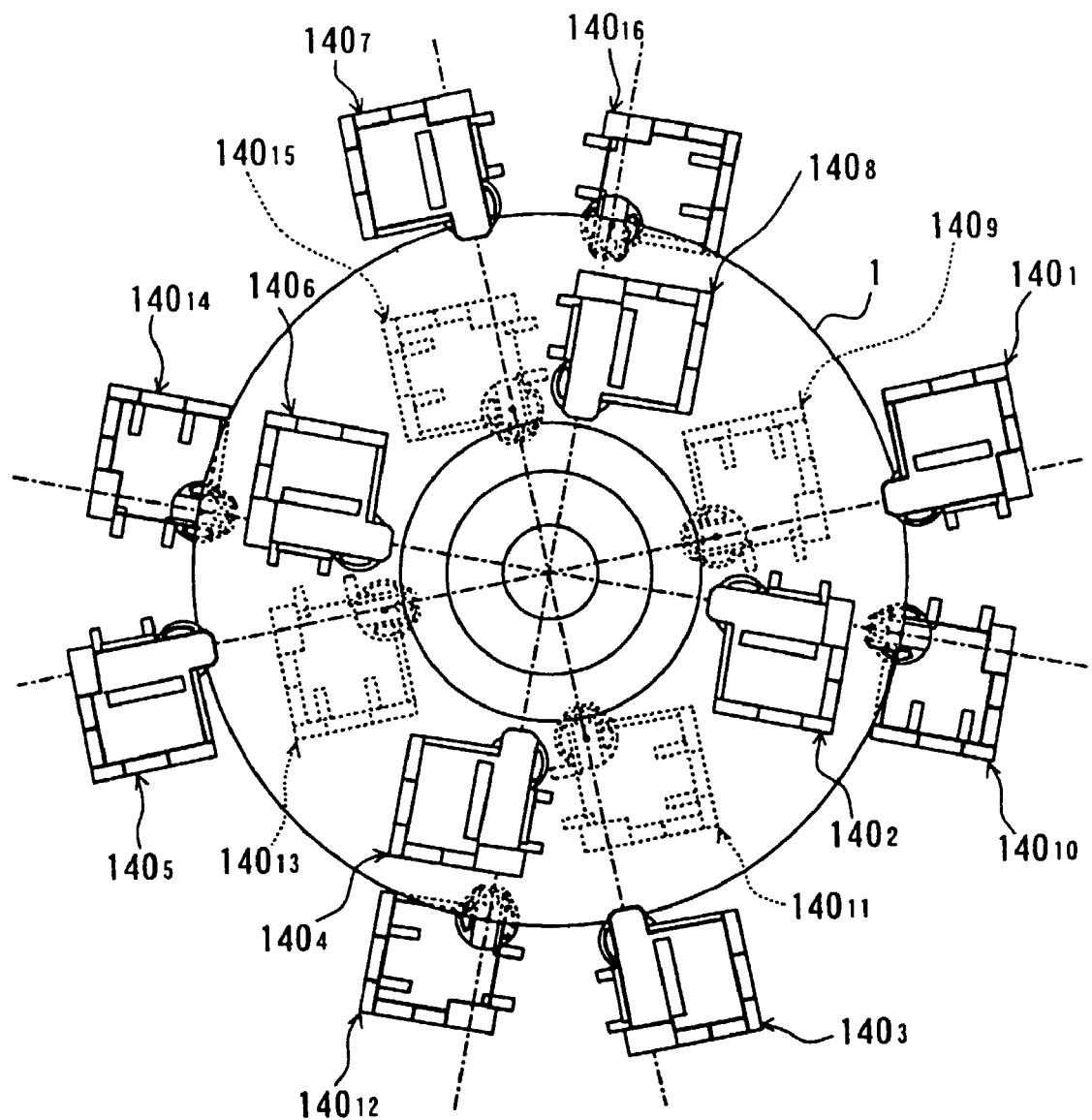
FIG. 34 is a plan view showing an example wherein sixteen optical units are provided in the third embodiment of the invention.

FIG. 34 shows an example wherein eight optical units are provided in a face-to-face relationship with each side of an optical information recording medium 1, i.e., sixteen optical units are provided in total. In this example, eight optical units $140_1$ through $140_8$ are provided in a face-to-face relationship with one side (top side in FIG. 34), and eight optical units $140_9$ through $140_{16}$ are provided in a face-to-face relationship with the other side (back side in FIG. 34) of the optical information recording medium 1. The optical units $140_1$, $140_3$, $140_5$, $140_7$, $140_{10}$, $140_{12}$, $140_{14}$ and $140_{16}$ are the type A. The optical units $140_2$, $140_4$, $140_6$, $140_8$, $140_9$, $140_{11}$, $140_{13}$ and $140_{15}$ are the type B. The slide-feed mechanism of each of the optical units is provided such that the center of the objective lens 123 of each optical unit is moved along a line extending through the center of the optical information recording medium 1. In order to effectively utilize the sixteen optical units, an optical information recording medium 1 must be used which is not contained in a cartridge and which allows recording and reproduction of information on both sides thereof.

In a system including the optical information recording/reproducing apparatus and the optical information recording medium 1 according to the present embodiment, an extraordinary amount of information can be recorded in the optical information recording medium 1, and such a system is suitable for applications in which an enormous amount of continuous information is recorded. If a system used for such an application is unable to reproduce information during recording of such an enormous amount of continuous information, the system will be very much difficult to use.

Under such circumstances, for example, a plurality of pick-ups 111 may be provided in a single optical information recording/reproducing apparatus as shown in FIGS. 30 through 34 to allow simultaneous recording and reproduction of information using a single optical information recording medium 1 and to allow simultaneous recording and reproduction of information with the plurality of pick-ups 111, which makes it possible to improve the recording and reproducing performance and, particularly, to configure a system which is easy to use even in applications wherein an enormous amount of continuous information is recorded. By providing a plurality of pick-ups 111 in a single optical information recording/reproducing apparatus, dramatic improvement of performance can be achieved in retrieving a desired item of information from a large amount of information compared to a case in which only a single pick-up 111 is used.

A description will now be made with reference to FIGS. 35 through 46 on an example of a specific structure of an optical information recording medium 1 according to the present embodiment.

The optical information recording medium 1 according to the present embodiment has a first information layer (hologram layer) in which information is recorded utilizing holography and a second information layer in which information for servo and address information are recorded in the form of embossed pits or the like. It is necessary to form a region of interference between reference light for recording and information light to a certain size in the first information layer while converging the reference light to a minimum diameter in the second information layer. For this reason, according to the present embodiment, a gap having a certain size is formed between the first and second information layers. This makes it possible to form a region of interference between reference light for recording and information light with a sufficient size in the first layer while converging the reference light to a minimum diameter on the second information layer to allow reproduction of information recorded in the second information layer. Optical information recording media 1 according to the present embodiment can be classified into an air gap type and a transparent substrate gap type depending on the method for forming such a gap.

Figure 35:
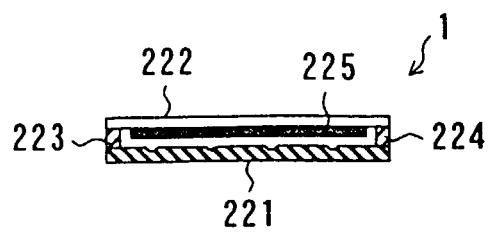
FIG. 35 is a sectional view of one half of an air gap type optical information recording medium according to the third embodiment of the invention.
Figure 36:
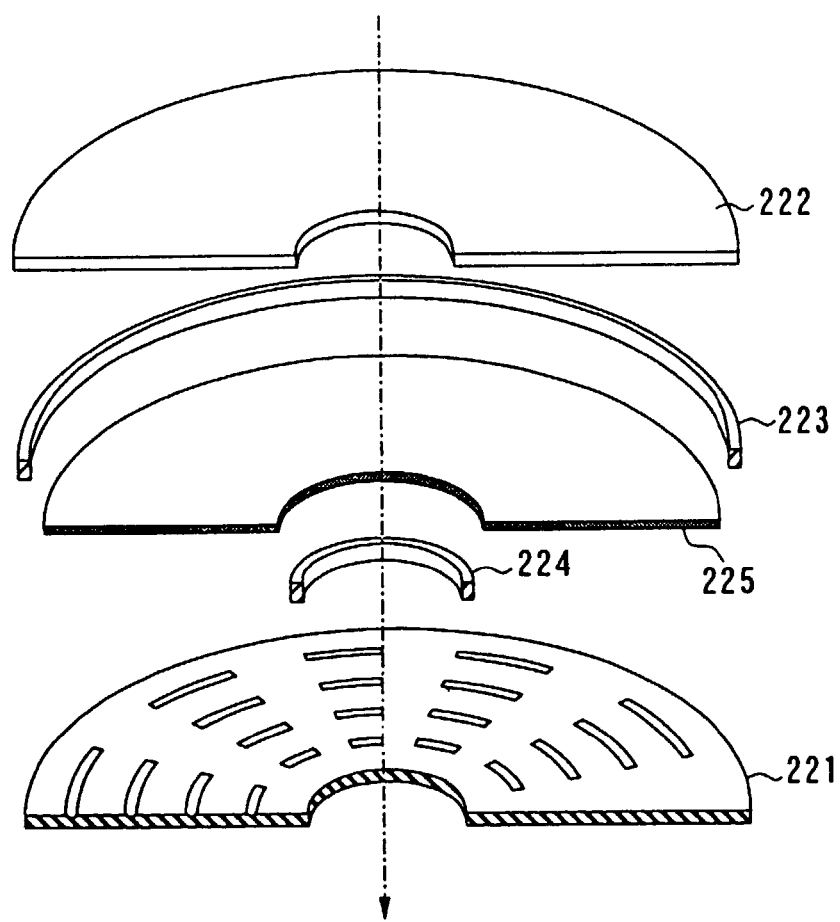
FIG. 36 is an exploded perspective view of the one half of the air gap type optical information recording medium in the third embodiment of the invention.
Figure 37:
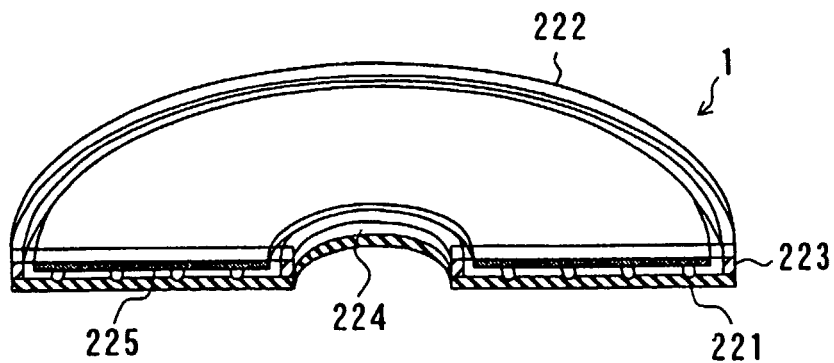
FIG. 37 is a perspective view of the one half of the air gap type optical information recording medium in the third embodiment of the invention.

FIGS. 35 through 37 show an air gap type optical information recording medium 1 wherein FIG. 35 is a sectional view of one half of the optical information recording medium 1; FIG. 36 is an exploded perspective view of the one half of the optical information recording medium 1; and FIG. 37 is a perspective view of the one half of the optical information recording medium 1. The optical information recording medium 1 has: a reflecting substrate 221 one surface of which is a reflecting surface; a transparent substrate 222 provided in a face-to-face relationship with the reflecting surface of the reflecting substrate 221; an outer circumferential spacer 223 and an inner circumferential spacer 224 for spacing the reflecting substrate 221 and transparent substrate 222 with a predetermined gap therebetween; and a hologram layer 225 bonded to the surface of the transparent substrate 222 facing the reflecting substrate 221. An air gap having a predetermined thickness is formed between the reflecting surface of the reflecting substrate 221 and the hologram layer 225. The hologram layer 225 serves as the first information layer. Pre-grooves are formed on the reflecting surface of the reflecting substrate 221, and the reflecting surface serves as the second information layer.

Figure 38:
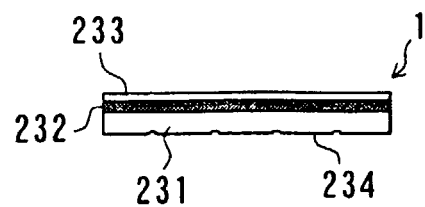
FIG. 38 is a sectional view of one half of a transparent substrate gap type optical information recording medium according to the third embodiment of the invention.
Figure 39:
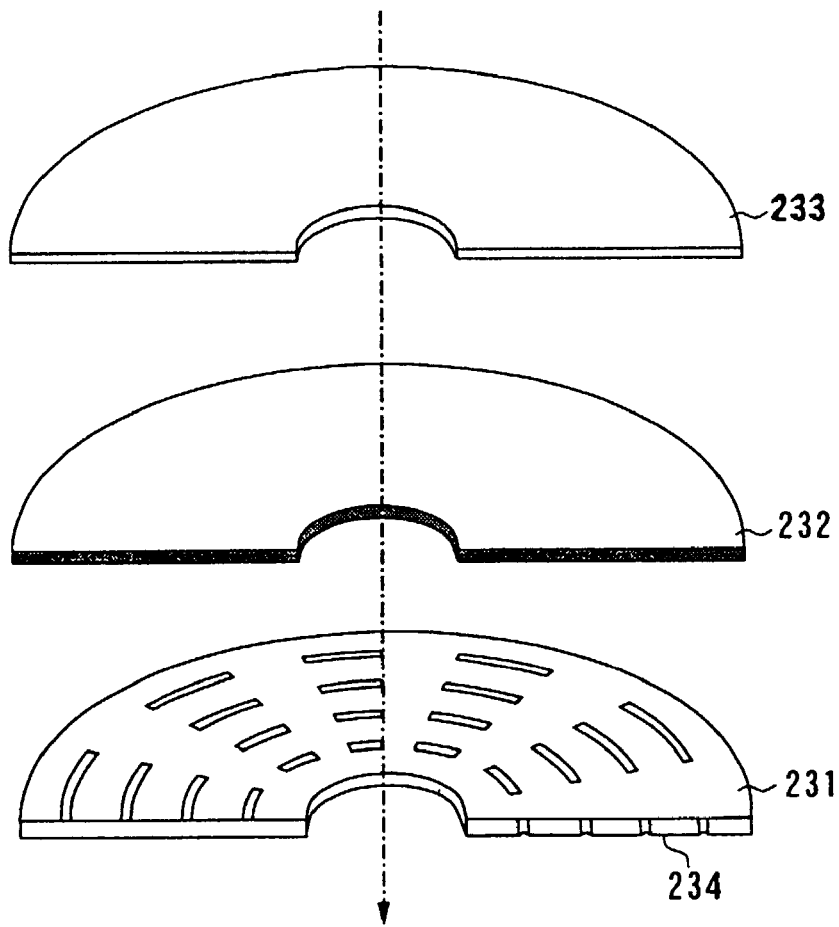
FIG. 39 is an exploded perspective view of the one half of the transparent substrate gap type optical information recording medium in the third embodiment of the invention.
Figure 40:
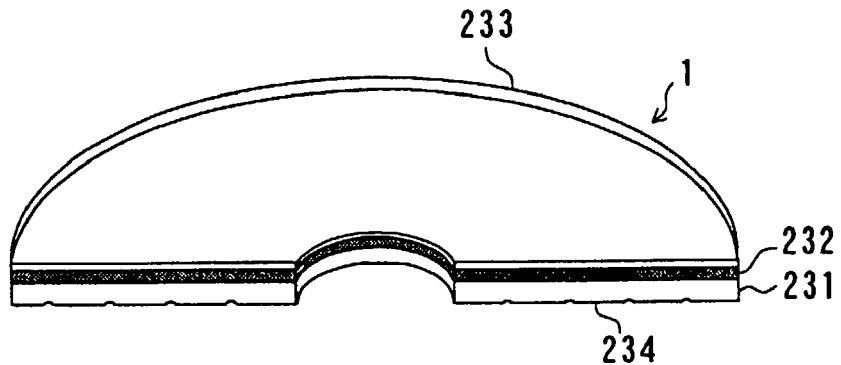
FIG. 40 is a perspective view of the one half of the transparent substrate gap type optical information recording medium in the third embodiment of the invention.

FIGS. 38 through 40 show a transparent substrate type optical information recording medium 1 wherein FIG. 38 is a sectional view of one half of the optical information recording medium 1; FIG. 39 is an exploded perspective view of the one half of the optical information recording medium 1; and FIG. 40 is a perspective view of the one half of the optical information recording medium 1. The optical information recording medium 1 is configured by stacking a transparent substrate 231, a hologram layer 232 to serve as the first information layer and a transparent substrate 233 in the order listed. Pre-grooves are formed and a reflecting film 234 is provided on the surface of the transparent substrate 231 opposite to the hologram layer 232. The surface of the transparent substrate 231 opposite to the hologram layer 232 serves as the second information layer. A gap having a predetermined thickness is formed by the transparent substrate 231 between the second information layer and the hologram layer 232. The thickness of the transparent substrate 233 is smaller than that of the transparent substrate 231.

Optical information recording media 1 according to the present embodiment can be classified into a single-sided type and a double-sided type.

Figure 41:
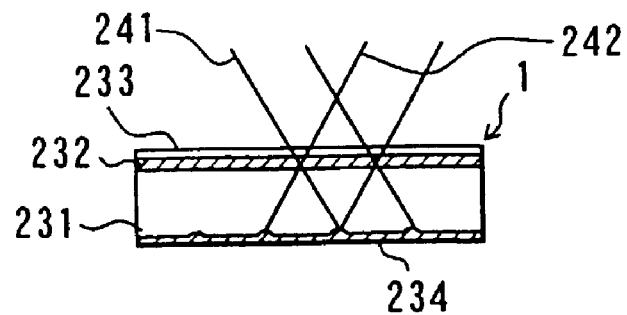
FIG. 41 is a sectional view of a single-sided 1.2 mm thickness type optical information recording medium according to the third embodiment of the invention.
Figure 42:
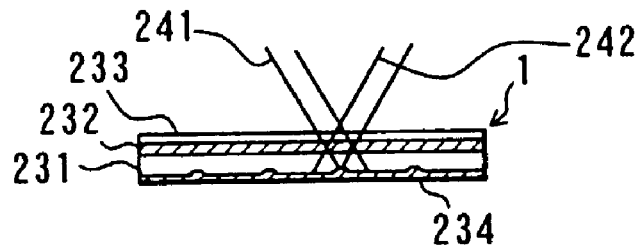
FIG. 42 is a sectional view of a single-sided 0.6 mm thickness type optical information recording medium according to the third embodiment of the invention.
Figure 43:
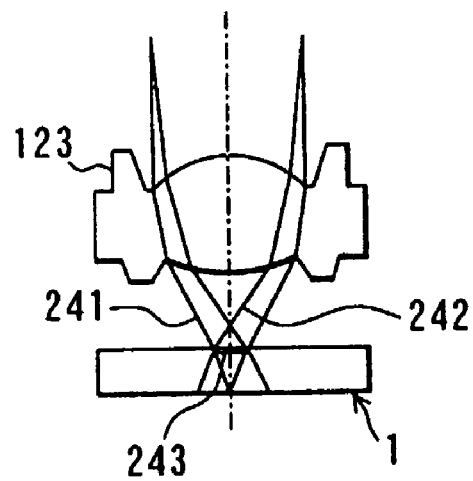
FIG. 43 is an illustration of how to illuminate a single-sided optical information recording medium as shown in FIG. 41 or 42 with reference light for recording and information light.

FIGS. 41 through 43 show single-sided type optical information recording media 1 wherein FIG. 41 is a sectional view of a 1.2 mm thickness type optical information recording medium 1; FIG. 42 is a sectional view of a 0.6 mm thickness type optical information recording medium 1; and FIG. 43 is an illustration of how to illuminate a single-sided optical information recording medium 1 with reference light for recording and information light. The optical information recording media 1 shown in FIGS. 41 and 42 have a structure as shown in FIG. 38. The combined thickness of the transparent substrate 231, hologram layer 232 and transparent substrate 233 of the optical information recording medium 1 shown in FIG. 41 is 1.2 mm, and the combined thickness of the transparent substrate 231, hologram layer 232 and transparent substrate 233 of the optical information recording medium 1 shown in FIG. 42 is 0.6 mm.

Reference light 241 for recording projected upon the optical information recording medium 1 by the objective lens 123 converges to a minimum diameter on the surface having pre-grooves formed thereon, and information light 242 projected upon the optical information recording medium 1 by the objective lens 123 converges to a minimum diameter before the hologram layer 232. As a result, a region 243 of interference between the reference light 241 for recording and the information light 242 is formed in the hologram layer 232.

While FIGS. 41 and 42 show optical information recording media 1 belonging to the transparent substrate gap type and the single-sided type, an optical information recording medium 1 may be configured which belongs to the air-gap type and the single-sided type. In such a case, the combined thickness of the transparent substrate 222, hologram layer 225 and the air gap must be 1.2 mm or 0.6 mm.

Figure 44:
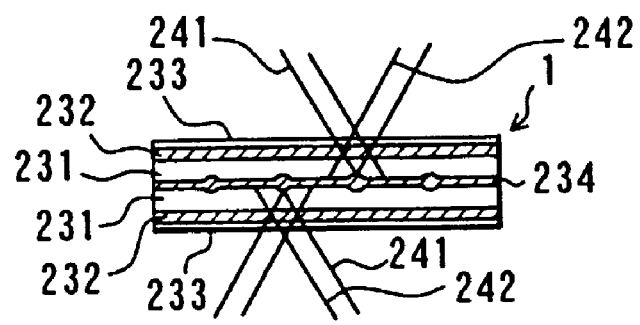
FIG. 44 is a sectional view of a double-sided transparent substrate gap type optical information recording medium according to the third embodiment of the invention.
Figure 45:
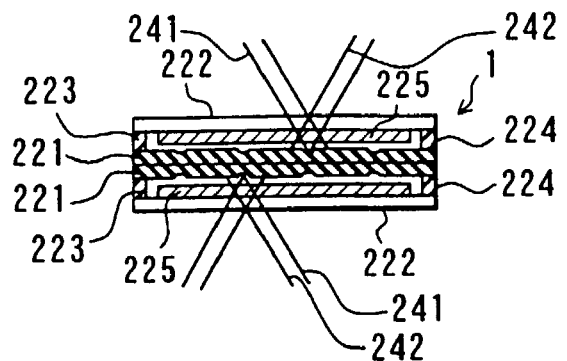
FIG. 45 is a sectional view of a double-sided air gap type optical information recording medium according to the third embodiment of the invention.
Figure 46:
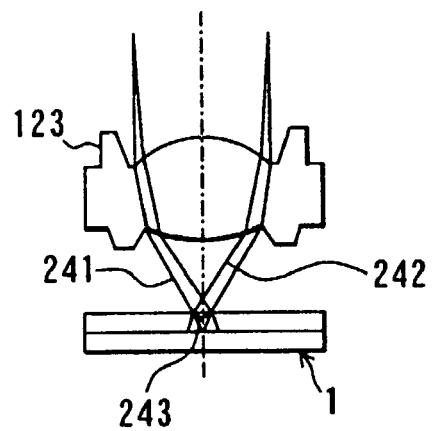
FIG. 46 is an illustration of how to illuminate a double-sided optical information recording medium as shown in FIG. 44 or 45 with reference light for recording and information light.

FIGS. 44 through 46 show double-sided type optical information recording media 1 wherein FIG. 44 is a sectional view of a transparent substrate gap type optical information recording medium 1; FIG. 45 is a sectional view of an air gap type optical information recording medium 1; and FIG. 46 is an illustration of how to illuminate a double-sided optical information recording medium 1 with reference light for recording and information light. The optical information recording medium 1 shown in FIG. 44 has a structure formed of two single-sided type optical information recording media as shown in FIG. 42 which are laminated to each other at the reflecting films 234 thereof. The optical information recording medium 1 shown in FIG. 45 has a structure formed of two single-sided type optical information recording media as shown in FIG. 35 which are laminated to each other at the reflecting substrates 221 thereof. The combined thickness of the transparent substrate 222, hologram layer 225 and the air gap of one side of the optical information recording medium 1 shown in FIG. 45 is 0.6 mm.

Reference light 241 for recording projected upon the optical information recording medium 1 by the objective lens 123 converges to a minimum diameter on the surface having pre-grooves formed thereon, and information light 242 projected upon the optical information recording medium 1 by the objective lens 123 converges to a minimum diameter before the hologram layers 232 and 225. As a result, a region 243 of interference between the reference light 241 for recording and the information light 242 is formed in the hologram layers 232 and 225.

Figure 47:
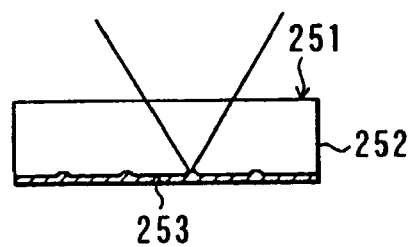
FIG. 47 is an illustration of a single-sided type optical disk.
Figure 48:
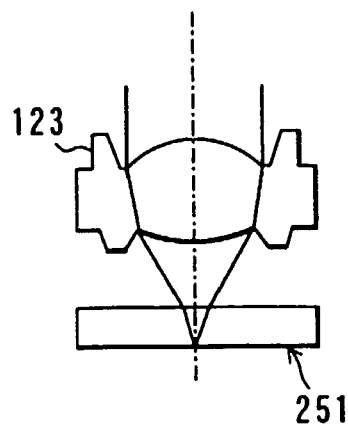
FIG. 48 is an illustration of the use of the optical disk shown in FIG. 47 in the optical information recording/reproducing apparatus according to the third embodiment of the invention.

The optical information recording/reproducing apparatus of the present embodiment is capable of recording and reproducing information using conventional optical disks. For example, when a single-sided type optical disk 251 is used which has pre-grooves formed on one side of a transparent substrate 252 thereof and which is provided with a reflecting film 253 as shown in FIG. 47, light projected upon the optical disk 251 by the objective lens 123 is converged to a minimum diameter on the surface of the optical disk 251 formed with pre-grooves, i.e., an information layer, as shown in FIG. 48. For example, the thickness of the transparent substrate 252 of the optical disk 251 shown in FIG. 47 is 1.2 mm. Optical disks having a structure as shown in FIG. 47 include CDs, CD-ROMs, CD-Rs (write once type CDs) and MDs (mini-disks).

Figure 49:
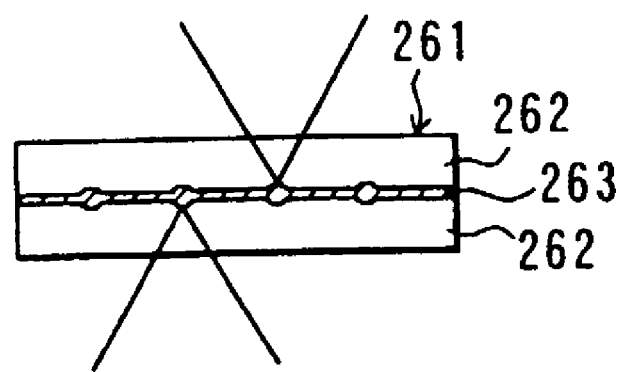
FIG. 49 is an illustration of a double-sided type optical disk.
Figure 50:
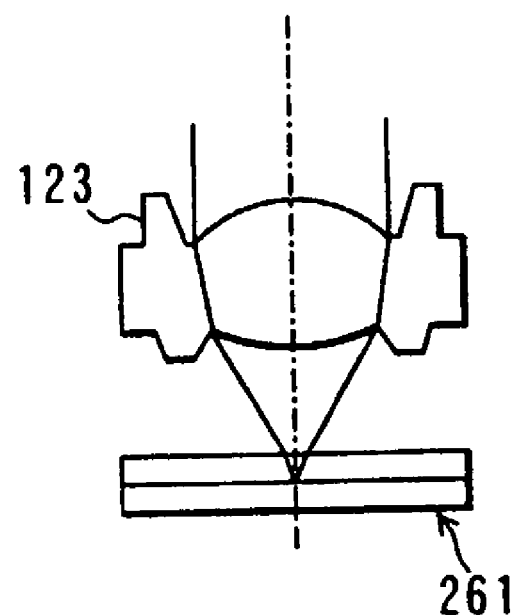
FIG. 50 is an illustration of the use of the optical disk shown in FIG. 49 in the optical information recording/reproducing apparatus according to the third embodiment of the invention.

When a double-sided type optical disk 261 is used which has a structure formed by two transparent substrates 262 formed with pre-grooves and provided with a reflecting film 263 on one side thereof which are laminated to each other at the reflecting films 263 as shown in FIG. 49, light projected upon the optical disk 261 by the objective lens 123 is converged to a minimum diameter on the surface of the optical disk 261 formed with pre-grooves, i.e., an information layer, as shown in FIG. 50. For example, the thickness of one of the transparent substrates 262 of the optical disk 261 shown in FIG. 49 is 0.6 mm. Optical disks having a structure as shown in FIG. 50 include DVDs, DVD-ROMS, DVD-RAMs, MOs (magneto-optical disks).

The second information layer of the optical information recording medium 1 according to the present embodiment may be similar in configuration to information layers of conventional optical disks, for example, as shown in FIGS. 47 and 49, including the contents of information recorded therein. In this case; information recorded in the second information layer can be reproduced by putting the pick-up 111 in a servo state. Since information for servo and address information are recorded in the information layer of a conventional optical disk, by configuring the second information layer similarly to the information layer of a conventional optical disk, information for servo and address information recorded in the information layer of a conventional optical disk can be used, as it is, to position information light, reference light for recording and reference light for reproduction in the hologram layer for performing recording and reproduction. The second information layer serves a wide range of applications, e.g., high speed retrieval can be performed by recording directory information, directory management information and the like for information recorded in the first information layer (hologram layer) in the second information layer (information layer of a conventional optical disk).

Figure 51:
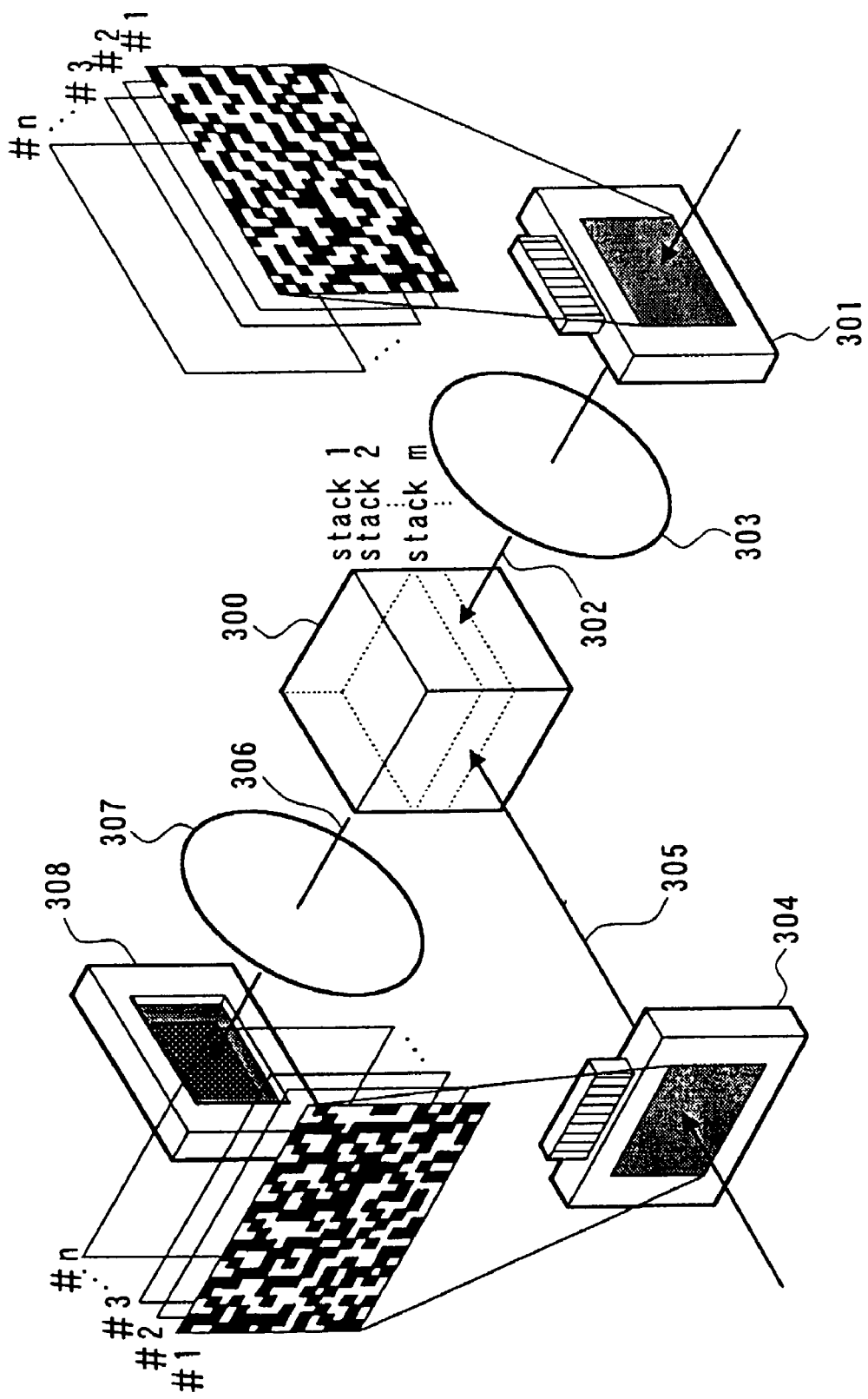
FIG. 51 is a perspective view of a common recording/reproducing system that performs phase-encoding multiplexing showing a schematic configuration thereof.

Prior to a description of the operation of the optical information recording/reproducing apparatus according to the present embodiment, a description will now be made on a principle behind phase-encoding multiplexing with reference to FIG. 51 and FIGS. 52A through 52C. FIG. 51 is a perspective view showing a schematic configuration of a common recording/reproducing system for performing phase-encoding multiplexing. The recording/reproducing system has: a spatial light modulator 301 for generating information light 302 based on two-dimensional digital pattern information; a lens 303 for collecting the information light 302 from the spatial light modulator 301 to illuminate a hologram recording medium 300 with the same; a phase-spatial light modulator 304 for generating reference light 305 having a spatially modulated phase to illuminate the hologram recording medium 300 with the reference light 305 in a direction substantially orthogonal to the information light 302; a CCD array 308 for detecting reproduced two-dimensional digital pattern information; and a lens 307 for collecting reproduction light 306 emitted by the hologram recording medium 300 and for projecting the same upon the CCD array 308.

During recording, the recording/reproducing system shown in FIG. 51 digitizes information such as an original image to be recorded and rearranges resultant signals having a value of 0 or 1 on a two-dimensional basis to generate two-dimensional digital pattern information (hereinafter referred to as "page data"). Let us assume here that page data #1 through #n are recorded in the same hologram recording medium 300 on a multiplex basis. Further, different items of two-dimensional digital pattern information #1 through #n for phase modulation (hereinafter referred to as "phase data") are generated for the respective page data #1 through #n. First, when the page data #1 is recorded, the spatial light modulator 301 generates spatially modulated information light 302 based on the page data #1 to illuminate the hologram recording medium 300 through the lens 303. Simultaneously, the phase-spatial light modulator 304 generates reference light 305 having a spatially modulated phase based on the phase data #1 to illuminate the hologram recording medium 300. As a result, interference fringes resulting from overlap between the information light 302 and the reference light 305 are recorded in the hologram recording medium 300. Similarly, to record the page data #2 through #n, the spatial light modulator 301 generates spatially modulated information light 302 based on the page data #2 through #n; the phase-spatial light modulator 304 generates reference light 305 having a spatially modulated phase based on the phase data #2 through #n; and the hologram recording medium 300 is illuminated with the information light 302 and the reference light 305. Thus, a plurality of pieces of information are recorded in the same location of the hologram recording medium 300 on a multiplex basis. Such a hologram having information recorded therein on a multiplex basis is referred to as "stack". In the example shown in FIG. 51, the hologram recording medium 300 has a plurality of stacks (stack 1, stack 2, . . . , stack m, . . . ).

Arbitrary page data can be reproduced from a stack by illuminating the stack with the reference light 305 having a phase which has been spatially modulated based on the same phase data as used for the recording of the page data. As a result, the reference light 305 is selectively diffracted by interference fringes associated with the phase data and page data to produce reproduction light 306. The reproduction light 306 impinges upon the CCD array 308 through the lens 307, and the CCD array 308 detects a two-dimensional pattern of the reproduction light. The detected two-dimensional pattern of the reproduction light is decoded conversely to the process for recording, so that the information such as an original image is reproduced.

Figure 52A:
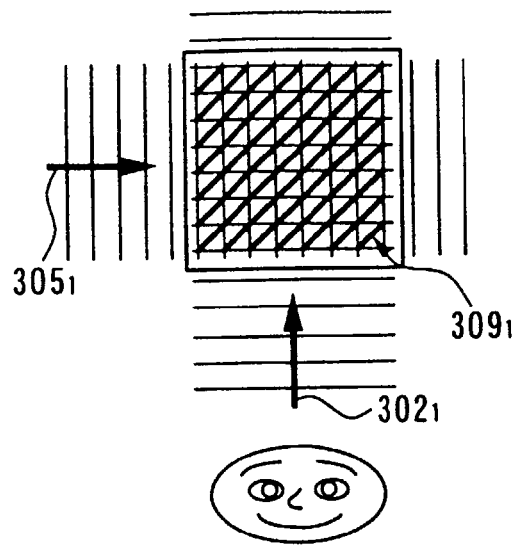
FIGS. 52A through 52C are illustrations showing how interference fringes are formed in a hologram recording medium as a result of interference between information light and reference light.
Figure 52B:
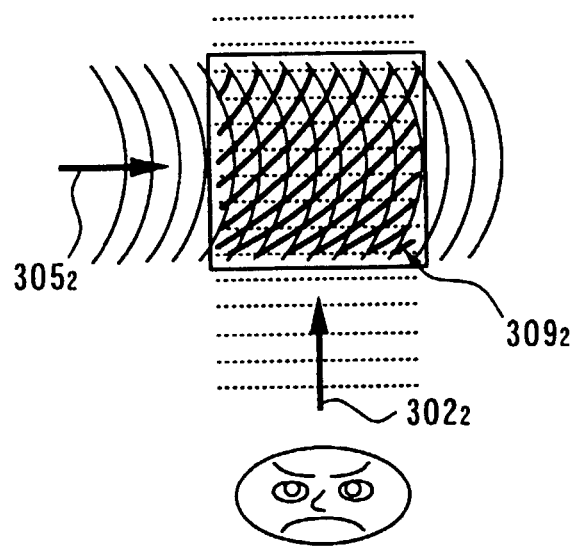
Figure 52C:
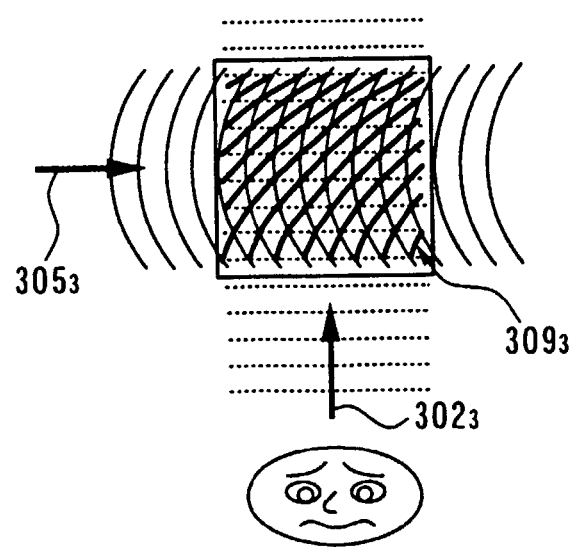

FIGS. 52A through 52C show how interference fringes are formed in the hologram recording medium 300 as a result of interference between information light 302 and reference light 305. FIG. 52A shows how interference fringes $309_1$ are formed as a result of interference between information light $302_1$ based on the page data #1 and reference light $305_1$ based on the phase data #1. Similarly, FIG. 52B shows how interference fringes $309_2$ are formed as a result of interference between information light $302_2$ based on the page data #2 and reference light $305_2$ based on the phase data #2. FIG. 52C shows how interference fringes $309_3$ are formed as a result of interference between information light $302_3$ based on the page data #3 and reference light $305_3$ based on the phase data #3.

Servo, recording and reproducing operations of the optical information recording/reproducing apparatus according to the present embodiment will now be separately described in that order.

Figure 53:
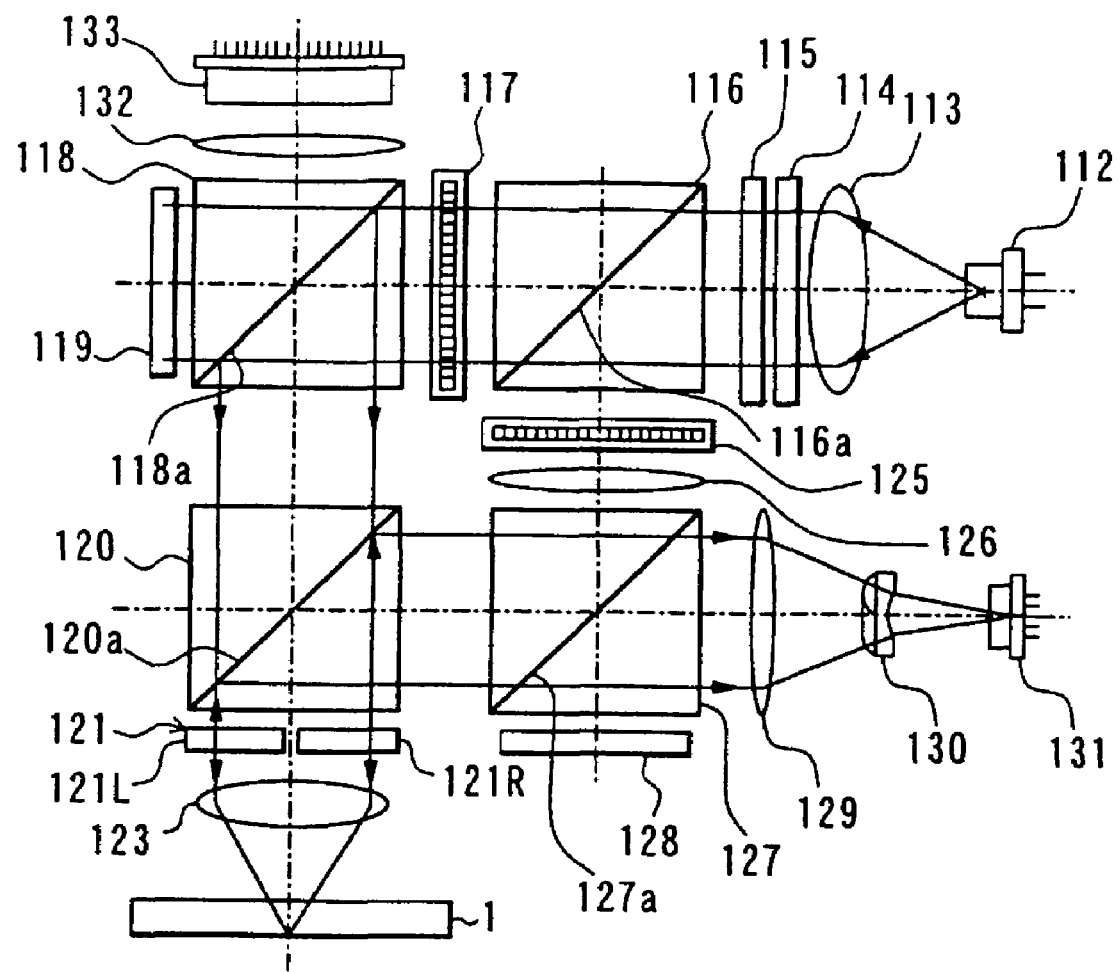
FIG. 53 is an illustration of a state of the pick-up of the third embodiment of the invention during a servo operation.

A servo operation will now be described with reference to FIGS. 53 and 54. FIG. 53 is an illustration of a state of the pick-up 111 during a servo operation. During a servo operation, all pixels of the spatial light modulator 125 are in a blocking state. The phase-spatial light modulator 117 is set such that light passing through all pixels have the same phase. The output of the emission of light from the light source device 112 is set at a low output for reproduction. The controller 90 predicts the timing at which light that has exited the objective lens 123 passes through the address servo areas 6 based on a basic clock reproduced from a reproduction signal RF and maintains the above-described setting while the light from the objective lens 123 passes through the address servo areas 6.

Light emitted by the light source device 112 is collimated by the collimator lens 113 to impinge upon the polarization beam splitter 116 after passing through the ND filter 114 and rotating optical element 115 sequentially. S-polarized components in the light incident upon the polarization beam splitter 116 are reflected by the polarization beam splitter surface 116a and are blocked by the spatial light modulator 125. P-polarized components in the light incident upon the polarization beam splitter 116 are transmitted by the polarization beam splitter surface 116a and passes through the phase-spatial light modulator 117 to impinge upon the beam splitter 118. A part of the light incident upon the beam splitter 118 is reflected by the beam splitter surface 118a and passes through the polarization beam splitter 120 to impinge upon the double optically rotating plate 121. Light that has passed through the optically rotating plate 121R of the double optically rotating plate 121 becomes B-polarized light, and light that has passed through the optically rotating plate 121L becomes A-polarized light. The light that has passed through the double optically rotating plate 121 is reflected by the raising mirror 122, collected by the objective lens 123 and projected upon the optical information recording medium 1 so that it converges on the pre-grooves of the optical information recording medium 1 located further than the hologram layer. This light is reflected on the pre-grooves and, at that time, it is modulated by pits formed on the pre-grooves and then returns to the objective lens 123. The raising mirror 122 is omitted in FIG. 53.

The return light from the optical information recording medium 1 is collimated by the objective lens 123 and passes through the double optically rotating plate 121 to become S-polarized light. The return light is reflected by the polarization beam splitter surface 120a of the polarization beam splitter 120 to impinge upon the beam splitter 127. A part of the light is transmitted by the beam splitter surface 127a and passes through the convex lens 129 and cylindrical lens 130 sequentially to be detected by the quadruple photodetector 131. Based on the output of the quadruple photodetector 131, the detection circuit 85 generates a focus error signal FE, tracking error signal TE and reproduction signal RF based on which focus servo and tracking servo are performed; the basic clock is generated; and addresses are determined.

A part of the light incident upon the beam splitter 118 impinges upon the photodetector 119, and a signal $APC_{ref}$ is generated by the APC circuit 146 based on a signal output by the photodetector 119. APC is performed based on the signal $APC_{ref}$ such that the optical information recording medium 1 is illuminated with a constant quantity of light. Specifically, the driving circuit 148 drives the motor 142 to adjust the rotating optical element 115 such that the signal $APC_{ref}$ equals a predetermined value. Alternatively, during the servo operation, APC may be performed by setting the rotating optical element 115 and adjusting the output of the light source device 112 such that light which has passed through the rotating optical element 115 has P-polarized components only. When the light-receiving portion of the photodetector 119 is divided into a plurality of regions and the phase-spatial light modulator 117 is capable of adjusting the quantity of light transmitted thereby, the quantity of light transmitted by each pixel of the phase-spatial light modulator 117 may be adjusted based on a signal output by each of the light-receiving portions of the photodetector 119 to adjust the light projected upon the optical information recording medium 1 so as to achieve a uniform intensity distribution.

In the above-described setting for a servo operation, the configuration of the pick-up 111 is similar to the configuration of a pick-up for recording and reproduction on a normal optical disk. Therefore, the optical information recording/reproducing apparatus according to the present embodiment is capable of recording and reproducing by using a normal optical disk.

Figure 54:
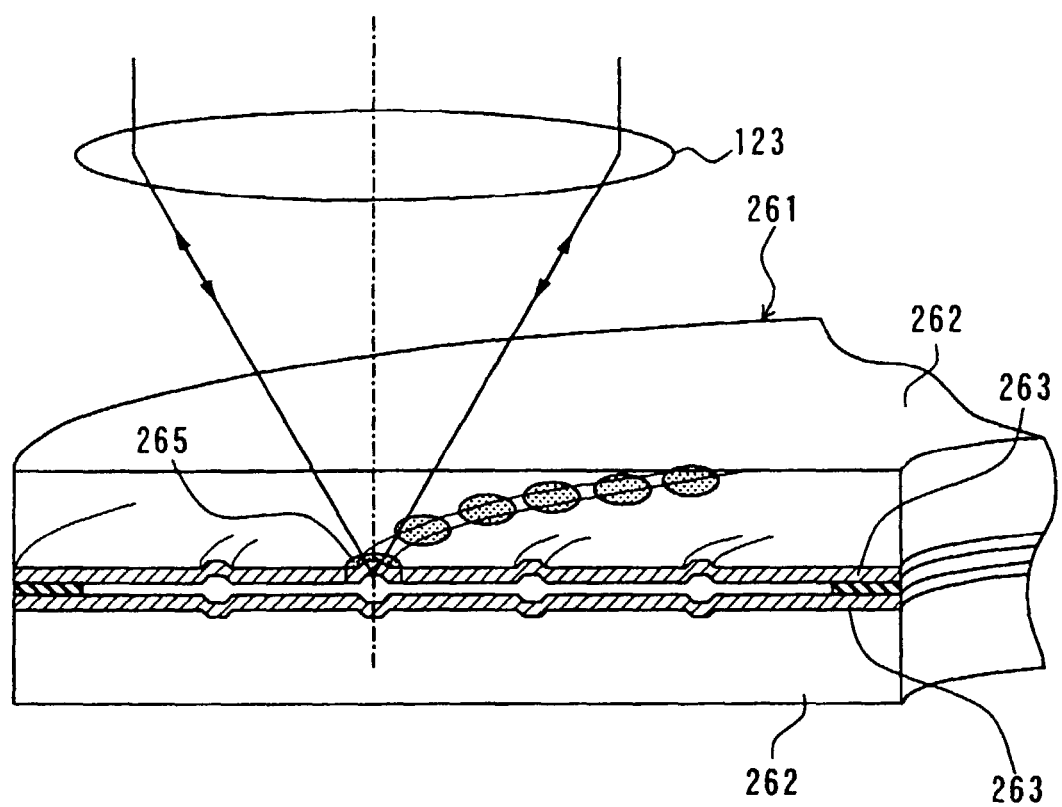
FIG. 54 is an illustration of a state of light in the vicinity of an optical disk in the case of recording and reproduction using a normal optical disk with the optical information recording/reproducing apparatus according to the third embodiment of the invention.

FIG. 54 is an illustration of a state of light in the vicinity of an optical disk in the case of recording and reproduction using a normal optical disk with the optical information recording/reproducing apparatus according to the present embodiment. A double-sided type optical disk 261 is illustrated here as an example of a normal optical disk. In the optical disk 261, pre-grooves 265 are formed on the sides of transparent substrates 262 where reflecting films 263 are provided, and light from the objective lens 123 is projected upon the optical disk 261 such that it converges on the pre-grooves 265 and is returned to the objective lens 123 after being modulated by pits formed on the pre-grooves 265.

Figure 55:
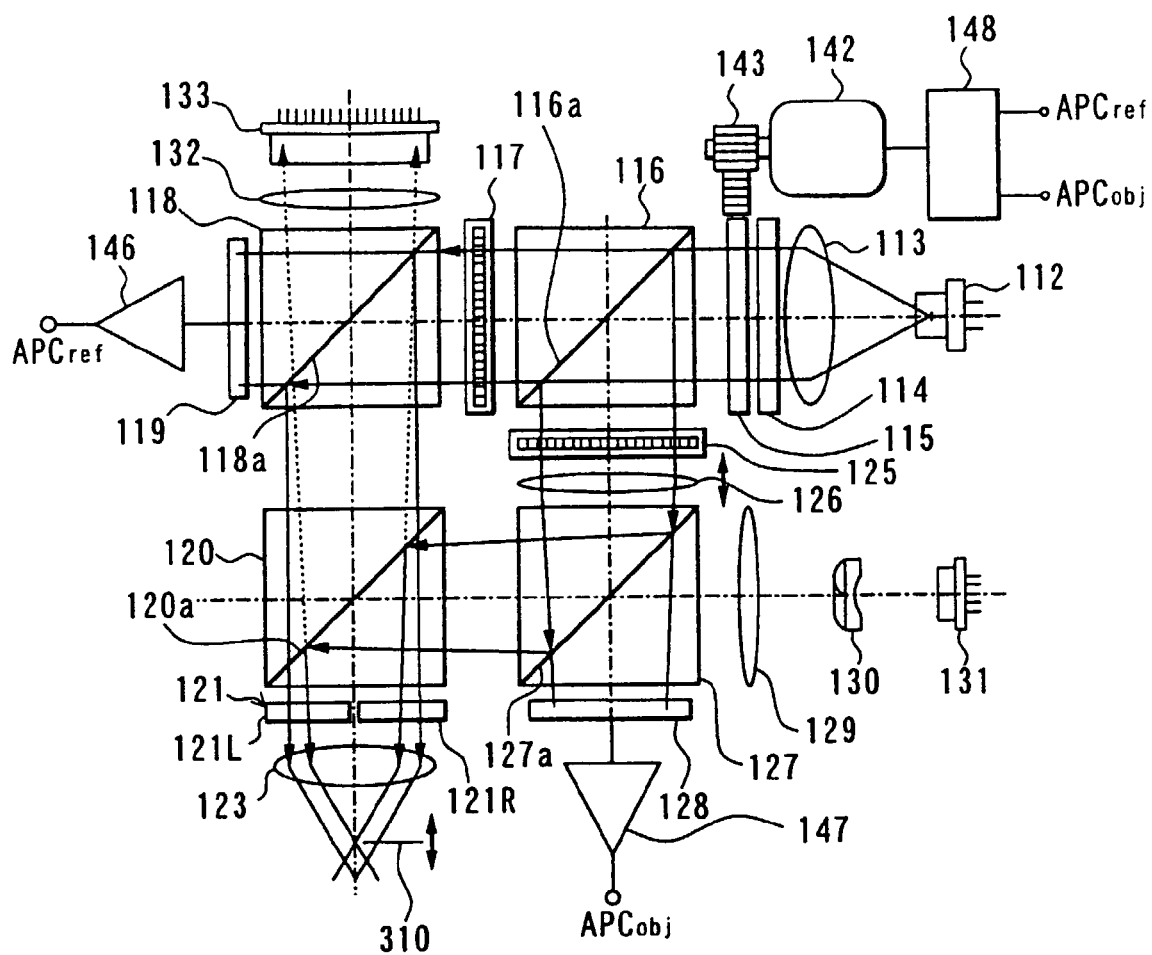
FIG. 55 is an illustration of a state of the pick-up of the third embodiment of the invention during recording.
Figure 56:
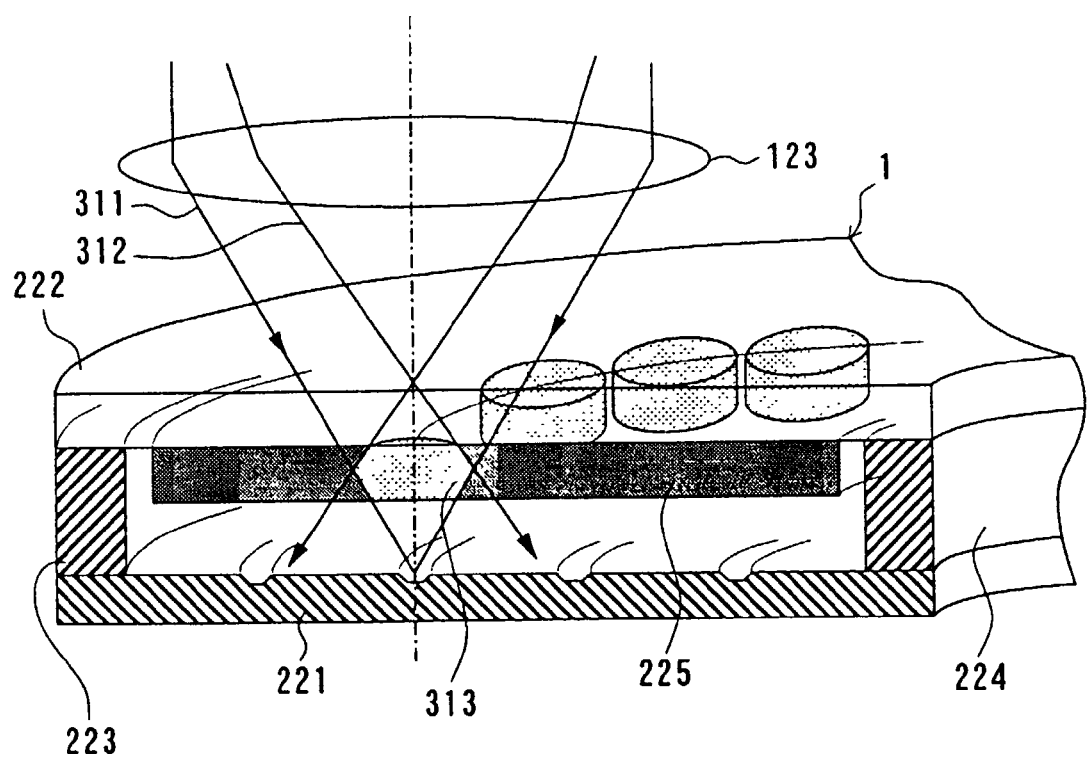
FIG. 56 is an illustration of a state of light in the vicinity of the optical information recording medium of the third embodiment of the invention during recording.
Figure 57:
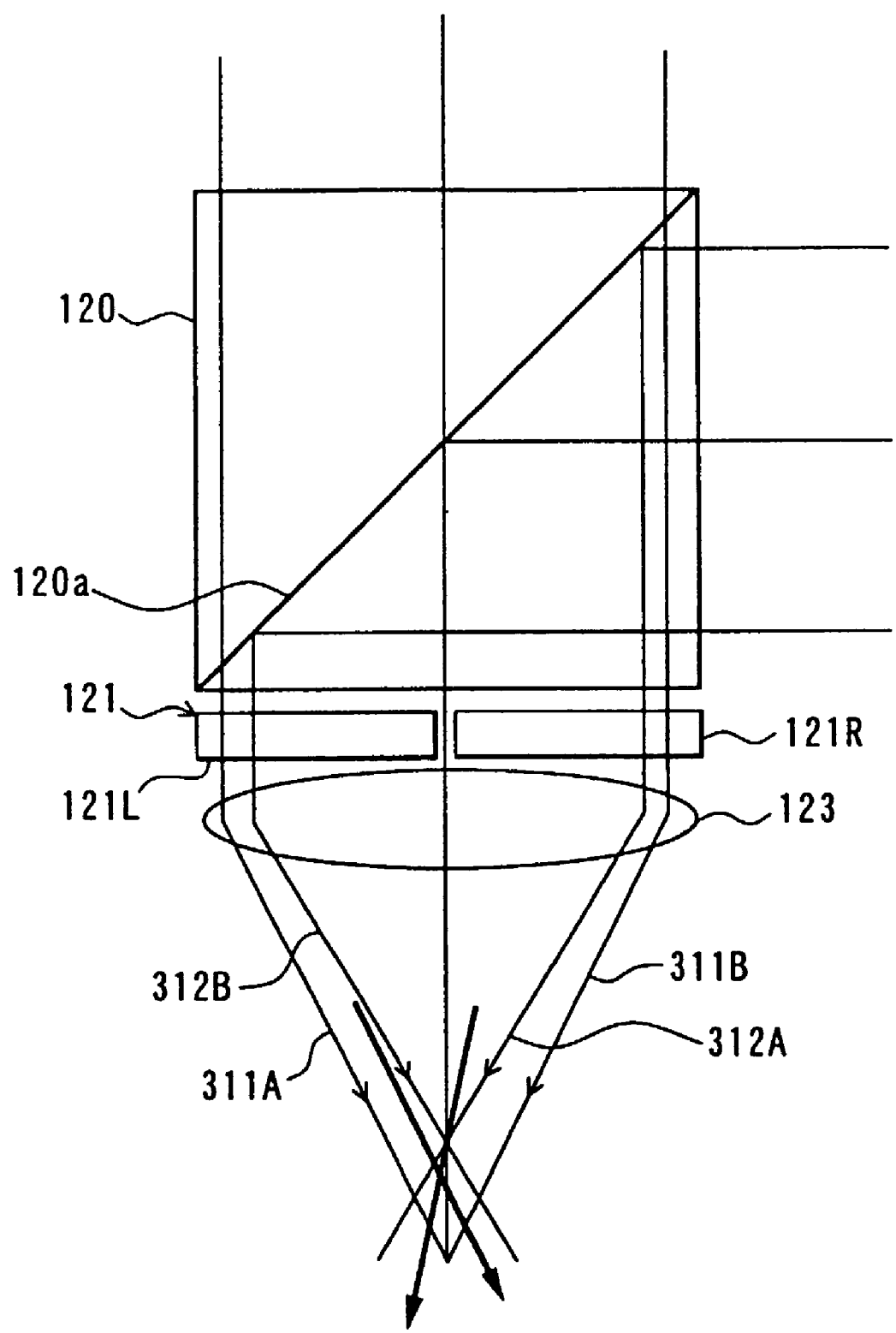
FIG. 57 is an illustration of a state of light in the vicinity of the optical information recording medium of the third embodiment of the invention during recording.

A recording operation will now be described with reference to FIGS. 55 through 57. FIG. 55 is an illustration of a state of the pick-up 111 during recording, and each of FIGS. 56 and 57 is an illustration of a state of light in the vicinity of the optical information recording medium 1 during recording. The following description will refer to the use of an air gap type optical information recording medium 1 as an example, as shown in FIG. 56.

During recording, the spatial light modulator 125 generates information light by selecting a transmitting state (hereinafter also referred to as "on") or a blocking state (hereinafter also referred to as "off") for each pixel depending on the information to be recorded to modulate the light that is passing through it. The phase-spatial light modulator 117 generates reference light for recording having a spatially modulated optical phase by selectively applying a phase difference of 0 (rad) or π (rad) from a predetermined reference phase to each pixel according to a predetermined modulation pattern to modulate the phase of light passing therethrough.

According to the present embodiment, as already described, when multiplex recording of information is carried out on a data area 7 using phase-encoding multiplexing, the center of the objective lens 123 is moved using in-field access such that the center of the objective lens 123 reciprocates within a section including the data area 7 and a part of the address servo areas 6 on both sides thereof. When the center of the objective lens 123 has come to a predetermined position in the data area 7, the output of the light source device 112 is selectively set at a high output for recording.

Light emitted by the light source device 112 is collimated by the collimator lens 113 to impinge upon the polarization beam splitter 116 after passing through the ND filter 114 and rotating optical element 115 sequentially. P-polarized components in the light incident upon the polarization beam splitter 116 are transmitted by the polarization beam splitter surface 116a to pass through the phase-spatial light modulator 117 and, at that time, the phase of the light is spatially modulated to provide reference light for recording. The reference light for recording impinges upon the beam splitter 118. A part of the reference light for recording incident upon the beam splitter 118 is reflected by the beam splitter surface 118a and passes through the polarization beam splitter 120 to impinge upon the double optically rotating plate 121. Reference light for recording that has passed through the optically rotating plate 121R of the double optically rotating plate 121 becomes B-polarized light, and reference light for recording that has passed through the optically rotating plate 121L becomes A-polarized light. The reference light for recording that has passed through the double optically rotating plate 121 is reflected by the raising mirror 122, collected by the objective lens 123 and projected upon the optical information recording medium 1 so that it converges beyond the hologram layer 225 of the optical information recording medium 1. The raising mirror 122 is omitted in FIG. 55.

S-polarized components in the light incident upon the polarization beam splitter 116 are reflected by the polarization beam splitter surface 116a to pass through the spatial light modulator 125 and, at that time, the light is spatially modulated according to the information to be recorded to provide information light. The information light impinges upon the beam splitter 127. A part of the information light incident upon the beam splitter 127 is reflected by the beam splitter surface 127a and is reflected by the beam splitter surface 120a of the polarization beam splitter 120 to impinge upon the double optically rotating plate 121. Information light that has passed through the optically rotating plate 121R of the double optically rotating plate 121 becomes A-polarized light, and information light that has passed through the optically rotating plate 121L becomes B-polarized light. The information light that has passed through the double optically rotating plate 121 is reflected by the raising mirror 122, collected by the objective lens 123 and projected upon the optical information recording medium 1 so that it temporarily converges before the hologram layer 225 of the optical information recording medium 1 and then divergingly passes through the hologram layer 225.

As a result, a region 313 of interference between reference light 311 for recording and information light 312 is formed in the hologram layer 225, as shown in FIG. 56. The interference region 313 is in the form of a barrel. As shown in FIG. 55, the converging position of the information light can be adjusted by adjusting the position 310 of the convex lens 126, which makes it possible to adjust the size of the interference region 313.

In the hologram layer 225, as shown in FIG. 57, interference occurs between A-polarized reference light 311A for recording that has passed through the optically rotating plate 121L of the double optically rotating plate 121 and A-polarized information light 312A that has passed through the optically rotating plate 121R of the double optically rotating plate 121; and interference occurs between B-polarized reference light 311B for recording that has passed through the optically rotating plate 121R of the double optically rotating plate 121 and B-polarized information light 312B that has passed through the optically rotating plate 121L of the double optically rotating plate 121, resultant interference patterns being volumetrically recorded in the hologram layer 225.

By changing the modulation pattern for the phase of the reference light for recording for each item of information to be recorded, a plurality of pieces of information can be recorded in the same location of the hologram layer 225 on a multiplex basis.

As shown in FIG. 55, a part of the reference light for recording incident upon the beam splitter 118 impinges upon the photodetector 119, and a signal $APC_{ref}$ is generated by the APC circuit 146 based on a signal output by the photodetector 119. A part of the information light incident upon the beam splitter 127 impinges upon the photodetector 128, and a signal $APC_{obj}$ is generated by the APC circuit 147 based on a signal output by the photodetector 128. Based on the signals $APC_{ref}$ and $APC_{obj}$, APC is performed such that the ratio between the intensity of the reference light for recording and the information light illuminating the optical information recording medium 1 is set at an optimum value. Specifically, the driving circuit 148 compares the signals $APC_{ref}$ and $APC_{obj}$ and drives the motor 142 to adjust the rotating optical element 115 such that the signals are in a desired ratio. When the light-receiving portion of the photodetector 119 is divided into a plurality of regions and the phase-spatial light modulator 117 is capable of adjusting the quantity of light transmitted thereby, the quantity of light transmitted by each pixel of the phase-spatial light modulator 117 may be adjusted based on a signal output by each of the light-receiving portions of the photodetector 119 to adjust the light projected upon the optical information recording medium 1 so as to achieve a uniform intensity distribution. Similarly, when the light-receiving portion of the photodetector 128 is divided into a plurality of regions and the spatial light modulator 125 is also capable of adjusting the quantity of light transmitted thereby, the quantity of light transmitted by each pixel of the spatial light modulator 125 may be adjusted based on a signal output by each of the light-receiving portions of the photodetector 128 to adjust the light projected upon the optical information recording medium 1 so as to achieve a uniform intensity distribution.

According to the present embodiment, APC is carried out based on the sum of the signals $APC_{ref}$ and $APC_{obj}$ such that the total intensity of the reference light for recording and the information light becomes an optimum value. Methods for controlling the total intensity of the reference light for recording and the information light include control over a peak value of the output of the light source device 112 and control over an emission pulse width and a profile of the intensity of emitted light over time when light is emitted in the form of pulses.

Figure 58:
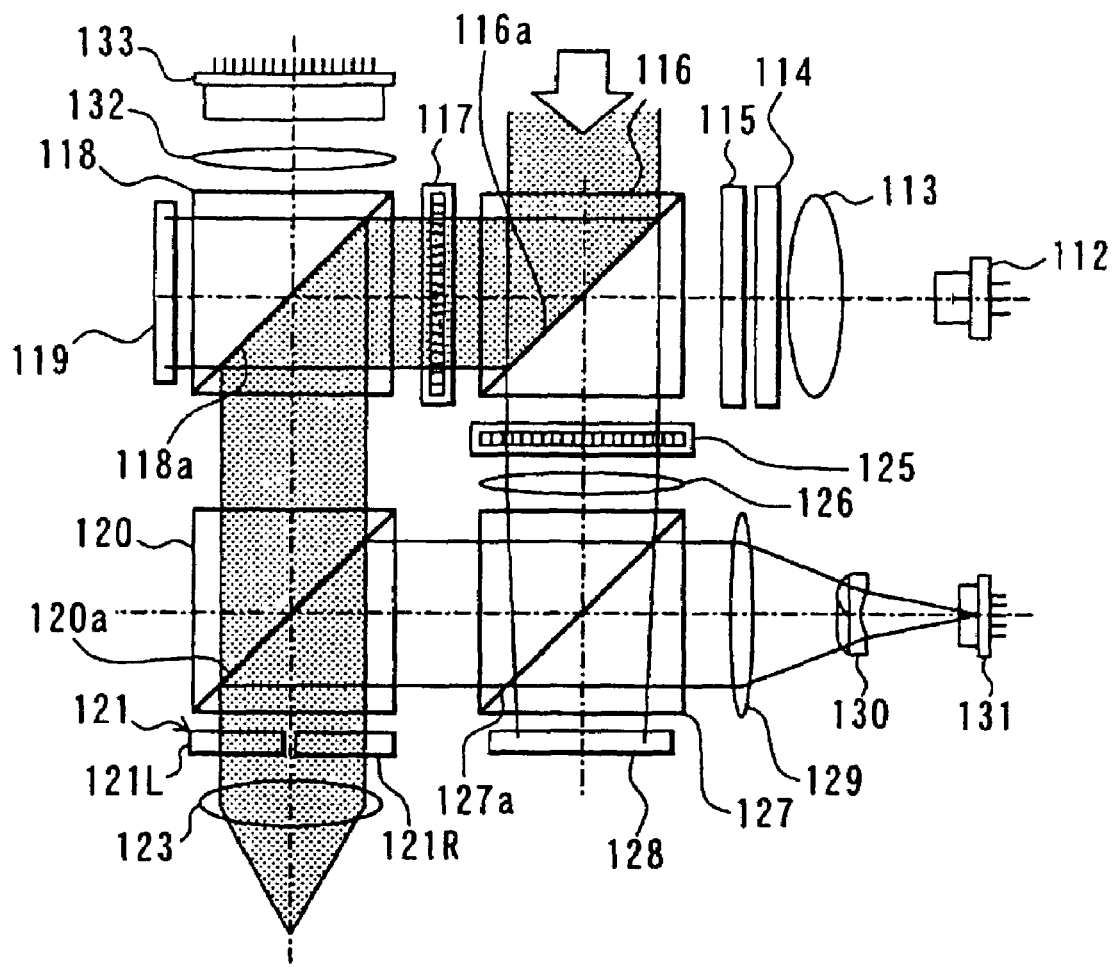
FIG. 58 is an illustration of a state of the pick-up of the third embodiment of the invention during fixing.
Figure 59:
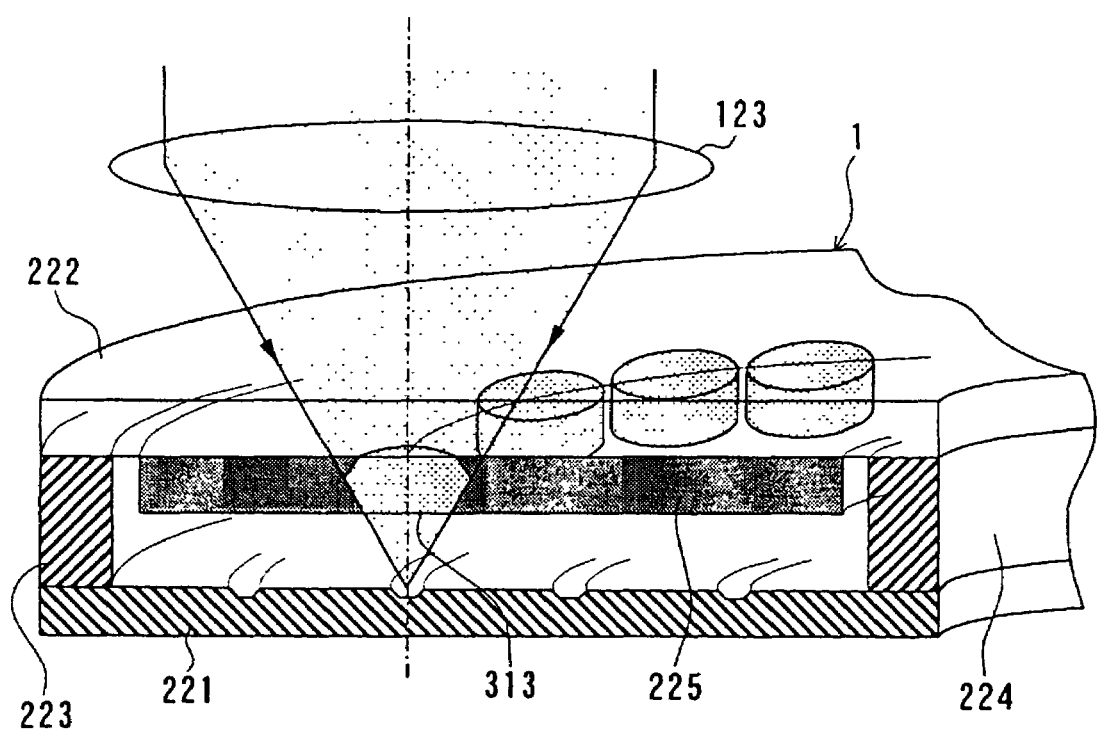
FIG. 59 is an illustration of a state of light in the vicinity of the optical information recording medium of the third embodiment of the invention during fixing.

A fixing operation will now be described with reference to FIGS. 58 and 59. FIG. 58 is an illustration of a state of the pick-up 111 during a fixing operation, and FIG. 59 is an illustration of a state of light in the vicinity of the optical information recording medium 1 during fixing. During a fixing operation, all pixels of the spatial light modulator 125 are in a blocking state. The phase-spatial light modulator 117 is set such that light passing through all pixels thereof have the same phase. No light is emitted by the light source device 112, and S-polarized ultraviolet light for fixing is emitted by the fixing light source device 135.

Light emitted by the fixing light source device 135 is collimated by the collimator lens 134 to impinge upon the polarization beam splitter 116, reflected by the polarization beam splitter surface 116a and passes through the phase-spatial light modulator 117 to impinge upon the beam splitter 118. A part of the light incident upon the beam splitter 118 is reflected by the beam splitter surface 118a to impinge upon the double optically rotating plate 121 through the polarization beam splitter 120. Light that has passed through the optically rotating plate 121R of the double optically rotating plate 121 becomes B-polarized light, and light that has passed through the optically rotating plate 121L becomes A-polarized light. The light that has passed through the double optically rotating plate 121 is reflected by the raising mirror 122, collected by the objective lens 123 and projected upon the optical information recording medium 1 so that it converges on the pre-grooves of the optical information recording medium 1 located further than the hologram layer 225. This light fixes the interference pattern formed in the interference region 313 in the hologram layer 225. The raising mirror 122 is omitted in FIG. 58.

The positioning (servo) of fixing light on an optical information recording medium 1 can be performed similarly to the positioning of reference light for recording and information light during recording.

A part of the light incident upon the beam splitter 118 impinges upon the photodetector 119, and a signal $APC_{ref}$ is generated by the APC circuit 146 based on a signal output by the photodetector 119. Based on the signal $APC_{ref}$, APC is performed such that the quantity of fixing light illuminating the optical information recording medium 1 is constant. Specifically, the output of the fixing light source device 135 is adjusted such that the signal $APC_{ref}$ equals a predetermined value. Alternatively, when the light-receiving portion of the photodetector 119 is divided into a plurality of regions and the phase-spatial light modulator 117 is capable of adjusting the quantity of light transmitted thereby, the fixing light illuminating the optical information recording medium 1 may be adjusted to achieve a uniform intensity of light by adjusting the quantity of light transmitted by each of the pixels of the phase-spatial light modulator 117 based on a signal output by each of the light-receiving portions of the photodetector 119.

Figure 60:
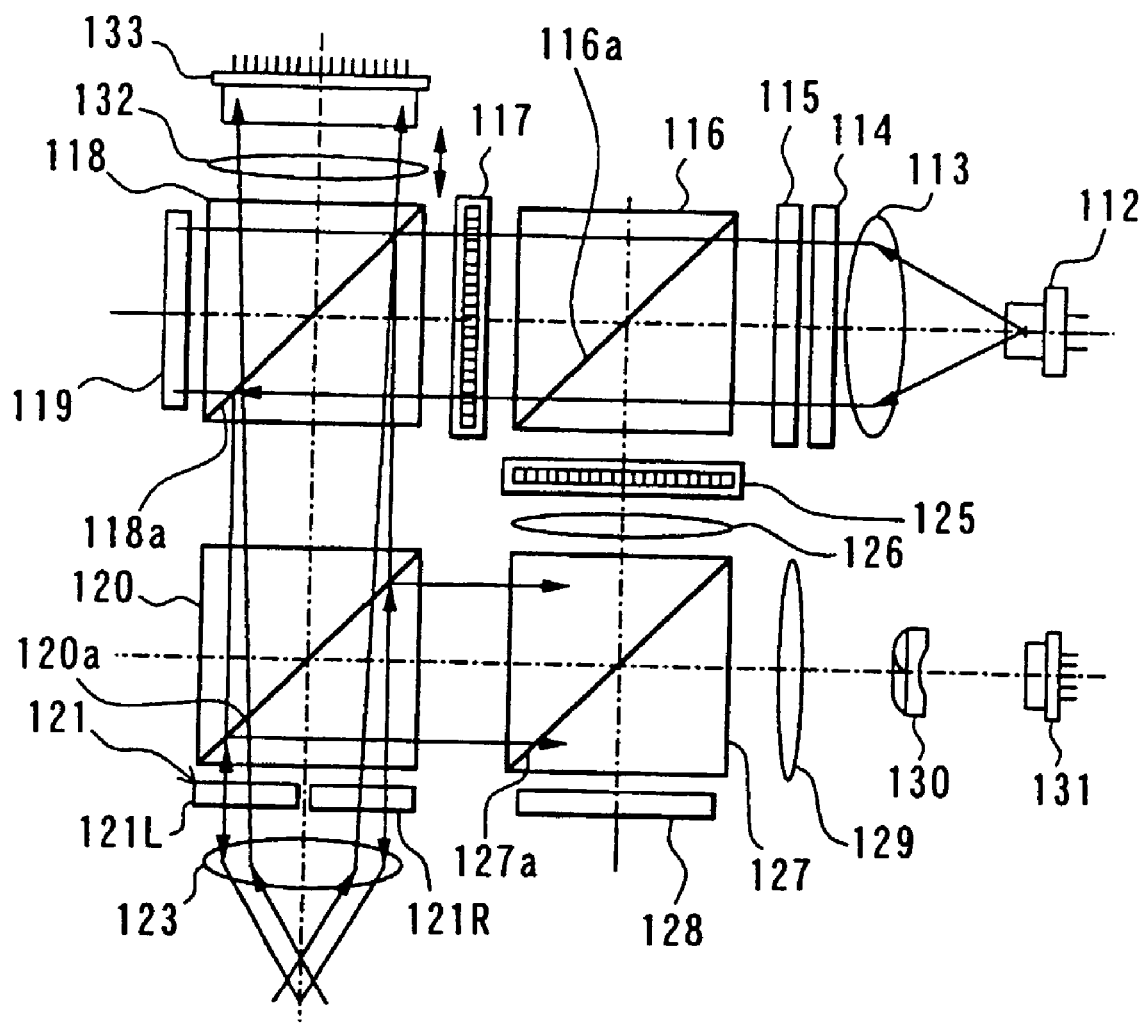
FIG. 60 is an illustration of a state of the pick-up of the third embodiment of the invention during reproduction.
Figure 61:
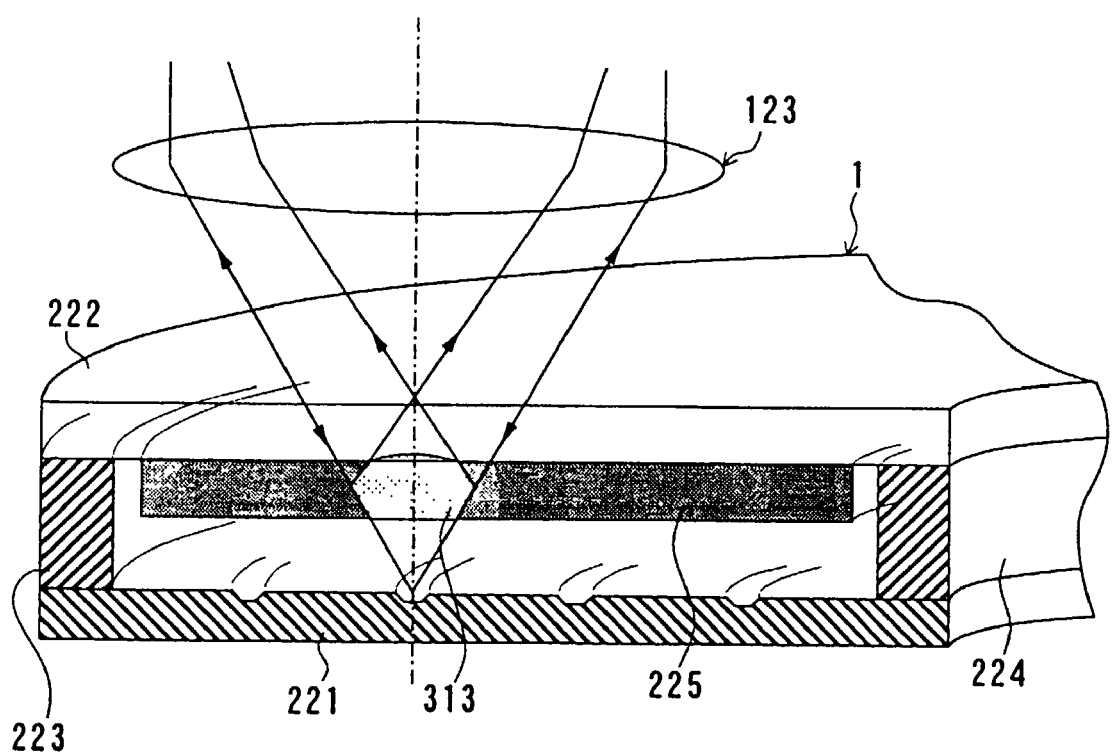
FIG. 61 is an illustration of a state of light in the vicinity of the optical information recording medium of the third embodiment of the invention during reproduction.
Figure 62:
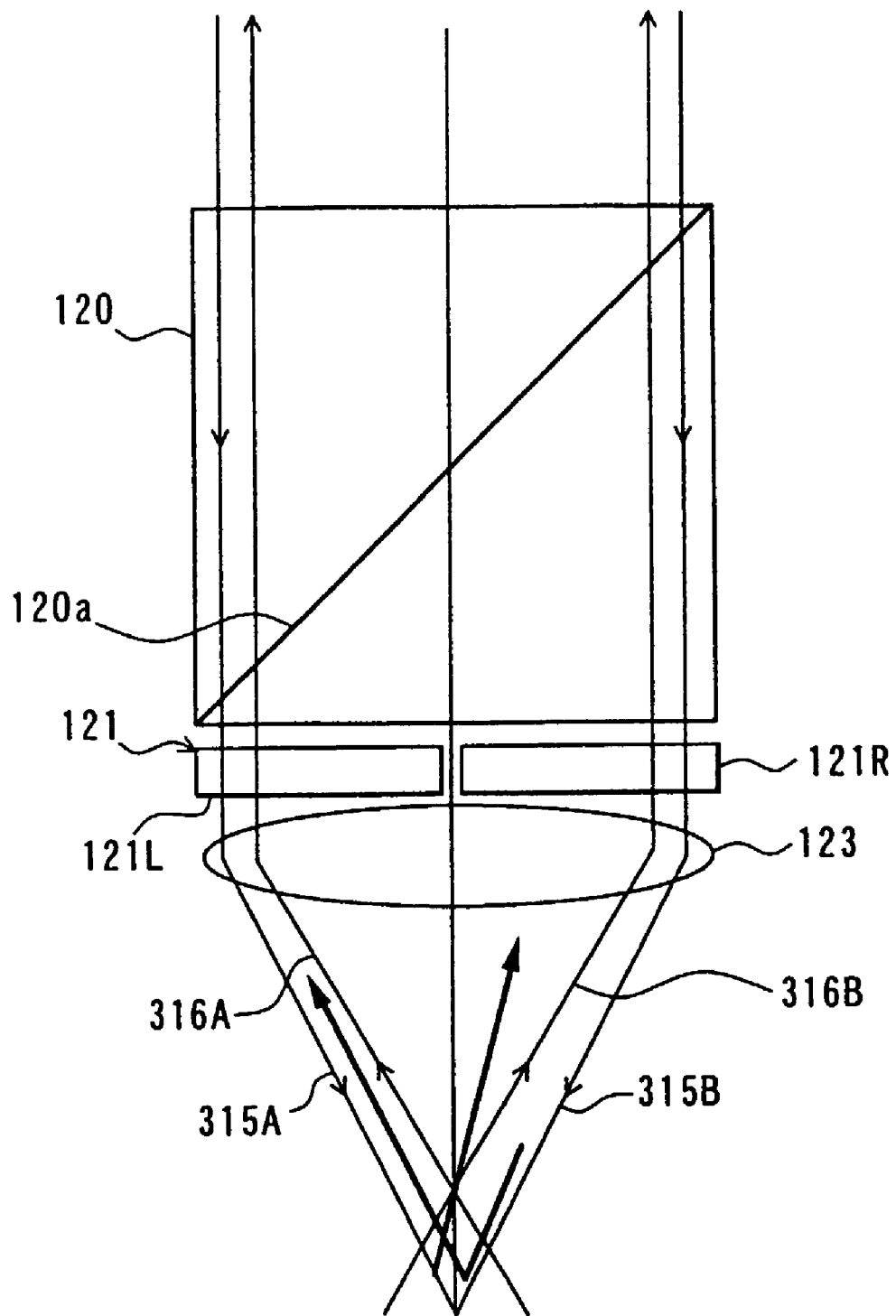
FIG. 62 is an illustration of a state of light in the vicinity of the optical information recording medium of the third embodiment of the invention during reproduction.

A reproducing operation will now be described with reference to FIGS. 60 through 62. FIG. 60 is an illustration of a state of the pick-up 111 during reproduction, and each of FIGS. 61 and 62 is an illustration of a state of light in the vicinity of an optical information recording medium 1 during reproduction.

During reproduction, all pixels of the spatial light modulator 125 are in a blocking state. The phase-spatial light modulator 117 generates reference light for reproduction having a spatially modulated optical phase by selectively applying a phase difference of 0 (rad) or π (rad) from a predetermined reference phase to each pixel according to a predetermined modulation pattern to modulate the phase of light passing therethrough. According to the present embodiment, a modulation pattern for the phase of reference light for reproduction is a pattern which is in a point symmetrical relationship with a modulation pattern of the phase of reference light for recording at the time of recording of the information to be reproduced about the center of the phase-spatial light modulator 117.

Light emitted by the light source device 112 is collimated by the collimator lens 113 to impinge upon the polarization beam splitter 116 after passing through the ND filter 114 and the rotating optical element 115 sequentially. S-polarized components in the light incident upon the polarization beam splitter 116 are reflected by the polarization beam splitter surface 116a and are blocked by the spatial light modulator 125. P-polarized components in the light incident upon the polarization beam splitter 116 are transmitted by the polarization beam splitter surface 116a to pass through the phase-spatial light modulator 117 and, at that time, the phase of the light is spatially modulated to provide reference light for reproduction. The reference light for reproduction impinges upon the beam splitter 118. A part of the reference light for reproduction incident upon the beam splitter 118 is reflected by the beam splitter surface 118a and passes through the polarization beam splitter 120 to impinge upon the double optically rotating plate 121. Reference light for reproduction that has passed through the optically rotating plate 121R of the double optically rotating plate 121 becomes B-polarized light, and reference light for reproduction that has passed through the optically rotating plate 121L becomes A-polarized light. The reference light for reproduction that has passed through the double optically rotating plate 121 is reflected by the raising mirror 122, collected by the objective lens 123 and projected upon the optical information recording medium 1 so that it converges beyond the hologram layer 225 of the optical information recording medium 1. The raising mirror 122 is omitted in FIG. 60.

The positioning (servo) of reference light for reproduction on an optical information recording medium 1 can be performed similarly to the positioning of reference light for recording and information light during recording.

As shown in FIG. 62, B-polarized reference light 315B for reproduction that has passed through the optically rotating plate 121R of the double optically rotating plate 121 passes through the hologram layer 225, and is reflected by the reflecting surface located at a converging position on the further side of the hologram layer 225, and then passes through the hologram layer 225 again. At this time, the reference light 315B for reproduction reflected by the reflecting surface passes through the location in the interference region 313 that was illuminated with the reference light 311A for recording during recording, and has the same modulation pattern as that of the reference light 311A for recording. Therefore, the reference light 315B for reproduction results in the emission of reproduction light 316B associated with the information light 312A at the time of recording from the interference region 313. The reproduction light 316B travels toward the objective lens 123.

Similarly, A-polarized reference light 315A for reproduction that has passed through the optically rotating plate 121L of the double optically rotating plate 121 passes through the hologram layer 225, and is reflected by the reflecting surface located at the converging position on the further side of the hologram layer 225, and then passes through the hologram layer 225 again. At this time, the reference light 315A for reproduction reflected by the reflecting surface passes through the location in the interference region 313 that was illuminated with the reference light 311B for recording during recording, and has the same modulation pattern as that of the reference light 311B for recording. Therefore, the reference light 315A for reproduction results in the emission of reproduction light 316A associated with the information light 312B at the time of recording from the interference region 313. The reproduction light 316A travels toward the objective lens 123.

After passing through the objective lens 123, the B-polarized reproduction light 316B passes through the optically rotating plate 121R of the double optically rotating plate 121 to become P-polarized light. After passing through the objective lens 123, the A-polarized reproduction light 316A passes through the optically rotating plate 121L of the double optically rotating plate 121 to become P-polarized light. The reproduction light that has passed through the double optically rotating plate 121 impinges upon the polarization beam splitter 120 and is transmitted by the polarization beam splitter surface 120a to impinge upon the beam splitter 118. A part of the reproduction light incident upon the beam splitter 118 is transmitted by the beam splitter surface 118a and passes through the imaging lens 132 to impinge upon the CCD array 133. As shown in FIG. 60, the state of imaging of the reproduction light on the CCD array 133 can be adjusted by adjusting the position of the imaging lens 132.

A pattern originating from an on/off operation of the spatial light modulator 125 during recording is formed on the CCD array 133, and information is reproduced by detecting this pattern. When a plurality of pieces of information are recorded in the hologram layer 225 on a multiplex basis by varying the modulation pattern for reference light for recording, only information associated with reference light for recording having a modulation pattern in a point symmetrical relationship with the modulation pattern of the reference light for reproduction is reproduced among the plurality of pieces of information.

A part of the reference light for reproduction incident upon the beam splitter 118 impinges upon the photodetector 119, and a signal $APC_{ref}$ is generated by the APC circuit 146 based on a signal output by the photodetector 119. Based on the signal $APC_{ref}$, APC is performed such that the optical information recording medium 1 is illuminated with a constant quantity of light. Specifically, the driving circuit 148 drives the motor 142 to adjust the rotating optical element 115 such that the signal $APC_{ref}$ equals a predetermined value. Alternatively, during reproduction, APC may be performed by setting the rotating optical element 115 and adjusting the output of the light source device 112 such that light which has passed through the rotating optical element 115 has P-polarized components only. When the light-receiving portion of the photodetector 119 is divided into a plurality of regions and the phase-spatial light modulator 117 is capable of adjusting the quantity of light transmitted thereby, the quantity of light transmitted by each pixel of the phase-spatial light modulator 117 may be adjusted based on a signal output by each of the light-receiving portions of the photodetector 119 to adjust the light projected upon the optical information recording medium 1 so as to achieve a uniform intensity distribution.

The present embodiment may employ: a light source device 112 capable of emitting laser light in three colors R, G and B; a CCD array 133 capable of detecting light in three colors R, G and B; and an optical information recording medium 1 having three hologram layers whose optical characteristics are changed by only light in respective colors R, G and B. In this case, it is possible to record three kinds of information in the same location of the optical information recording medium 1 using the same modulation pattern for the reference light for recording, which allows multiplex recording of a greater amount of information. For example, recording media having three hologram layers as described above include HRF-700X059-20 (product name) manufactured by DuPont.

When multiplex recording of information is performed using light in three colors R, G and B as described above, information is recorded in each of R, G and B colors on a time division basis in the same location of an optical information recording medium 1. In doing so, while the modulation pattern for the information light is varied for each of R, G and B colors, the modulation pattern for the reference light for recording is kept unchanged. When each pixel of information light in each color carries binary information, i.e., when each pixel is rendered bright or dark, multiplex recording of information using light in three colors R, G and B makes it possible to record octal ($=2^3$) information for each pixel, for example, R being the MSB (most significant bit), B being the LSB (least significant bit). When the spatial light modulator 125 is capable of adjusting the quantity of light transmitted thereby in three or more steps and each pixel of information light in each color carries information having n (n is an integer equal to or greater than 3) tones, multiplex recording of information using light in three colors R, G and B makes it possible to record information having $n^3$ values for each pixel.

Various methods are possible as described below for reproduction of information when the information is recorded on a multiplex basis using light in three colors R, G and B. Specifically, if the reference light for reproduction is light in any one of R, G and B colors, only information recorded using light in the same color as the reference light for reproduction is reproduced. If the reference light for reproduction is light in any two of R, G and B colors, only two kinds of information recorded using light in the same two colors as the reference light for reproduction are reproduced. The two kinds of information are separated by the CCD array 133 into information in each color. If the reference light for reproduction is light in three colors R, G and B, three kinds of information recorded using light in the three colors are all reproduced. The three kinds of information are separated by the CCD array 133 into information in each color. When the optical information recording medium 1 has a layer for each of R, G and B colors, multiplex recording is performed in the layer in each color using phase-encoding multiplexing. This is advantageous in that it is possible to obtain a reproduction image having a pattern in each of the colors R, G and B for each of phase modulation patterns for the reference light.

A description will now be made with reference to FIGS. 63 and 64 on a direct read after write (hereinafter represented by "DRAW") function and a write power control (hereinafter represented by "WPC") function for multiplex recording of the optical information recording/reproducing apparatus according to the present embodiment.

First, the DRAW function will be described. The DRAW function is a function of reproducing recorded information immediately after the information is recorded. This function makes it possible to verify recorded information immediately after the information is recorded.

A principle behind the DRAW function according to the present embodiment will now be described with reference to FIGS. 55 and 57. First, when the DRAW function is used in the present embodiment, a modulation pattern for reference light for recording is used which is in a point symmetrical relationship with the center of the phase-spatial light modulator 117. During recording, in the hologram layer 225, interference occurs between the A-polarized reference light 311A for recording that has passed through the optically rotating plate 121L of the double optically rotating plate 121 and the A-polarized information light 312A that has passed through the optically rotating plate 121R of the double optically rotating plate 121, and interference occurs between the B-polarized reference light 311B for recording that has passed through the optically rotating plate 121R of the double optically rotating plate 121 and the B-polarized information light 312B that has passed through the optically rotating plate 121L of the double optically rotating plate 121, resultant interference patterns being volumetrically recorded in the hologram layer 225.

Thus, when recording of an interference pattern in the hologram layer 225 begins, A-polarized reproduction light is generated at the location where the interference pattern is recorded by the reference light 311B for recording due to light resulting from the reflection of the A-polarized reference light 311A for recording that has passed through the optically rotating plate 121L of the double optically rotating plate 121 at the reflecting surface located in the converging position on the further side of the hologram layer 225. This reproduction light travels toward the objective lens 123, passes through the objective lens 123, and thereafter passes through the optically rotating plate 121L of the double optically rotating plate 121 to become P-polarized light. Similarly, B-polarized reproduction light is generated at the location where the interference pattern is recorded by the reference light 311A for recording due to light resulting from the reflection of the B-polarized reference light 311B for recording that has passed through the optically rotating plate 121R of the double optically rotating plate 121 at the reflecting surface located in the converging position on the further side of the hologram layer 225. This reproduction light travels toward the objective lens 123, passes through the objective lens 123, and thereafter passes through the optically rotating plate 121R of the double optically rotating plate 121 to become P-polarized light. The reproduction light that has passed through the double optically rotating plate 121 impinges upon the polarization beam splitter 120 and is transmitted by the polarization beam splitter surface 120a to impinge upon the beam splitter 118. A part of the reproduction light incident upon the beam splitter 118 is transmitted by the beam splitter surface 118a and passes through the imaging lens 132 to impinge upon the CCD array 133 at which it is detected. Thus, recorded information can be reproduced immediately after the information is recorded.

Figure 63:
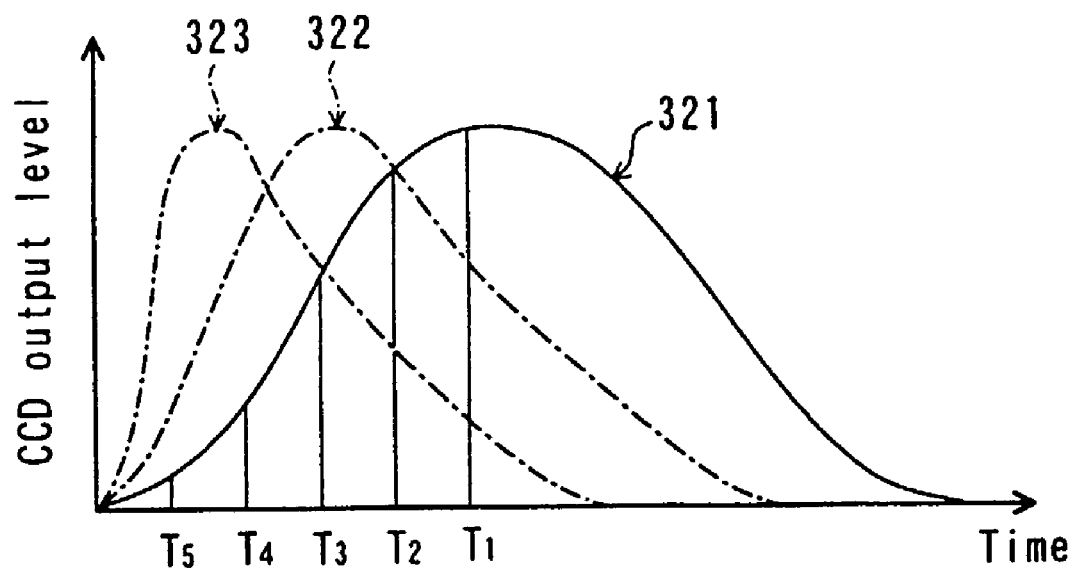
FIG. 63 is an illustration for explaining a direct read after write function and a write power control function during multiplex recording of the optical information recording/reproducing apparatus of the third embodiment of the invention.
Figure 64:
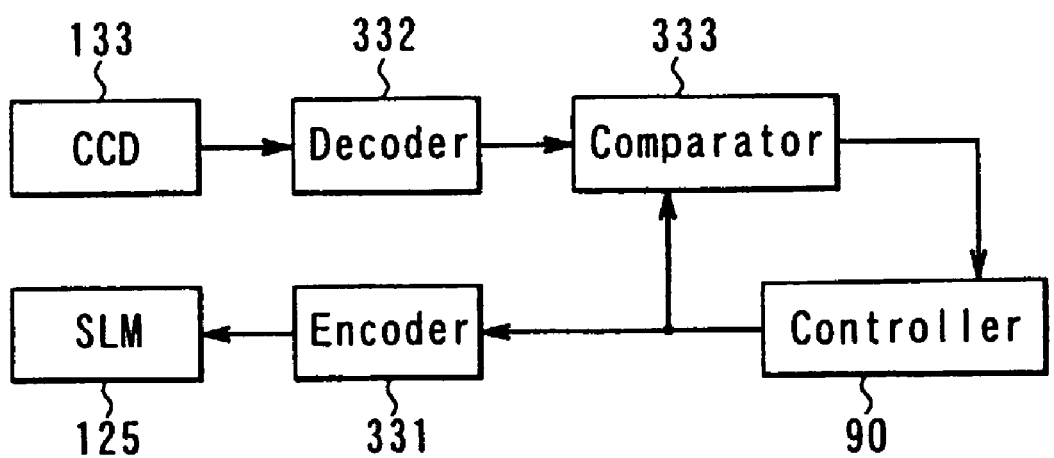
FIG. 64 is a block diagram showing a circuit configuration required for performing verification in the optical information recording/reproducing apparatus according to the third embodiment of the invention.

The reference number 321 in FIG. 63 represents an example of a relationship between the time that has passed after the start of recording of information in one location of an optical information recording medium 1 and the output level of the CCD array 133. As can be seen, the output level of the CCD array 133 gradually increases after the start of information recording in accordance with the degree of the recording of the interference pattern in the optical information recording medium 1, reaches a maximum value at a certain point of time and gradually decreases thereafter. It can be assumed that recorded interference pattern (hereinafter referred to as "recorded pattern") has higher diffracting efficiency, the higher the output level of the CCD array 133. It is therefore possible to form a recorded pattern having desired diffracting efficiency by stopping recording when the CCD array 133 reaches an output level associated with the desired diffracting efficiency.

In the present embodiment, in order to form a recorded pattern having desired diffracting efficiency using the DRAW function as described above, an appropriate test area is preferably provided in the optical information recording medium 1. A test area is a region where information can be recorded utilizing holography like the data areas 7. Preferably, the controller 90 performs the following operation when information is recorded. Specifically, the controller 90 performs an operation of recording predetermined test data in the test area in advance and detects a profile of the output level of the CCD array 133 as shown in FIG. 63. At this time, the operations of recording test data and detecting a profile of the output level of the CCD array 133 are preferably performed in a plurality of locations in the test area while changing the output of the light source device 112 and the ratio between reference light for recording and information light. For example, a plurality of profiles are detected as indicated by the reference numbers 321 through 323 in FIG. 63; the optimum profile is selected from among them; and the actual information recording operation is performed under conditions in accordance with the selected profile.

Based on the detected profile or selected profile, the controller 90 identifies the output level associated with desired diffracting efficiency or the time required to reach that output level after the beginning of the recording. In actual recording of information, the controller 90 monitors the output level of the CCD array 133 and stops the recording when the output level reaches an output level associated with predefined desired diffracting efficiency. Alternatively, in actual recording of information, the controller 90 stops the recording when a time spent after the start of the recording agrees with the time required after the start of recording to reach an output level associated with predefined desired diffracting efficiency. Such an operation makes it possible to form a recorded pattern having desired diffracting efficiency in an optical information recording medium 1.

As described above, the present embodiment makes it possible to verify recorded information using the DRAW function. FIG. 64 shows a configuration of a circuit required to perform such verification in an optical information recording/reproducing apparatus according to the present embodiment. As illustrated, the optical information recording/reproducing apparatus has: an encoder 331 to which information to be recorded is supplied by the controller 90 and which encodes the information into data for a modulation pattern of the spatial light modulator (represented by "SLM" in FIG. 64) 125; a decoder 322 for decoding data output by the CCD array 133 into data in a format adapted to be supplied from the controller 90 to the encoder 331; and a comparing portion 333 for comparing the data supplied from the controller 90 to the encoder 331 and the data obtained by the decoder 322 and for transmitting the information of the result of the comparison to the controller 90. For example, the comparing portion 333 transmits information of the degree of match between the two items of data to be compared or information of the error rate to the controller 90 as the information of the comparison result. For example, the controller 90 continues the recording operation if the information of the comparison result transmitted by the comparing portion 333 is within a range in which data errors can be corrected, and stops the recording operation if the information of the comparison result is out of the range in which data errors can be corrected.

As described above, since the optical information recording/reproducing apparatus of the present embodiment has the DRAW function, it can perform a recording operation under optimum recording conditions even in the presence of disturbances such as variation of sensitivity of the optical information recording medium 1, changes in the ambient temperature and fluctuation of the output of the light source device 112.

Further, the present embodiment allows recording at a high speed with high reliability maintained because it has the function of verifying recorded information simultaneously with recording of the information. This function is particularly useful in recording information at a high transfer rate. While the reproduction of unfixed information is unpreferable because it acts similarly to overwrite and can reduce the quality of the recorded information, the verification function of the present embodiment creates no problem because verification of recorded information is completed during the recording operation.

The WPC function during multiplex recording will now be described. When a plurality of pieces of information are recorded on a multiplex basis in the same location of an optical information recording medium 1 with the modulation pattern of the reference light for recording varied, the diffracting efficiency of an early recorded pattern is gradually decreased by subsequent recording. The WPC function according to the present embodiment is a function of controlling reference light for recording and information light during multiplex recording such that substantially the same diffracting efficiency can be achieved by the recorded pattern of each item of information recorded on a multiplex basis.

The diffracting efficiency of a recorded pattern depends on parameters such as the intensity of the reference light for recording and the information light, the illuminating time of the reference light for recording and the information light, the ratio between the intensity of the reference light for recording and the information light, the modulation pattern of the reference light for recording, the total number of times of the recording in the same location of the optical information recording medium 1 and the order of the recording of interest. Therefore, the WPC function is required to control at least one of the plurality of parameters. The control can be simplified by controlling the intensity and illuminating time of reference light for recording and information light. When the intensity of reference light for recording and information light is controlled, the intensity is reduced as the recording proceeds. When the illuminating time of reference light for recording and information light is controlled, the illuminating time is decreased as the recording proceeds.

With the WPC function of the present embodiment, reference light for recording and information light are controlled at first through m-th (m is an integer equal to or greater than 2) recording operations based on a profile of the output level of the CCD array 133 as shown in FIG. 63 which has been obtained in advance. FIG. 63 shows an example of illuminating times in the case of control over the illuminating time of reference light for recording and information light. Specifically, in the example shown in FIG. 63, it is assumed that recording is performed five times in the same location of an optical information recording medium 1, and $T_1$, $T_2$, $T_3$, $T_4$ and $T_5$ respectively represents the illuminating time of the reference light for recording and the information light at the first, second, third, fourth and fifth recording.

Thus, the present embodiment makes it possible to provide a recorded pattern of each item of information recorded on a multiplex basis with substantially the same diffracting efficiency.

The optical information recording/reproducing apparatus according to the present embodiment makes it possible to record a large amount of information in an optical information recording medium 1 with a high density. This means that a large amount of information can be lost when a defect or the like occurs in the optical information recording medium 1 after information is recorded to disable the reproduction of a part of the information. According to the present embodiment, in order to improve reliability by preventing such loss of information, information can be recorded utilizing the RAID (redundant arrays of inexpensive disks) technique as described below.

The RAID technique is a technique for improving reliability of recording by recording data with redundancy using a plurality of hard disk devices. RAIDs are classified into five categories of RAID-1 through RAID-5. The following description will refer to the RAID-1, RAID-3 and RAID-5 which are typical of the technique, by way of example. RAID-1 is a system in which the same contents are written in two hard disk devices and which is also referred to as "mirroring". RAID-3 is a system in which input data is divided into parts having a predetermined length to be recorded in a plurality of hard disk devices and in which parity data is generated and written in another hard disk device. RAID-5 is a system in which larger units of data division (blocks) are employed; one division of data is recorded in one hard disk device as a data block; parity data for data blocks of the hard disk devices associated with each other is recorded in another hard disk device as a parity block; and the parity block is distributed among all hard disk devices.

A method for recording information utilizing the RAID technique according to the present embodiment (hereinafter referred to as "distributed recording methods") is to record information in an interference region 313 of an optical information recording medium 1 which is a substitution for a hard disk device in the context of the above description of RAID.

Figure 65:
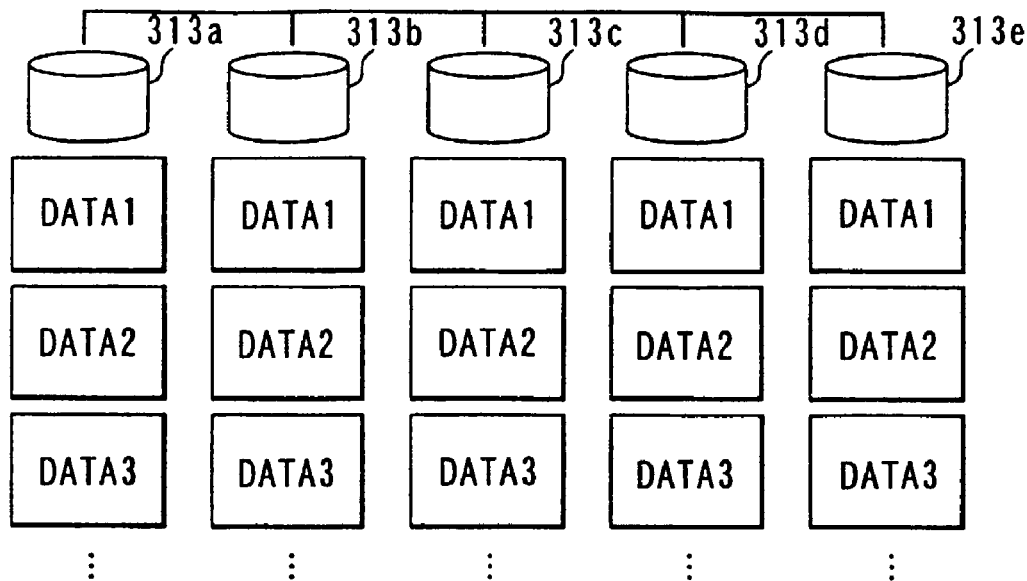
FIG. 65 is an illustration of an example of a distributed recording method in the third embodiment of the invention.

FIG. 65 is an illustration of an example of the distributed recording method according to the present embodiment. In this example, information to be recorded in an optical information recording medium 1 is a series of data, DATA1, DATA2, DATA3, . . . , and the same data DATA1, DATA2, DATA3, . . . are recorded in a plurality of interference regions 313a through 313e of the optical information recording medium 1. A plurality of items of data are recorded on a multiplex basis in each of the interference regions 313a through 313e using phase-encoding multiplexing. This method of recording corresponds to RAID-1. According to this method of recording, even if reproduction of data is disabled in any of the plurality of interference regions 313a through 313e, the data can be reproduced from other interference regions.

Figure 66:
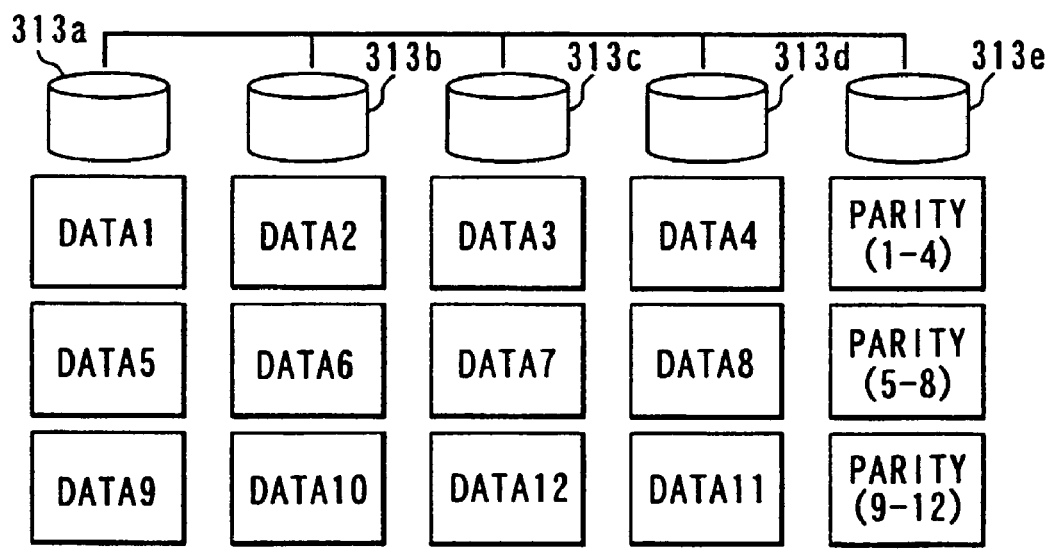
FIG. 66 is an illustration of another example of a distributed recording method in the third embodiment of the invention.

FIG. 66 is an illustration of another example of the distributed recording method according to the present embodiment. In this example, information to be recorded in an optical information recording medium 1 is a series of data, DATA1, DATA2, DATA3, . . . , DATA12; the data are divided and recorded in a plurality of interference regions 313a through 313d; parity data for the data recorded in the plurality of interference regions 313a through 313d are generated; and the parity data are recorded in an interference region 313e. More specifically, according to this method of recording, the data DATA1 through DATA4 are recorded in the interference regions 313a through 313d respectively; parity data PARITY (1–4) for the data DATA1 through DATA4 are recorded in the interference region 313e; the data DATA5 through DATA8 are recorded in the interference regions 313a through 313d respectively; parity data PARITY (5–8) for the data DATA5 through DATA8 are recorded in the interference region 313e; the data DATA9 through DATA12 are recorded in the interference regions 313a through 313d respectively; and parity data PARITY (9–12) for the data DATA9 through DATA12 are recorded in the interference region 313e. A plurality of items of data are recorded on a multiplex basis in each of the interference regions 313a through 313e using phase-encoding multiplexing. This method of recording corresponds to RAID-3. According to this method of recording, even if reproduction of data is disabled in any of the plurality of interference regions 313a through 313e, the data can be restored using the parity data recorded in the interference region 313e.

Figure 67:
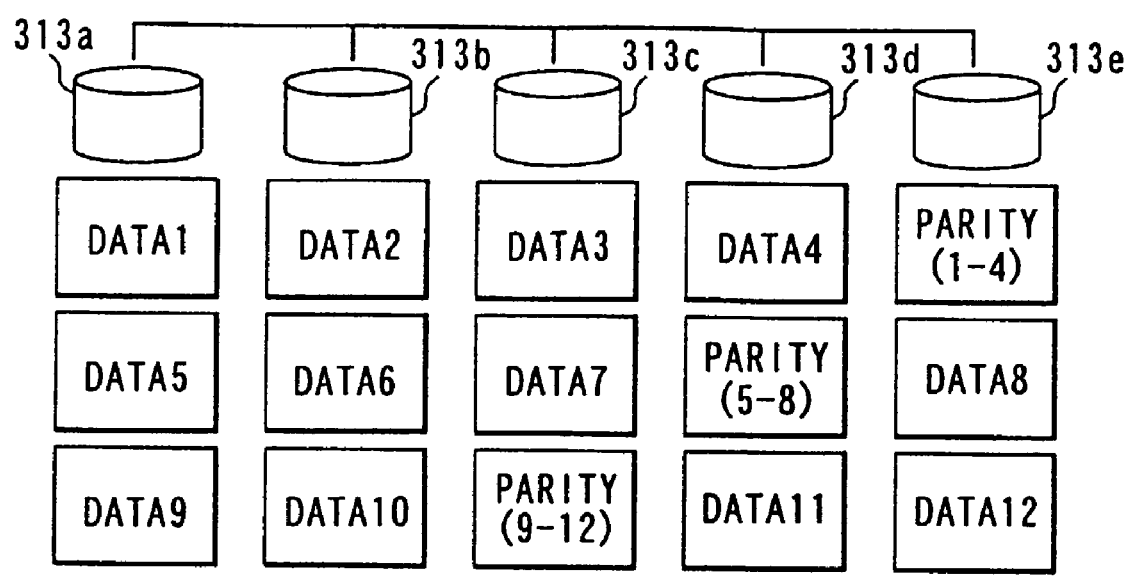
FIG. 67 is an illustration of still another example of a distributed recording method in the third embodiment of the invention.

FIG. 67 is an illustration of another example of the distributed recording method according to the present embodiment. In this example, information to be recorded in an optical information recording medium 1 is a series of data, DATA1, DATA2, DATA3, . . . , DATA12; the data are divided and recorded in four interference regions among a plurality of interference regions 313a through 313e; parity data for the recorded data are generated; and the parity data are recorded in the remaining interference region among the plurality of interference regions 313a through 313e. According to this method of recording, the interference region to record the parity data is sequentially changed. More specifically, according to this method of recording, the data DATA1 through DATA4 are recorded in the interference regions 313a through 313d respectively; parity data PARITY (1–4) for the data DATA1 through DATA4 are recorded in the interference region 313e; the data DATA5 through DATA8 are recorded in the interference regions 313a through 313c and 313e respectively; parity data PARITY (5–8) for the data DATA5 through DATA8 are recorded in the interference region 313d; the data DATA9 through DATA12 are recorded in the interference regions 313a, 313b, 313d and 313e respectively; and parity data PARITY (9–12) for the data DATA9 through DATA12 are recorded in the interference region 313c. A plurality of items of data are recorded on a multiplex basis in each of the interference regions 313a through 313e using phase-encoding multiplexing. This method of recording corresponds to RAID-5. According to this method of recording, even if reproduction of data is disabled in any of the plurality of interference regions where data are recorded, the data can be restored using the parity data.

For example, the distributed recording methods as shown in FIGS. 65 through 67 are carried out under the control of the controller 90 as control means.

Figure 68:
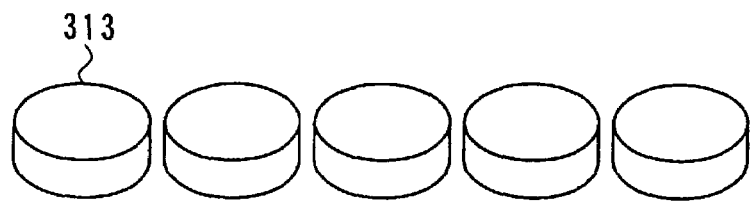
FIG. 68 is an illustration of an example of an arrangement of a plurality of interference regions used in the distributed recording methods in the third embodiment of the invention.

FIG. 68 shows an example of an arrangement of a plurality of interference regions used in the distributed recording method as described above. In this example, interference regions used for the distributed recording method are a plurality of interference regions 313 adjacent to each other in one track. In this case, the plurality of interference regions 313 used for the distributed recording method are preferably interference regions within a range for which in-field access is possible. The reason is that it allows high speed access to each of the interference regions 313.

Figure 69:
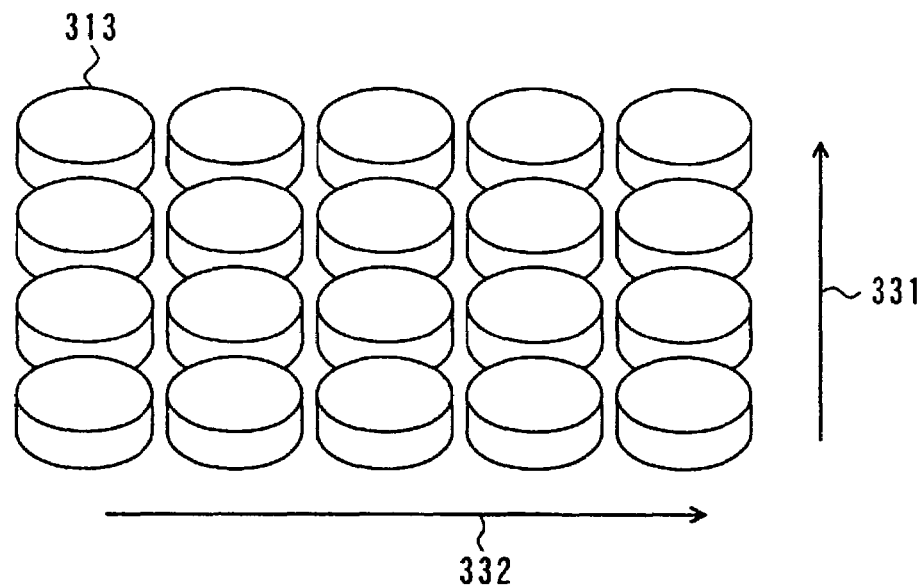
FIG. 69 is an illustration of another example of an arrangement of a plurality of interference regions used in the distributed recording methods in the third embodiment of the invention.

FIG. 69 shows another example of an arrangement of a plurality of interference regions used in the distributed recording method as described above. In this example, interference regions used for the distributed recording method are a plurality of interference regions 313 which are two-dimensionally adjacent to each other in the radial direction 331 of the optical information recording medium 1 and in the direction 332 of the tracks thereof. In this case, among the plurality of interference regions used for the distributed recording method, a plurality of interference regions 313 adjacent to each other in the direction 332 of the tracks are preferably interference regions within a range for which in-field access is possible. The reason is that it allows high speed access to each of the interference regions 313 which are adjacent to each other in the direction 332 of the tracks.

According to the distributed recording methods in the present embodiment, a series of data may be recorded in a distributed manner in a plurality of discrete interference regions 313 instead of recording them in a plurality of interference regions 313 adjacent to each other.

Figure 70:
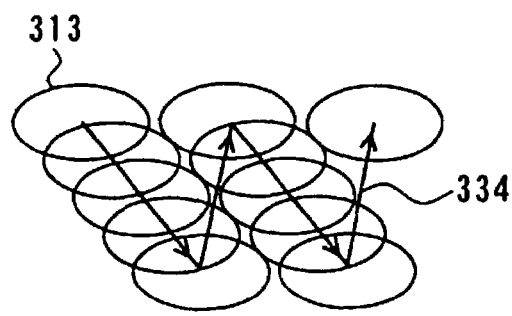
FIG. 70 is an illustration for explaining a distributed recording method in recording a plurality of items of data on a multiplex basis utilizing shift multiplexing in the third embodiment of the invention.

While a description has been made so far on distributed recording methods for recording a plurality of items of data in a single interference region 313 on a multiplex basis utilizing phase-encoding multiplexing, a distributed recording method can be implemented also when a plurality of items of data are recorded on a multiplex basis using other methods. By way of example, a description will be made with reference to FIG. 70 on a distributed recording method for multiplex recording of a plurality of items of data using a method referred to as "shift multiplexing". As shown in FIG. 70, shift multiplexing is a method for recording a plurality of pieces of information on a multiplex basis by forming a plurality of interference regions 313 in an optical information recording medium 1 such that they are slightly shifted from each other and are partially overlapped with each other in the horizontal direction. While FIG. 70 shows an example in which a plurality of interference regions 313 used for the distributed recording method are two-dimensionally arranged, the plurality of interference regions 313 used for the distributed recording method may be arranged such that they are adjacent to each other in the same track. In FIG. 70, the arrow indicated by the reference number 334 represents an order of recording. According to the distributed recording method utilizing multiplexing, data and parity data divided from a series of data are recorded in a plurality of interference regions 313 in a distributed manner.

Figure 71:
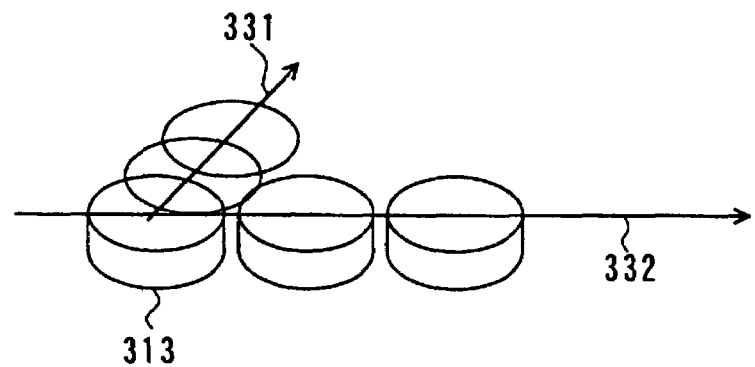
FIG. 71 is an illustration for explaining a distributed recording method in recording a plurality of items of data on a multiplex basis utilizing phase-encoding multiplexing and shift multiplexing in combination in the third embodiment of the invention.

A distributed recording method can be implemented also when a plurality of items of data are recorded on a multiplex basis using phase-encoding multiplexing and shift multiplexing in combination. FIG. 71 shows an example in which interference regions 313 for multiplex recording of information utilizing phase-encoding multiplexing are formed with no overlap between them in the direction 332 of the tracks of an optical information recording medium 1 and in which adjoining interference regions 313 to be used for shift multiplexing are formed in the radial direction 331 of the optical information recording medium 1 such that they are slightly shifted from each other and are partially overlapped with each other in the horizontal direction. Each of the interference regions 313 in this example is treated similarly to the interference regions 313a through 313e in FIGS. 65 through 67.

A description will now be made with reference to FIGS. 72 and 73 on a juke apparatus utilizing an optical information recording/reproducing apparatus according to the present embodiment as an example of the application of an optical information recording/reproducing apparatus according to the present embodiment. A juke apparatus is an information recording/reproducing apparatus of a large capacity having an auto-changer mechanism for changing recording media.

Figure 72:
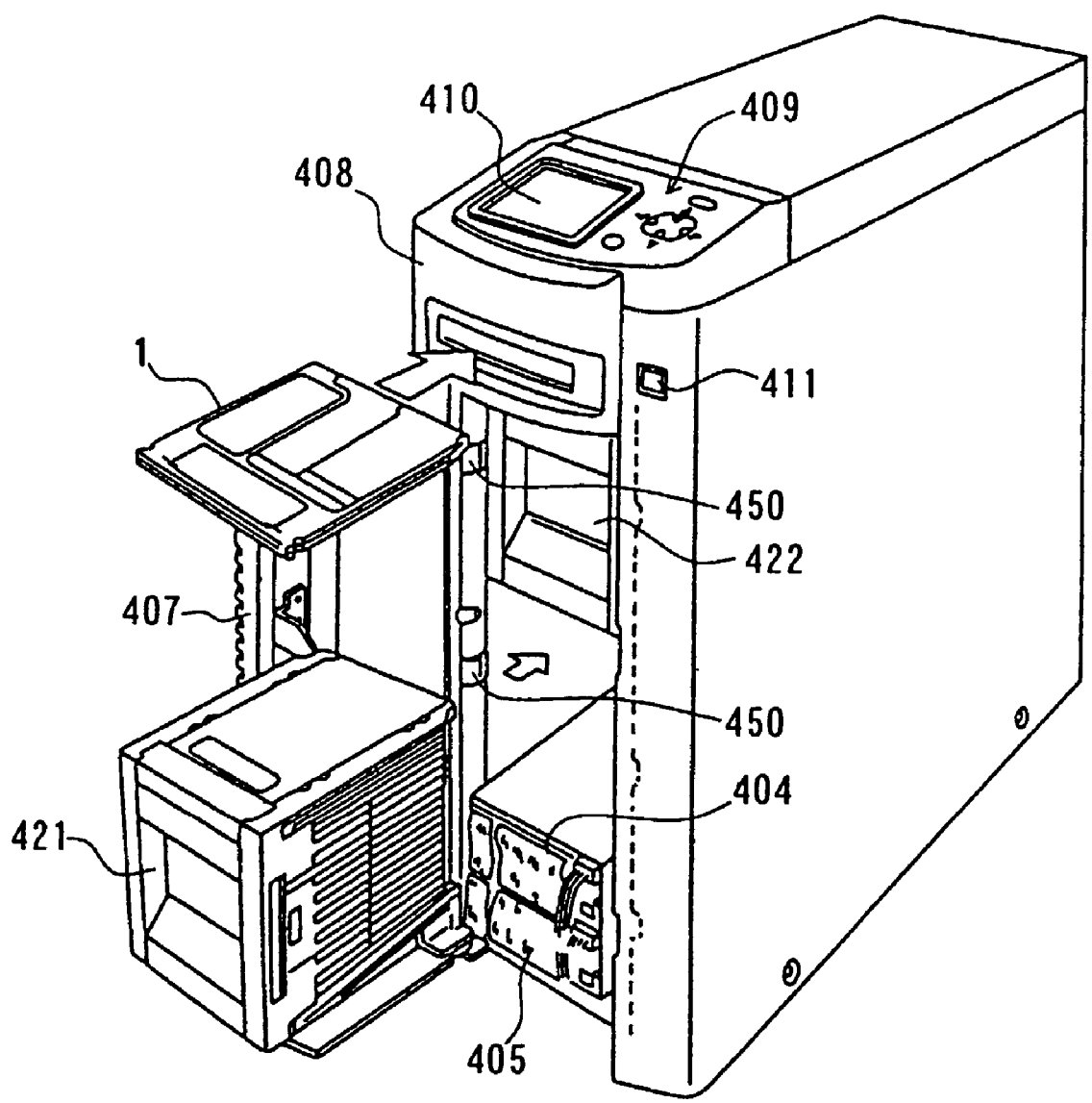
FIG. 72 is a perspective view of the exterior of a juke apparatus as an example of application of the optical information recording/reproducing apparatus according to the third embodiment of the invention.
Figure 73:
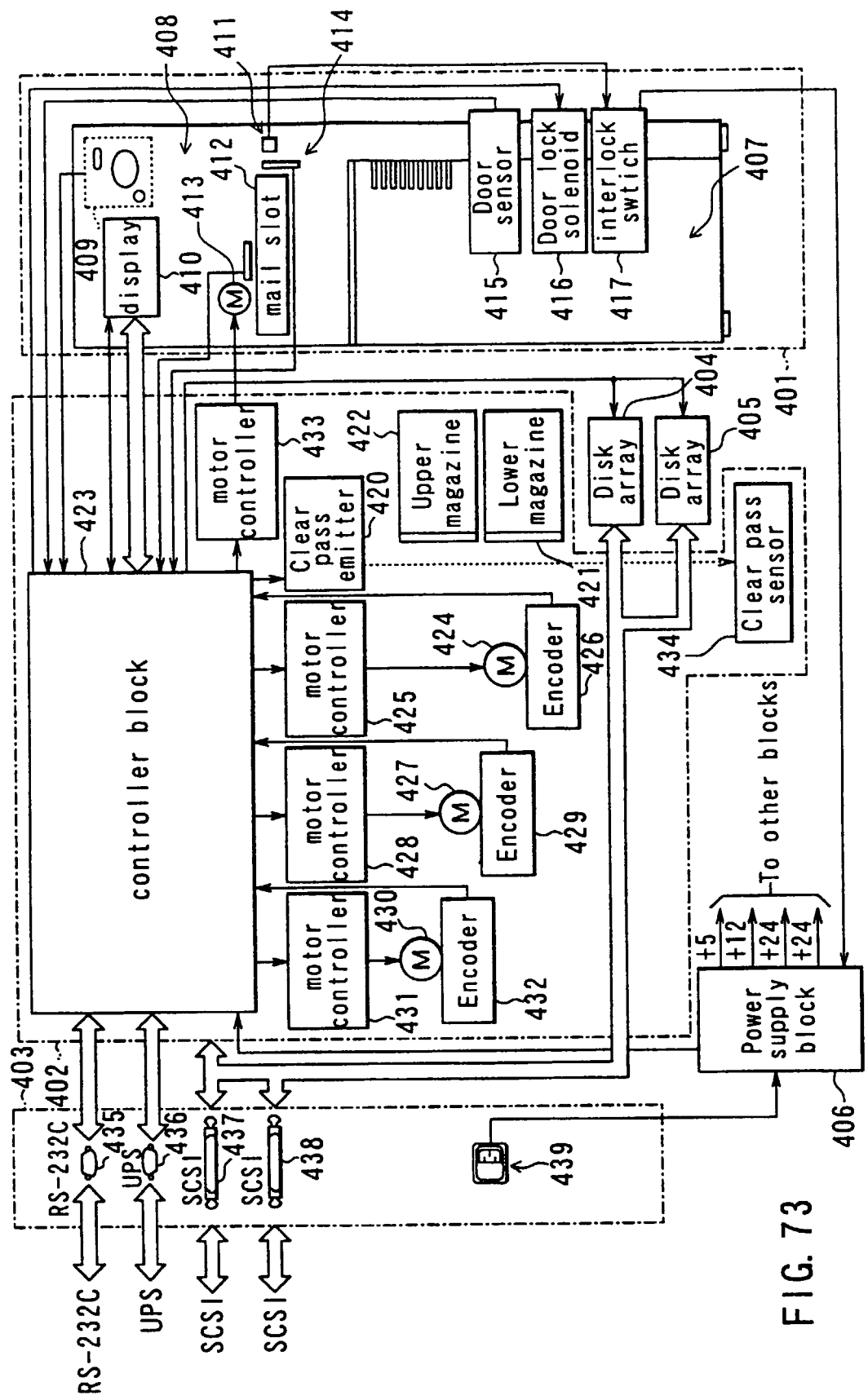
FIG. 73 is a block diagram showing a circuit configuration of the juke apparatus shown in FIG. 72

FIG. 72 is a perspective view showing the exterior of the juke apparatus, and FIG. 73 is a block diagram of a circuit configuration of the juke apparatus. The juke apparatus has: a front panel block 401 provided on the front side of the juke apparatus; a robotics block 402 that forms the interior of the juke apparatus; a rear panel block 403 provided on the rear side of the juke apparatus; a first disk array 404 provided inside the juke apparatus and constituted by a plurality of optical information recording/reproducing apparatuses coupled to each other; a second disk array 405 similarly constituted by a plurality of optical information recording/ reproducing apparatuses coupled to each other; and a power supply block 406 for supplying predetermined power to each part of the juke apparatus.

The front panel block 401 has a front door 407 which is opened and closed for purposes such as changing disk arrays 404 and 405, and a front panel 408.

On the front panel 408, there is provided a keypad 409 having various operating keys: a display 410 for displaying modes of operation and the like; a functional switch 411 for instructing opening and closing of the front door 407; a mail slot 412 which is a port to insert and eject an optical information recording medium 1; a transfer motor 413 for transferring an optical information recording medium 1 inserted through the mail slot 412 to a mail box which is not shown and for transferring an optical information recording medium 1 to be ejected from the main box to the mail slot 412; and a full sensor 414 for detecting that the number of optical information recording media 1 inserted into the juke apparatus has reached a predefined number.

On the front door 407, there is provided a door sensor 415 for detecting opened and closed states of the front door 407; a door lock solenoid 416 for controlling the opening and closing of the front door 407; and an interlock switch 417 for controlling the opening and closing of the front door 407 in accordance with operations on the functional switch 411.

The robotics block 402 has: a lower magazine 421 capable of containing, for example, ten optical information recording media 1; an upper magazine 422 stacked on top of the lower magazine 421 and capable of containing, for example, ten optical information recording media 1; and a controller block 423 for controlling the juke apparatus as a whole.

The robotics block 402 further has: a grip operation motor 424 for controlling a grip operation of a manipulator which is not shown to move an optical information recording medium 1 inserted into the juke apparatus to a predetermined location; a grip operation motor controller 425 for controlling the rotating speed and direction of the grip operation motor 424 under the control of the controller block 423; and a grip operation encoder 426 for detecting the rotating speed and direction of the grip operation motor 424 and for supplying the detected data to the controller block 23. Further, the robotics block 402 has: a rotating operation motor 427 for controlling the manipulator for rotation in a clockwise direction, a counterclockwise direction or in both directions; a rotating operation motor controller 428 for controlling the rotating speed and direction of the rotating operation motor 427 under the control of the controller block 423; and a rotating operation encoder 429 for detecting the rotating speed and direction of the rotating operation motor 427 and for supplying the detected data to the controller block 423. The robotics block 402 further has: a vertical operation motor 430 for controlling upward and downward movements of the manipulator; a vertical operation motor controller 431 for controlling the rotating speed and direction of the vertical operation motor 430 under the control of the controller block 423; and a vertical operation encoder 432 for detecting the rotating speed and direction of the vertical operation motor 430 and for supplying the detected data to the controller block 423.

The robotics block 402 further has: a transfer motor controller 433 for controlling the rotating speed and direction of the transfer motor 413 for the operation of inserting and ejecting optical information recording media 1 through the mail slot 412; a clear pass sensor 434; and a clear pass emitter 420.

The rear panel block 403 has: an RS232C connector terminal 435 which is an input/output terminal for serial transmission; a UPS (uninterruptible power system) connector terminal 436; a first SCSI (small computer system interface) connector terminal 437 which is an input/output terminal for parallel transmission; a second SCSI connector terminal 438 which is also an input/output terminal for parallel transmission; and an AC (alternating current) power supply connector terminal 439 connected to a mains power supply.

Each of the RS232C connector terminal 435 and UPS connector terminal 436 is connected to the controller block 423. The controller block 423 converts serial data supplied through the RS232C connector terminal 435 into parallel data and supplies the data to the disk arrays 404 and 405. It also converts parallel data from disk arrays 404 and 405 into serial data and supplies the data to the RS232C connector terminal 435.

Each of the SCSI connector terminals 437 and 438 is connected to the controller block 423 and disk arrays 404 and 405. The disk arrays 404 and 405 exchange data directly through the SCSI connector terminals 437 and 438, and the controller block 423 converts parallel data from the disk arrays 404 and 405 into serial data and supplies the data to the RS232C connector terminal 435.

The AC power supply connector terminal 439 is connected to the power supply block 406. The power supply block 406 generates power of +5 V, +12 V, +24 V and −24 V based on the mains power supply obtained through the AC power supply connector terminal 439 and supplies the power to other blocks.

The manipulator which is not shown has a carriage having a gripper for performing operations such as picking up optical information recording media 1 transferred to the mail box through the mail slot 412 one by one, a carriage holding portion for holding the carriage, and a driving portion for controlling the carriage for vertical, horizontal, back-and-forth and rotary movements. Inside the juke apparatus, there is provided four columns which define a substantially rectangular configuration on the bottom thereof and which are erected to extend perpendicularly to the bottom from the four corners of the rectangular configuration to the top surface of the juke apparatus. The carriage holding portion holds the carriage such that it can make lateral, back and forth and rotary movements and has column gripping portions on both ends thereof for gripping the columns to allow the carriage holding portion to move vertically along the four columns.

The carriage driving portion generates a driving force to control such a manipulator for vertical movements along the columns, generates a driving force to control the carriage for lateral, back and forth and rotary movements and generates a driving force to pick up an optical information recording medium 1 with the gripper.

As shown in FIG. 72, the front door 407 is cantilevered by a hinge 450 at one end thereof to be able to open and close, and each of the lower magazine 421, the upper magazine 422 and the first and second disk arrays 404 and 405 can be pulled out or loaded by opening and closing the front door 407. Each of the magazines 421 and 422 has a boxy configuration for containing ten optical information recording media 1 each housed in a cartridge in the form of a stack in parallel with the bottom of the juke apparatus, and an optical information recording medium 1 is inserted from the rear side of each of the magazines 421 and 422 (the side of each of the magazines 421 and 422 that is opposite to the front side thereof where the front door 407 is located when it is mounted in the juke apparatus). Optical information recording media 1 can be mounted at one time by a user removing the magazines 421 and 422 to load it manually and mounting the magazines 421 and 422 loaded with the optical information recording media 1 in the Juke apparatus. When optical information recording media 1 are inserted through the mail slot 412, the inserted optical information recording media 1 are transferred to the mail box, and the optical information recording media 1 transferred to the mail box are loaded by the manipulator into the magazines 421 and 422. Thus, optical information recording media 1 can be automatically loaded into the magazines 421 and 422.

Each of the first and second disk arrays 404 and 405 has a RAID controller and a drive array formed by coupling first through fifth optical information recording/reproducing apparatuses.

Each of the optical information recording/reproducing apparatuses has a disk insertion/ejection port, and optical information recording media 1 are inserted in and ejected from each of the optical information recording/reproducing apparatuses through the disk insertion/ejection port. The RAID controllers are connected to the controller block 423 and control the optical information recording/reproducing apparatuses according to the recording method of RAID-1, RAID-3 or RAID-5 under the control of the controller block 423. Each of the recording methods of RAID-1, RAID-3 and RAID-5 is selected through a key operation on the keypad 409 provided on the front panel 408.

In this juke apparatus, data are recorded using the disk arrays 404 and 405 in accordance with the recording method of RAID-1, RAID-3 or RAID-5. In order to record data in such a manner, optical information recording media 1 must be loaded in the juke apparatus in advance. There are two methods for loading the juke apparatus with the optical information recording media 1.

As shown in FIG. 72, a first method of loading is a method wherein the front door 407 is opened to remove the lower magazine 421 and the upper magazine 422 and optical information recording media 1 are manually loaded in the magazines 421 and 422.

A second method of loading is a method wherein optical information recording media 1 are loaded one by one through the mail slot 412 as shown in FIG. 73. When an optical information recording medium 1 is loaded into the mail slot 412, the controller block 423 detects it and controls the driving of the transfer motor 413 to transfer the optical information recording medium 1 to the mail box. When the optical information recording medium 1 is transferred to the mail box, the controller block 423 controls the driving of the vertical operation motor 430 to move the manipulator toward the mail box and controls the driving of the grip operation motor 424 to move the optical information recording medium 1 picked up by the gripper provided on the manipulator to a vacant disk housing portion of the magazine 421 or 422. The driving of the grip operation motor 424 is controlled to release the optical information recording medium 1 held by the gripper in the disk housing portion. The controller block 423 controls each portion to repeat such a series of operations each time an optical information recording medium 1 is inserted through the mail slot 412.

When the magazines 421 and 422 are thus loaded with optical information recording media 1 according to the first or second method of loading, the controller block 423 controls the manipulator to transfer the optical information recording media 1 contained in the lower magazine 421 or the upper magazine 422 to the first disk array 404 or the second disk array 405. Each of the disk arrays 404 and 405 can be loaded with five optical information recording media 1 and, therefore, five out of the total of twenty optical information recording media 1 contained in the magazines 421 and 422 are loaded in the first disk array 404, and another five are loaded in the second disk array 405 by the manipulator.

To record data, a user operates the keypad 409 to select a desired recording method from among the RAID-1, RAID-3 and RAID-5 recording methods and operates the keypad 409 to instruct the start of data recording. The data to be recorded are supplied to the disk arrays 404 and 405 through the RS232C connector terminal 435 or the first and second SCSI connector terminals 437 and 438. When the start of data recording is instructed, the controller block 423 controls the disk arrays 404 and 405 through the RAID controllers provided at the disk arrays 404 and 405 to enable recording of data according to the selected recording method.

In this juke apparatus, five optical information recording/reproducing apparatuses provided for each of the disk arrays 404 and 405 are substituted for hard disk devices in a conventional RAID utilizing hard disk devices to record data according to a recording method selected from among the RAID-1, RAID-3 and RAID-5 recording methods. The data interfaces of this juke apparatus are not limited to those mentioned in the above description.

The optical information recording/reproducing apparatus according to the present embodiment makes it possible to achieve copy protection and security easily like the first embodiment.

It is also possible to provide information distribution services e.g., a service in which optical information recording media 1 having a multiplicity of kinds of information (e.g., various kinds of software) recorded thereon with different modulation patterns for reference light are provided to users and in which pieces of information of the reference light modulation patterns to enable reproduction of each of the various kinds of information are separately sold to the users as key information as requested by the users.

Phase modulation patterns for reference light to serve as the key information to retrieve predetermined information from an optical information recording medium 1 may be created based on information specific to a person who is a user. Such information specific to a person includes a secret number, a fingerprint, a voiceprint and an iris pattern.

Figure 74:
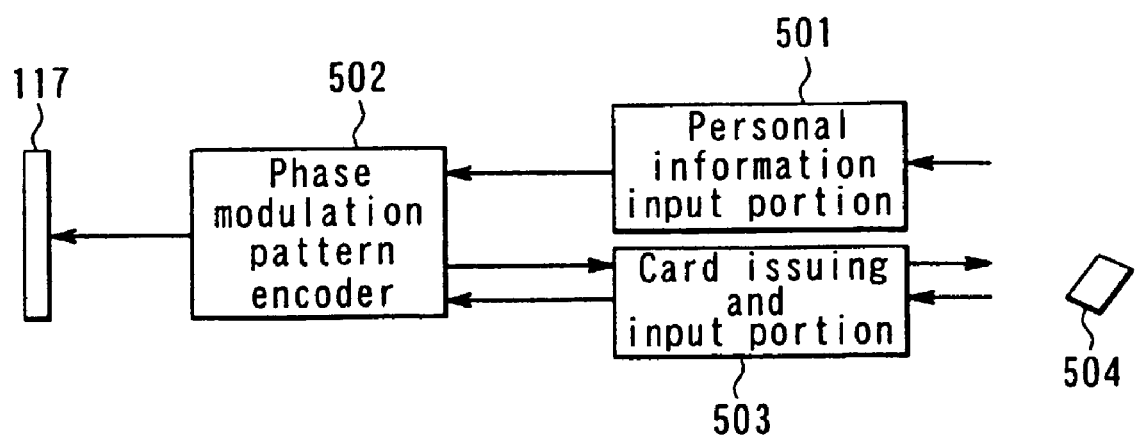
FIG. 74 is a block diagram of an example of a configuration of major parts in a case in which a phase modulation pattern for reference light is created based on information specific to a person in the optical information recording/reproducing apparatus according to the third embodiment of the invention.
Figure 75:
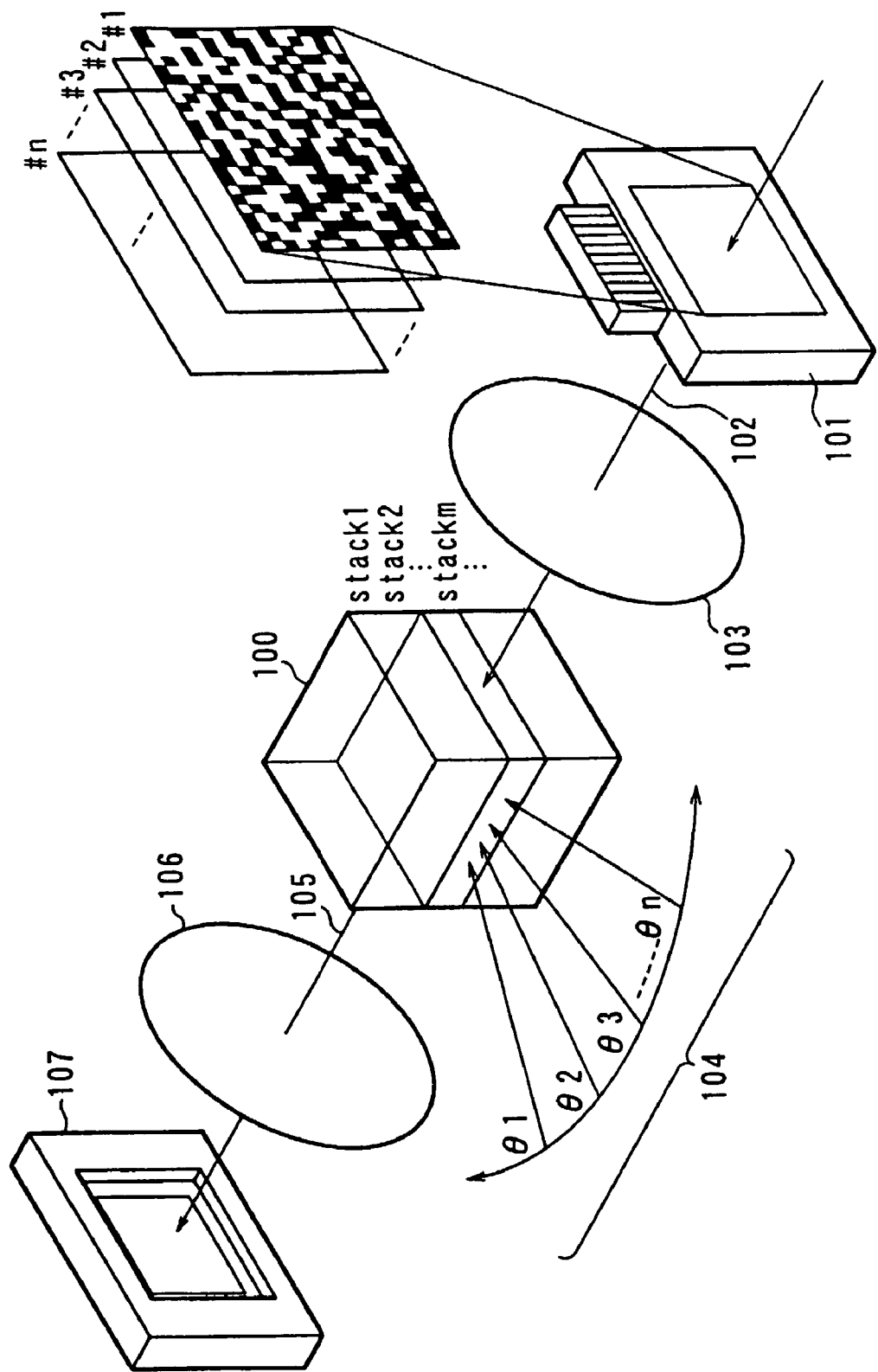
FIG. 75 is a perspective view of a prior-art recording/reproducing system of digital volume holography to show a schematic configuration of the same.

FIG. 74 shows an example of a configuration of major parts of an optical information recording/reproducing apparatus according to the present embodiment in which phase modulation patterns for reference light are created based on personal information as described above. In this example, the optical information recording/reproducing apparatus has: a personal information input portion 501 for inputting information specific to a person such as a fingerprint; a phase modulation pattern encoder 502 for creating a phase modulation pattern for reference light based on the information input through the personal information input portion 501 and for supplying information on the created modulation pattern to the phase-spatial light modulator 117 as desired when information is recorded or reproduced to drive the phase-spatial light modulator 117; and a card issuing and input portion 503 for issuing a card 504 on which the information on the modulation pattern created by the phase modulation pattern encoder 502 is recorded and for sending the information on the modulation pattern recorded on the card 504 to the phase modulation pattern encoder 502 when the card 504 is loaded therein.

In the example shown in FIG. 74, when a user inputs information specific to the person such as a fingerprint to the personal information input portion 501 to record information in an optical information recording medium 1 using the optical information recording/reproducing apparatus according to the present embodiment, the phase modulation pattern encoder 502 creates a phase modulation pattern for reference light based on the information input through the personal information input portion 501 and supplies information on the created modulation pattern to the phase-spatial light modulator 117 to drive the phase-spatial light modulator 117 during the recording of the information. As a result, the information is recorded in the optical information recording medium 1 in association with the phase modulation pattern for reference light created based on the information specific to the person who is the user. The phase modulation pattern encoder 502 transmits the information on the created modulation pattern to the card issuing and input portion 503, and the card issuing and input portion 503 issues a card 504 on which the transmitted information on the modulation pattern is recorded.

To reproduce the information recorded as described above from the optical information recording medium 1, the user either inputs the information specific to the person to the personal information input portion 501 as in recording, or loads the card 504 into the card issuing and input portion 503.

When the information specific to the person is input to the personal information input portion 501, the phase modulation pattern encoder 502 creates a phase modulation pattern for reference light based on the information input through the personal information input portion 501 and supplies information on the created modulation pattern to the phase-spatial light modulator 117 to drive the phase-spatial light modulator 117 during the reproduction of the information. At this time, if the phase modulation pattern for the light at recording agrees with the phase modulation pattern for reference light at reproduction, the desired information is reproduced. In order to prevent the phase modulation pattern encoder 502 from creating different modulation patterns at recording and reproduction in spite of the fact that the same information specific to the person is input to the personal information input portion 501, the phase modulation pattern encoder 502 may be adapted to create the same modulation pattern even if there is some difference between the pieces of information input through the personal information input portion 501.

When the card 504 is loaded into the card issuing and input portion 503, the card issuing and input portion 503 transmits the information on the modulation pattern recorded on the card 504 to the phase modulation pattern encoder 502, and the phase modulation pattern encoder 502 supplies the transmitted information on the modulation pattern to the phase-spatial light modulator 117 to drive the phase-spatial light modulator 117. Thus, the desired information is reproduced.

The configuration, operation and effects of the present embodiment are otherwise substantially the same as those of the first embodiment.

The present invention is not limited to the above-described embodiments and may be modified in various ways. For example, address information and the like is recorded in advance in the address servo areas 6 of the optical information recording medium 1 in the form of embossed pits in the above-described embodiments; however, instead of providing embossed pits in advance, formatting may alternatively be carried out by selectively illuminating regions near the protective layer 4 of the hologram layer 3 in the address servo areas 6 with high power laser light to selectively change the refractivity of such regions, thereby recording address information and the like.

As the element for detecting information recorded in the hologram layer 3, a smart optical sensor in which a MOS type solid state image pick-up element and a signal processing circuit are integrated on a single chip (see an article "O plus E, September, 1996, No. 202", pp. 93–99 by way of example) may be used instead of a CCD array. Since such a smart optical sensor has a high transfer rate and a high speed operating function, the use of such a smart optical sensor allows high speed reproduction, e.g., reproduction at a transfer rate on the order of Gbit/sec.

Especially, when a smart optical sensor is used as the element for detecting information recorded in the hologram layer 3, instead of recording address information and the like in the address servo areas 6 of the optical information recording medium 1 using embossed pits in advance, address information and the like in a predetermined pattern may be recorded in advance using the same method as for recording in the data areas 7 utilizing holography, in which case the address information and the like is detected by the smart optical sensor during a servo operation with the pick-up set in the same state as in reproduction. In this case, a basic clock and address can be directly obtained from the data detected by the smart optical sensor. A tracking error signal can be obtained from information of the position of a reproduction pattern on the smart optical sensor. Focus servo can be performed by driving the objective lens 12 so as to maximize the contrast of the reproduction pattern on the smart optical sensor. Focus servo can be performed also during reproduction by driving the objective lens so as to maximize the contrast of a reproduction pattern on the smart optical sensor.

In the above-described embodiments, information on the modulation pattern of reference light and information on the wavelength thereof may be supplied to the controller 90 from an external host apparatus.

As described above, in the first optical information recording apparatus or optical information recording method according to the invention, the information recording layer is illuminated with information light carrying information and reference light for recording having a spatially modulated phase on the same side thereof, which is advantageous in that information can be recorded on a multiplex basis utilizing phase-encoding multiplexing and in that the optical system for recording can be configured compactly.

The first optical information recording apparatus according to the invention is further advantageous in that light for recording can be positioned with high accuracy by controlling the positions of information light and reference light for recording relative to the optical information recording medium using information recorded in a positioning region of the optical information recording medium.

In the first optical information recording apparatus according to the invention, the recording optical system projects information light and reference light for recording such that the optical axis of the information light and the optical axis of the reference light for recording are located on the same line, which provides another advantage in that the optical system for recording can be configured more compactly.

In the first optical information recording apparatus according to the invention, the information light generation means generates information light in a plurality of wavelength bands, and the recording reference light generation means generates reference light for recording in the same plurality of wavelength bands as those for the information light, which provides another advantage in that more information can be recorded on a multiplex basis.

The first optical information recording apparatus according to the invention has control means for controlling the information light generation means and the recording reference light generation means such that information is recorded with redundancy in the optical information recording medium, which provides another advantage in that reliability can be improved.

In the first optical information reproducing apparatus or optical information reproducing method according to the invention, the information recording layer is illuminated with reference light for reproduction having a spatially modulated phase; reproduction light generated at the information recording layer when illuminated with the reference light for reproduction is collected on the same side of the information recording layer that is illuminated with the reference light for reproduction; and the collected reproduction light is detected. This is advantageous in that information recorded on a multiplex basis utilizing phase-encoding multiplexing can be reproduced and in that the optical system for reproduction can be configured compactly.

The first optical information reproducing apparatus according to the invention is further advantageous in that light for reproduction can be positioned with high accuracy by controlling the position of the reference light for reproduction relative to the optical information recording medium using information recorded in a positioning region of the optical information recording medium.

In the first optical information reproducing apparatus according to the invention, the reproducing optical system projects reference light for reproduction and collects reproduction light such that the optical axis of the reference light for reproduction and the optical axis of the reproduction light are located on the same line, which provides another advantage in that the optical system for reproduction can be configured more compactly.

In the first optical information reproducing apparatus according to the invention, the reproduction reference light generation means generates reference light for reproduction in a plurality of wavelength bands, and the detection means detects reproduction light in the same plurality of wavelength bands as those for the reference light for reproduction, which provides another advantage in that it is possible to reproduce information recorded using reference light for recording and information light in a plurality of wavelength bands.

In the second optical information recording apparatus or optical information recording method according to the invention, the information recording layer is illuminated with information light having a selected wavelength and carrying information and reference light for recording having a selected wavelength on the same side thereof, which is advantageous in that information can be recorded on a multiplex basis utilizing wavelength multiplexing and in that the optical system for recording can be configured compactly.

The second optical information recording apparatus according to the invention is further advantageous in that light for recording can be positioned with high accuracy by controlling the positions of information light and reference light for recording relative to the optical information recording medium using information recorded in a positioning region of the optical information recording medium.

In the second optical information recording apparatus according to the invention, the recording optical system projects information light and reference light for recording such that the optical axis of the information light and the optical axis of the reference light for recording are located on the same line, which provides another advantage in that the optical system for recording can be configured more compactly.

In the second optical information reproducing apparatus or optical information reproducing method according to the invention, the information recording layer is illuminated with reference light for reproduction having a selected wavelength; reproduction light generated at the information recording layer when illuminated with the reference light for reproduction is collected on the same side of the information recording layer that is illuminated with the reference light for reproduction; and the collected reproduction light is detected. This is advantageous in that information recorded on a multiplex basis utilizing wavelength multiplexing can be reproduced and in that the optical system for reproduction can be configured compactly.

The second optical information reproducing apparatus according to the invention is further advantageous in that light for reproduction can be positioned with high accuracy by controlling the position of reference light for reproduction relative to the optical information recording medium using information recorded in a positioning region of the optical information recording medium.

In the second optical information reproducing apparatus according to the invention, the reproducing optical system projects reference light for reproduction and collects reproduction light such that the optical axis of the reference light for reproduction and the optical axis of the reproduction light are located on the same line, which provides another advantage in that the optical system for reproduction can be configured more compactly.

In the third optical information recording apparatus or optical information recording method according to the invention, the information recording layer is illuminated with information light having a selected wavelength and carrying information and reference light for recording having a selected wavelength and having a spatially modulated phase on the same side thereof, which is advantageous in that information can be recorded on a multiplex basis utilizing wavelength multiplexing and phase-encoding multiplexing and in that the optical system for recording can be configured compactly.

The third optical information recording apparatus according to the invention is further advantageous in that light for recording can be positioned with high accuracy by controlling the positions of information light and reference light for recording relative to the optical information recording medium using information recorded in a positioning region of the optical information recording medium.

In the third optical information recording apparatus according to the invention, the recording optical system projects information light and reference light for recording such that the optical axis of the information light and the optical axis of the reference light for recording are located on the same line, which provides another advantage in that the optical system for recording can be configured more compactly.

In the third optical information reproducing apparatus or optical information reproducing method according to the invention, the information recording layer is illuminated with reference light for reproduction having a selected wavelength and having a spatially modulated phase; reproduction light generated at the information recording layer when illuminated with the reference light for reproduction is collected on the same side of the information recording layer that is illuminated with the reference light for reproduction; and the collected reproduction light is detected. This is advantageous in that information recorded on a multiplex basis utilizing wavelength multiplexing and phase-encoding multiplexing can be reproduced and in that the optical system for reproduction can be configured compactly.

The third optical information reproducing apparatus according to the invention is further advantageous in that light for reproduction can be positioned with high accuracy by controlling the position of reference light for reproduction relative to the optical information recording medium using information recorded in a positioning region of the optical information recording medium.

In the third optical information reproducing apparatus according to the invention, the reproducing optical system projects reference light for reproduction and collects reproduction light such that the optical axis of the reference light for reproduction and the optical axis of the reproduction light are located on the same line, which provides another advantage in that the optical system for reproduction can be configured more compactly.

In the fourth optical information recording apparatus according to the invention, the pick-up device provided in a face-to-face relationship with the optical information recording medium projects information light and reference light for recording upon the information recording layer on the same side thereof to record information in the information recording layer using an interference pattern as a result of interference between the information light and the reference light for recording, which is advantageous in that the optical system for recording can be configured compactly and in that random access to the optical information recording medium can be performed easily.

In the fourth optical information recording apparatus according to the invention, the recording optical system projects information light and reference light for recording such that the optical axis of the information light and the optical axis of the reference light for recording are located on the same line, which provides another advantage in that the optical system for recording can be configured more compactly.

In the fourth optical information recording apparatus according to the invention, the light source emits beams of light in a plurality of wavelength bands, which provides another advantage in that more information can be recorded on a multiplex basis.

In the fourth optical information recording apparatus according to the invention, the pick-up device has first light quantity monitoring means for monitoring the quantity of information light and second light quantity monitoring means for monitoring the quantity of reference light for recording, which provides another advantage in that the quantities of the information light and the reference light for reproduction can be independently monitored and controlled.

In the fourth optical information recording apparatus according to the invention, the pick-up device has reproduction light detection means for detecting reproduction light as a result of diffraction of reference light for recording caused by an interference pattern formed in the information recording layer during the recording of information in the information recording layer, which provides another advantage in that recorded information can be verified immediately after the recording of the information.

The fourth optical information recording apparatus according to the invention has control means for controlling the recording operation based on information on reproduction light detected by reproduction light detection means, which provides another advantage in that the recording operation can be performed in an optimum recording state.

The fourth optical information recording apparatus according to the invention has control means for controlling illuminating conditions for information light and reference light for recording during multiplex recording based on information on reproduction light detected by reproduction light detection means, which provides another advantage in that multiplex recording can be performed under optimum conditions.

In the fourth optical information recording apparatus according to the invention, the pick-up device has fixing means for fixing information recorded using an interference pattern in the information recording layer, which provides another advantage in that information can be fixed.

In the fourth optical information recording apparatus according to the invention, an optical information recording medium is used which has a recording region that allows recording of information using an interference pattern and positioning regions provided on both sides of the recording region for positioning information light and reference light for recording, and control means is provided for reciprocating the illuminating positions of the information light and the reference light for recording by way of the recording region and at least a part of the positioning regions on both sides thereof to position the information light and the reference light for recording relative to the recording region based on information obtained from the positioning regions. This provides another advantage in that it is possible to prevent shift of a recording position even when recording is performed for a relatively long time in the same location of an optical information recording medium.

In the fourth optical information recording apparatus according to the invention, by providing a plurality of pick-up devices, another advantage is achieved in that simultaneous recording can be performed on a single optical information recording medium with the plurality of pick-up devices to improve recording performance.

In the fourth optical information reproducing apparatus according to the invention, the pick-up device provided in a face-to-face relationship with an optical information recording medium projects reference light for reproduction upon the information recording layer; reproduction light generated at the information recording layer when illuminated with the reference light for reproduction is collected on the same side of the information recording layer that is illuminated with the reference light for reproduction; and the reproduction light is detected, which is advantageous in that the optical system for reproduction can be configured compactly and in that random access to the optical information recording medium can be performed easily.

In the fourth optical information reproducing apparatus according to the invention, the reproducing optical system projects the reference light for reproduction and collects reproduction light such that the optical axis of the reference light for reproduction and the optical axis of the reproduction light are located on the same line, which provides another advantage in that the optical system for reproduction can be configured more compactly.

In the fourth optical information reproducing apparatus according to the invention, the light source emits beams of light in a plurality of wavelength bands, and detection means detects reproduction light in the same plurality of wavelength bands as those for the beams of light emitted by the light source. This provides another advantage in that it is possible to reproduce information recorded in an optical information recording medium on a multiplex basis using light in a plurality of wavelength bands.

In the fourth optical information reproducing apparatus according to the invention, the pick-up device has light quantity monitoring means for monitoring the quantity of reference light for reproduction, which provides another advantage in that the quantity of the reference light for reproduction can be monitored and controlled.

In the fourth optical information reproducing apparatus according to the invention, an optical information recording medium is used which has a recording region that allows recording of information using an interference pattern and positioning regions provided on both sides of the recording region for positioning reference light for reproduction, and control means is provided for reciprocating the illuminating position of the reference light for reproduction by way of the recording region and at least a part of the positioning regions on both sides thereof to position the reference light for reproduction relative to the recording region based on information obtained from the positioning regions. This provides another advantage in that it is possible to prevent shift of a reproducing position even when reproduction is performed for a relatively long time in the same location of an optical information recording medium.

In the fourth optical information reproducing apparatus according to the invention, by providing a plurality of pick-up devices, another advantage is achieved in that simultaneous reproduction can be performed on a single optical information recording medium with the plurality of pick-up devices to improve reproducing performance.

In the optical information recording/reproducing apparatus according to the invention, during recording, the pick-up device provided in a face-to-face relationship with the optical information recording medium projects information light and reference light for recording upon the information recording layer on the same side thereof to record information in the information recording layer using an interference pattern as a result of interference between the information light and the reference light for recording. During reproduction, the pick-up device illuminates the information recording layer with reference light for reproduction; reproduction light generated at the information recording layer when illuminated with the reference light for reproduction is collected on the same side of the information recording layer that is illuminated with the reference light for reproduction; and the collected reproduction light is detected. This is advantageous in that the optical system for recording and reproduction can be configured compactly and in that random access to the optical information recording medium can be performed easily.

In the optical information recording/reproducing apparatus according to the invention, by providing a plurality of pick-up devices, another advantage is achieved in that simultaneous recording and reproduction can be performed on a single optical information recording medium with the plurality of pick-up devices to improve recording and reproducing performance.

The optical information recording medium according to the invention has: a first information layer for recording information in the form of an interference pattern as a result of interference between information light and reference light for recording utilizing holography and for generating reproduction light associated with the recorded information when illuminated with reference light for reproduction; and a second information layer which is provided in a position different from the position of the first information layer in the direction of the thickness and in which information is recorded using means different from that for the recording of information in the first information layer. This is advantageous in that the positioning of information light, reference light for recording and reference light for reproduction relative to the first information layer can be performed using the information recorded in the second information layer, and in that directory information, directory management information and the like on the information recorded in the first information layer can be recorded in the second information layer to make it possible to perform random access and high density recording easily.

In the optical information recording medium according to the invention, a gap having a predetermined thickness is formed between the first information layer and the second information layer, which provides another advantage in that a sufficiently large interference region can be formed between reference light for recording and information light in the first information layer while allowing reproduction of information recorded in the second layer.

It will be understood from the above description that the invention may be carried out in various modes and modified modes. Therefore, the present invention may be carried out in modes other than the above-described best modes for carrying out the invention within the scope of equivalence of the appended claims.

What is claimed is:

1. An optical information recording apparatus for recording information in an optical information recording medium having reflecting layer and information recording layer in which information is recorded utilizing holography, said apparatus comprising:

an input means for inputting individual information that is unique to an individual;

an information light generation means for generating information light carrying two dimensional digital pattern information to be recorded on said optical information recording medium;

a phase modulation pattern generation means for generating phase modulation pattern information based on said individual information inputted by said input means;

a recording reference light generation means, including phase modulation means for spatially modulating a phase of light, for generating reference light for recording having a phase spatially modulated based on said phase modulation pattern information by said phase modulation means;

a recording optical system for illuminating said information recording layer on a same side thereof with said information light and said reference light for recording so that said information is recorded in said information recording layer in a form of an interference pattern as a result of using the reflecting layer as a reference plane to generate interference between said information light and said reference light for recording and so that an optical axis of said information light and an optical axis of said reference light for recording are located on a same line.

2. The optical information recording apparatus according to claim 1, wherein said information is recorded in said information recording layer, correlating said information to said phase modulation pattern information generated by said phase modulation pattern generation means.

3. The optical information recording apparatus according to claim 1, further comprising:

an issue means for issuing a verification recording medium having said phase modulation pattern information to verify said individual.

4. An optical information recording apparatus for recording information in an optical information recording medium having reflecting layer and information recording layer in which information is recorded utilizing holography in the form of an interference pattern as a result of interference between information light carrying two dimensional digital pattern information and reference light for recording having a spatial modulation, the apparatus comprising:

an input means for inputting individual information that is unique to an individual;

an information light generation means for generating the information light based on the information of the medium, carrying the two dimensional digital pattern information;

a phase modulation pattern generation means for generating phase modulation pattern information based on said individual information inputted by said input means;

a recording reference light generation means including phase modulation means for spatially modulating a phase of the light, for generating the reference light for recording having a phase spatially modulated based on said phase modulation pattern information by the phase modulation means; and a recording optical system, for illuminating the information recording layer on a same side thereof with the information light and the reference light for recording such that the information is recorded in the information recording layer in the form of an interference pattern as a result of using the reflecting layer as a reference plane to generate interference between the information light and the reference light for recording, wherein the recording optical system projects the information light and the reference light for recording such that an optical axis of the information light, and an optical axis of the reference light for recording are located on a same line.

5. An optical information recording method for recording information in an optical information recording medium having reflecting layer and information recording layer in which information is recorded utilizing holography in the form of an interference pattern as a result of interference between information light carrying two dimensional digital pattern information and reference light for recording having a spatial modulation, the method comprising:

inputting individual information that is unique to an individual;

generating the information light carrying the two dimensional digital pattern information;

spatially modulating the reference light for recording based on the individual information;

illuminating the information recording layer on a same side thereof with the information light and the reference light for recording located on a same line to record the two dimensional digital pattern information in the information recording layer in the form of an interference pattern as a result of using the reflecting layer as a reference plane to generate interference between the information light and the reference light for recording.

6. An optical information recording and reproducing apparatus for recording information in and reproducing information from an optical information recording medium having reflecting layer and information recording layer in which information is recorded utilizing holography, the apparatus comprising:

an input means for inputting individual information that is unique to an individual;

an information light generator that generates information light by first modulating a first light based on first information;

a recording reference light generator that modulates a second light to generate reference light for recording based on the individual information;

a recording optical system for illuminating the information recording layer with the information light and the reference light for recording, the information light and the reference light for recording illuminating the information recording layer on a same side such that the first information are recorded in the information recording layer as a result of using the reflecting layer as a reference plane to generate an interference pattern between the information light and the reference light for recording, wherein the recording optical system projects the information light and the reference light for recording such that a first optical axis of the information light and a second optical axis of the reference light for recording are located on a first same line;

a reproduction reference light generator that modulates a light to generate reference light for reproduction based on the individual information;

a reproducing optical system for illuminating the information recording layer with the reference light for reproduction on the same side of the information recording layer that is illuminated with the information light and the reference light for recording and for collecting reproduction light on the same side of the information recording layer that is illuminated with the reference light for reproduction, wherein the reproducing optical system projects the reference light for reproduction and collects the reproduction light such that a third optical axis of the reference light for reproduction and a forth optical axis of the reproduction light are located on a second same line; and a detection means for detecting the reproduction light collected by the reproducing optical system.

7. An optical information recording and reproducing method for recording information in and reproducing information from an optical information recording medium having reflecting layer and information recording layer in which information is recorded utilizing holography in the form of an interference pattern as a result of interference between information light and reference light for recording having a spatial modulation, the method comprising:

inputting individual information that is unique to an individual;

generating the information light carrying two dimensional digital pattern information;

modulating the light to generate the reference light for recording based on the individual information;

illuminating the information recording layer with the information light and modulated reference light for recording on a same side of the optical information recording medium such that an optical axis of the information light and an optical axis of the reference light for recording are located on a first same line;

recording the information in the information recording layer as a result of using the reflecting layer as a reference plane to generate an interference pattern between the information light and the modulated reference light for recording;

spatially modulating the light to generate reference light for reproduction having a spatial modulation in the same manner in which the reference light for recording was modulated when the information was recorded;

illuminating the information recording layer with the reference light for reproduction on the same side of the information recording layer that is illuminated with the information light and the modulated reference light for reproduction and collecting reproduction light generated at the information recording layer when illuminated with the reference light for reproduction on the same side of the information recording layer that is illuminated with the reference light for reproduction such that an optical axis of the reference light for reproduction and an optical axis of the reproduction light are located on a second same line; and detecting the collected reproduction light.

8. An optical information recording and reproducing apparatus for recording information in and reproducing information from an optical information recording medium having reflecting layer and information recording layer in which information is recorded utilizing holography in the form of an interference pattern as a result of interference between information light carrying two dimensional digital pattern information and reference light for recording having a spatial modulation, the apparatus comprising:

an input means for inputting individual information that is unique to an individual;

an information light generation unit configured to generate plural information lights each of which carries corresponding two dimensional digital pattern information;

a recording reference light generation unit, including a modulator for spatially modulating a light based on the individual information, configured to generate plural reference lights for recording each of which is spatially modulated by said modulator in response to a unique phase modulation pattern for said each two dimensional digital pattern information;

an optical recording unit configured to illuminate said information recording layer with said plural information lights and said plural reference lights for recording so that an optical axis of each information light and an optical axis of the corresponding reference light for recording are located on a same line, to perform a multiplex recording to record on a same location of said optical information recording medium information in the form of plural interference patterns as a result of using the reflecting layer as a reference plane to generate interferences between said plural information lights and said plural reference lights for recording;

a reproduction reference light generation unit, including a modulator for spatially modulating the light based on the individual information, configured to generate plural reference lights for reproduction each of which is spatially modulated by said modulator of the reproduction reference light generation unit in response to a unique phase modulation pattern for said each two dimensional digital pattern information in the same manner in which the reference light for recording was modulated when the information was recorded;

an optical reproducing unit configured to illuminate the information recording layer with the reference light for reproducing generated by the reproduction reference light generation unit on a same side of the information recording layer that is illuminated with the corresponding information light and the corresponding reference light for recording and for collecting reproduction light generated at the information recording layer when illuminated with the reference light for reproduction on the same side of the information recording layer that is illuminated with the reference light for reproduction so that an optical axis of reproduction light and an optical axis of the corresponding reference light for reproducing are located on a same line; and a detection unit for detecting the reproduction light collected by the optical reproducing unit.

9. An optical information recording apparatus for recording information holographically in an optical information recording medium having reflective layer and information recording layer, the apparatus comprising:

an inputting device that inputs individual information that is unique to an individual;

an information light source that generates information light carrying two dimensional digital pattern information;

a recording reference light source that generates recording reference light, including a modulator that spatially modulates the recording reference light based on the individual information; and a recording optical system projects the information light and the recording reference light for recording the information in the form of an interference pattern as a result of using the reflecting layer as a reference plane to generate interference between the information light and the recording reference light such that an optical axis of the information light and an optical axis of the recording reference light are located on a same line.

* * * * *